US012616295B2

(12) United States Patent
Gross et al.

(10) Patent No.: US 12,616,295 B2
(45) Date of Patent: May 5, 2026

(54) HYGIENE PRODUCT, IN PARTICULAR ORAL HYGIENE PRODUCT

(71) Applicant: TRISA HOLDING AG, Triengen (CH)

(72) Inventors: Peter Gross, Sempach-Stadt (CH);
Michael Schär, Egolzwil (CH); Peter Zurfluh, Alpnach-Dorf (CH)

(73) Assignee: TRISA HOLDING AG, Triengen Luzern (CH)

( * ) Notice: Subject to any disclaimer, the term of this patent is extended or adjusted under 35 U.S.C. 154(b) by 632 days.

(21) Appl. No.: 17/926,830

(22) PCT Filed: May 20, 2021

(86) PCT No.: PCT/EP2021/063487

§ 371 (c)(1),
(2) Date: Nov. 21, 2022

(87) PCT Pub. No.: WO2021/234099

PCT Pub. Date: Nov. 25, 2021

(65) Prior Publication Data

US 2023/0240436 A1 Aug. 3, 2023

(30) Foreign Application Priority Data

May 20, 2020 (EP) ..................................... 20175812

(51) Int. Cl.
*A46B 5/02* (2006.01)
*B29C 45/14* (2006.01)
*B29L 31/42* (2006.01)

(52) U.S. Cl.
CPC .......... *A46B 5/02* (2013.01); *B29C 45/14795* (2013.01); *A46B 2200/1066* (2013.01); *B29L 2031/425* (2013.01)

(58) Field of Classification Search
CPC ... A46B 5/02; A46B 2200/1066; A46B 5/002; B29C 45/14795; B29L 2031/425
See application file for complete search history.

(56) References Cited

U.S. PATENT DOCUMENTS 3,770,033 A 11/1973 Gavillet et al.
4,283,808 A * 8/1981 Beebe ...................... A46B 5/02
401/6

(Continued)

FOREIGN PATENT DOCUMENTS

DE 20 2004 015 133 U1 11/2004
DE 20 2008 008 841 U1 12/2008

(Continued)

OTHER PUBLICATIONS

Jan. 16, 2025 Office Action issued in European Patent Application No. 20 175 812.5.

(Continued)

*Primary Examiner* — Andrew A Horton
(74) *Attorney, Agent, or Firm* — OLIFF PLC

(57) ABSTRACT

A hygiene product, in particular an oral hygiene product, includes at least one application unit, further includes at least one handle unit that is connected to the application unit, and includes at least one volume body, which at least partially forms the application unit and/or the handle unit and which is made at least partially of a foamed material, wherein the hygiene product includes at least one base body, which is connected to the volume body and which at least partially forms the application unit and/or the handle unit, wherein the at least one volume body is molded to the at least one base body.

4 Claims, 14 Drawing Sheets

(56)        References Cited

U.S. PATENT DOCUMENTS

Figures 1A, 1B, 1C, 1D:
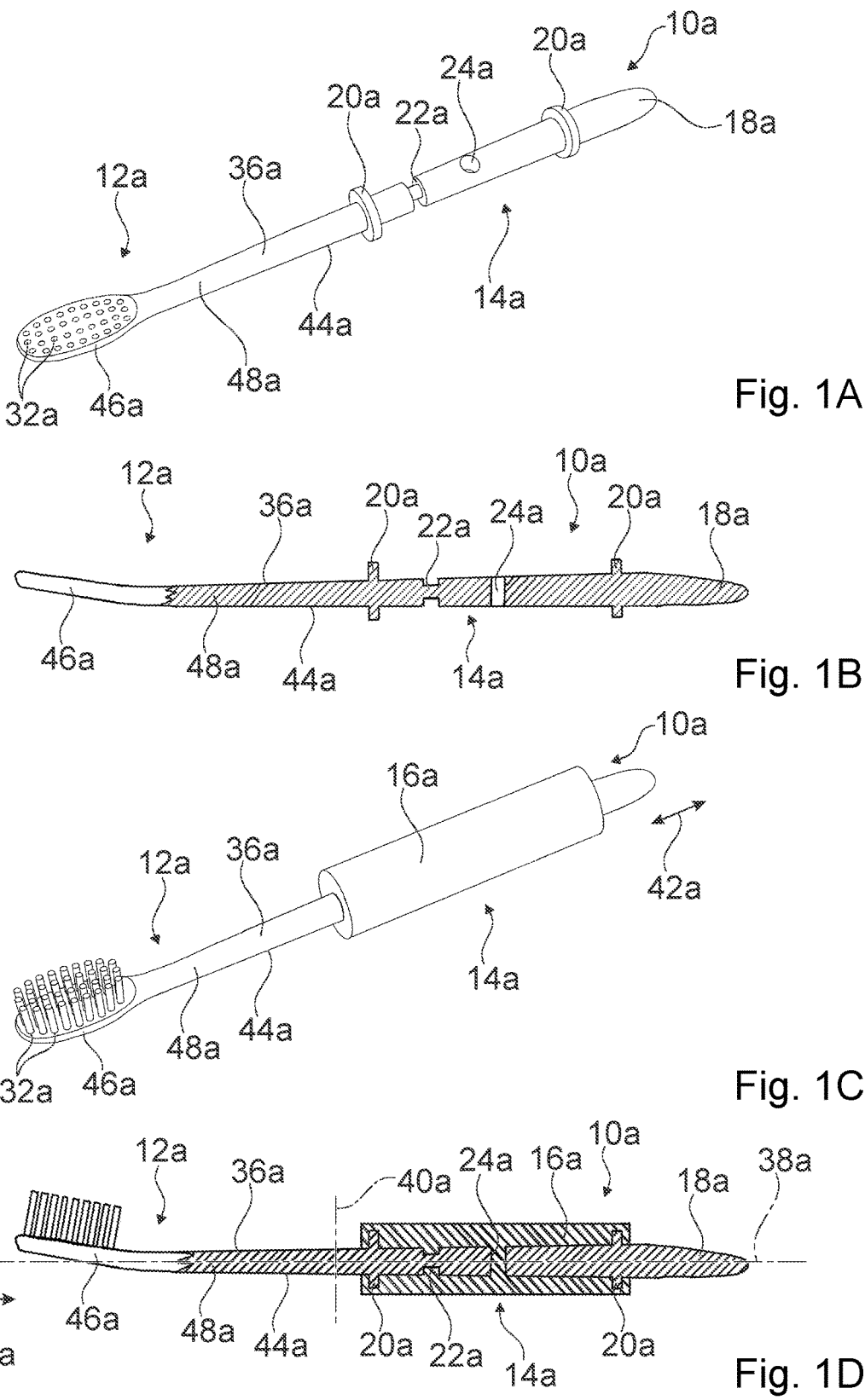

| | | | |
|---|---|---|---|
| 5,815,874 A | 10/1998 | Weihrauch | |
| 6,024,903 A | 2/2000 | Naft et al. | |
| 9,138,048 B2 | 9/2015 | Walther | |
| 2003/0172498 A1 | 9/2003 | Polzin et al. | |
| 2005/0015907 A1* | 1/2005 | Georgi | A46B 5/007 |
| | | | 15/167.1 |
| 2006/0213018 A1* | 9/2006 | Gross | A46B 5/02 |
| | | | 15/143.1 |
| 2012/0255136 A1* | 10/2012 | Jimenez | A46B 15/0087 |
| | | | 15/167.1 |
| 2014/0047656 A1* | 2/2014 | Newman | B29C 49/22 |
| | | | 264/541 |
| 2015/0313349 A1* | 11/2015 | Hohlbein | A46B 5/021 |
| | | | 15/167.1 |
| 2022/0151369 A1 | 5/2022 | Breitbach | |

FOREIGN PATENT DOCUMENTS

| | | |
|---|---|---|
| EP | 0 758 534 B1 | 11/2000 |
| WO | 00/64306 A1 | 11/2000 |
| WO | 2016/105364 A1 | 6/2016 |
| WO | 2020/193760 A1 | 10/2020 |

OTHER PUBLICATIONS

Feb. 14, 2025 Office Action issued in European Patent Application No. 21 730 111.8.
Jan. 14, 2021 Search Report issued in European Patent Application No. 20175812.5.
Oct. 15, 2020 Search Report issued in European Patent Application No. 20175812.5.
Nov. 17, 2022 International Preliminary Report on Patentability issued in International Application No. PCT/EP2021/063487.
Oct. 27, 2021 International Search Report issued in International Application No. PCT/EP2021/063487.

* cited by examiner

84o

82o 44o    48o    12o

46o

36o 18o    14o 14o    18o 78o    84o

36o 32o    12o 48o    16.2o    14o 46o    82o    16o

78o 84o    16.1o    10o 18o    14o 82o    16.2o 160    78o

HYGIENE PRODUCT, IN PARTICULAR ORAL HYGIENE PRODUCT

CROSS REFERENCE TO RELATED APPLICATIONS

This application is based on and incorporates herein by reference the European patent application EP 20175812.5, filed on May 20, 2020, as well as the PCT application PCT/EP2021/063487, filed on May 20, 2021.

PRIOR ART

The invention concerns a hygiene product, in particular an oral hygiene product.

From EP 0 758 534 B1 and U.S. Pat. No. 4,283,808 hygiene products, in particular oral hygiene products, are already known, with at least one application unit, with at least one handle unit that is connected to the application unit, and with at least one volume body which at least partially forms the application unit and/or the handle unit and which is made at least partially of a foamed material.

Furthermore, from DE 20 2004 015 133 U1, from WO 2020/193760 A1 and from U.S. Pat. No. 9,138,048 B2 hygiene products are already known, too.

The objective of the invention is in particular to provide a generic device having improved characteristics with regard to material efficiency, weight and/or ergonomics. The objective is achieved according to the invention while advantageous implementations and further developments of the invention may be gathered from the subclaims.

Advantages of the Invention

The invention is based on a hygiene product, in particular an oral hygiene product, with at least one application unit, with at least one handle unit that is connected to the application unit, and with at least one volume body which at least partially forms the application unit and/or the handle unit and which is made at least partially of a foamed material.

It is proposed that the hygiene product comprises at least one base body which is connected to the volume body and which at least partially forms the application unit and/or the handle unit, wherein the at least one volume body is molded to the at least one base body. The volume body is preferably produced in a foaming process and in particular forms at least a portion of the handle unit and/or of the application unit.

Preferably the hygiene product is implemented of an application unit with bristles and of the handle unit, the application unit in particular having a neck region that connects the application unit to the handle unit. All the sub-elements may be implemented of at least one hard component and/or one or several soft component/s and/or of a foamed material. Both customary hard and/or soft components or sustainable hard and/or soft components are applicable.

The implementation of the hygiene product according to the invention allows providing advantageous characteristics with regard to ergonomics of the hygiene product. In particular, advantageous grippability of the handle unit is achievable. Furthermore, this in particular allows keeping a weight of the hygiene product at a low level, in particular without affecting ergonomics, in particular a grippability, of the hygiene product. It is in particular possible to provide a body that is lightweight but voluminous. For example, it is possible to produce a lightweight toothbrush that is still voluminous. As a result, the hygiene product is light as a feather and its surface is rather soft and feels warm. In particular, material input for the hygiene product can be kept at a low level. This allows providing an advantageously ecological and/or sustainable hygiene product.

By a "hygiene product" is in particular an oral hygiene product to be understood, preferably a toothbrush. Alternatively the hygiene product may be implemented by a body care product, for example for hair removal, like in particular a shaving-brush handle or a safety razor, and/or by a hairbrush, in particular an elongate hairbrush handle or a hairbrush handle having, for example, the shape of a shell (which the bristle field is inserted in). It would also be conceivable that the hygiene product is implemented by a cosmetics applicator, like in particular a handle for a mascara brush or a mascara applicator, a mascara container, a nail polish brush handle, a nail polish brush container, a face brush, a handle for a make-up applicator and/or a make-up container. Alternatively the hygiene product may be implemented by a household utensil, like in particular a handle element on a grip of a washing-up brush, a handle element on a grip of a toilet brush handle, a handle element on a grip of a floor wiper, on the handle of a dustpan and/or a handle element on a broomstick of a broom. The hygiene product may moreover be implemented by a packaging and/or by an auxiliary means, like in particular a dental-floss box, a cream jar and/or a face brush socket. An "oral hygiene product" is in particular to mean a toothbrush and/or an interdental cleaner and/or an interdental brush and/or a flosser and/or a tongue cleaner and/or a toothpick. Advantageously the oral hygiene product is realized as a toothbrush, in particular a manual toothbrush, preferably a children's toothbrush or a toothbrush for adults, advantageously a purely manual toothbrush. The oral hygiene product may herein be implemented as a disposable toothbrush, as a reusable toothbrush, as an exchangeable-head toothbrush, as a single-tuft brush, as an electrical toothbrush, in particular a housing of an electrical toothbrush, as well as a hybrid toothbrush, an interdental cleaner, in particular with twisted-in bristles, in an injection-molded implementation, or as a flosser, a tongue cleaner and/or as a dental-floss box.

The hygiene product in particular has a length axis that is advantageously arranged at least substantially parallel to a main extent direction of the hygiene product. Preferentially the length axis runs at least section-wise within the hygiene product and in particular through its center of gravity. In particular, the length axis of the hygiene product is a central axis of the hygiene product and/or a central axis of the handle unit. By a "central axis" of an object is herein in particular an imaginary axis to be understood which runs within the object, parallel to a main extent direction of the object, and intersects with the object in maximally two points. "At least substantially parallel" is here in particular to mean an orientation of a direction relative to a reference direction, in particular in a plane, the direction having a deviation from the reference direction that is in particular smaller than 8°, advantageously smaller than 5° and especially advantageously smaller than 2°. By a "main extent direction" of an object is herein in particular a direction to be understood which runs parallel to a longest edge of a smallest imaginary rectangular cuboid just still completely enclosing the object. A "main extent" of an object is in particular to mean, in this context, an extent of a longest edge of a smallest imaginary rectangular cuboid just still completely enclosing the object.

The hygiene product in particular has a length, in particular parallel to the length axis of the hygiene product and measured parallel to a support surface, of 140 mm to 210 mm, and preferably of 165 mm to 195 mm, wherein other lengths, in particular smaller or greater lengths, are of course also conceivable. In particular, the hygiene product has a maximal width, in particular parallel to a width axis of the hygiene product, advantageously perpendicularly to the length axis and/or parallel to a main extent plane of the hygiene product and/or of the handle unit, of 10 mm to 20 mm, preferably of 12 mm to 17 mm. Furthermore, the hygiene product in particular has, with inserted filaments/bristles, a height, measured in particular parallel to the height axis and perpendicularly to the support surface, of 12 mm to 25 mm, preferably of 15 mm to 19 mm. The term "height" is herein in particular meant in reference to a state of the hygiene product in which the hygiene product has been deposited, for example on a surface like a table top, a washbasin, a furniture upper side, or something like that, in particular in such a way that the length axis is arranged parallel to the surface. By a "main extent plane" of an object is in particular a plane to be understood which is parallel to a largest side surface of a smallest imaginary rectangular cuboid just still completely enclosing the object, and which extends through the center point of the rectangular cuboid.

The application unit advantageously comprises at least one cleaning region, which is configured for a tooth-cleaning application, in particular in a user's oral cavity. Preferably the cleaning region comprises at least one cleaning unit, in particular at least one brush head, advantageously a toothbrush head, preferably with a plurality of bristles and/or bristle bundles and/or injection-molded cleaning elements, respectively injection-molded bristles, and/or soft-elastic cleaning elements. However, the cleaning unit may also be implemented, for example, as an interdental brush and/or as a single tuft (e. g. a large single bristle bundle), and/or as a bow stringed with dental floss, in particular as a flosser, or something like that. Furthermore, the application unit advantageously comprises at least the neck element, which is preferentially connected, in particular directly and/or integrally, to the cleaning region. "Integrally" is here in particular to mean at least connected by substance-to-substance bond and/or material bond, for example by means of a welding process, a gluing process, an injection-molding process and/or a further process that is deemed expedient by someone skilled in the art, and/or advantageously formed in one piece like, for example, by a production from a cast and/or by a production in a one-component or multi-component injection-molding procedure and advantageously from a single blank. "Configured" is in particular to mean specifically designed and/or equipped. By an object being configured for a certain function is in particular to be understood that the object fulfills and/or executes said certain function in at least one application state and/or operation state.

The hygiene product in particular has a front side and a rear side, which are in particular arranged facing away from each other. Preferably the cleaning region is arranged on the front side of the hygiene product. The front side is in particular a side of the hygiene product that is visible in a viewing direction perpendicularly to the length axis of the hygiene product and perpendicularly to the width axis of the hygiene product. In particular, the side of the brush which the thumb is laid upon is referred to as the front side of the hygiene product. The front side is usually also the side which the bristle field is directed to. The rear side is advantageously equivalent to a side of the hygiene product that is visible in a viewing direction opposed thereto. The side of the toothbrush that faces away from the bristle field is referred to as the rear side of the hygiene product. In particular, a side that is situated on the left in a perpendicular view onto the front side of the hygiene product is referred to as the lefthand side of the hygiene product. In particular, a side that is situated on the right in a perpendicular view onto the front side of the hygiene product is referred to as the righthand side of the hygiene product. In particular, an end of the hygiene product on which the cleaning region is arranged is referred to as the upper side. An end of the hygiene product that is situated opposite the upper side and closest to the handle region is referred to as the underside.

Preferably the handle unit comprises at least one handle element, which is advantageously configured to be held by a hand. Preferentially the handle element is realized at least partially having a waist. This advantageously allows secure holding and optimizes ergonomics. Particularly preferentially the handle element is implemented in an elongate fashion, wherein a length axis of the handle element advantageously corresponds to the length axis of the hygiene product. The handle element in particular comprises a handle body which forms an essential volume of the handle element. The handle element is at least partially made of at least one hard component and/or of one or several soft components and of at least one foamed material. In particular, the handle element advantageously comprises at least a thumb-gripping region and/or at least a hand-gripping region. Advantageously the thumb-gripping region is arranged on the front side of the hygiene product, and in particular on a front side of the handle element. It is conceivable that the thumb-gripping region and/or the hand-gripping region comprise/s at least one element and/or surface structuring implemented of at least one soft component and/or at least one hard component and/or at least one foamed material.

The components, respectively materials, used for manufacturing may in particular be categorized as follows—this applies, among others, to soft components, hard components and foamed material:

Customary materials, respectively components: materials, essentially new materials, which are mostly oil-based.

Sustainable materials, respectively components: as listed below and described later on, preferably bio-based, degradable and/or recycled.

Bio-based materials, respectively components: material made, in particular by more than 60%, preferably by more than 80% and particularly preferentially by 100%, of sustainable raw materials. A further optional additional feature of bio-based materials is in particular that bio-based materials are biodegradable. Preferably the materials are not based on foodstuff, like in particular corn etc.

Biodegradable materials, respectively components: material which is biodegradable according to the usual standards. This means in particular compostability (in an industrial or non-industrial fashion). Materials made of sustainable raw materials, like in particular petrochemical raw materials, may carry this feature.

Recycled materials, respectively components: materials produced in a recycling process, like for example Post Consumer Recycled Materials, Post Industrial Recycled Materials, Ocean Waste Plastic or Social Plastic.

The materials, respectively components, used may be recyclable materials. For recyclable materials there is advantageously an option of further recycling after use.

In the context of the present disclosure almost any hard components and soft components may be used, which will be expediently and suitably combined and/or selected by someone skilled in the art. A hard component may be, for example, styrene polymerizates like styrene acrylonitrile (SAN), polystyrene (PS), acrylonitrile butadiene styrene (ABS), styrene methyl methacrylate (SMMA), styrene butadiene (SB) or the like. Furthermore, a hard component may comprise polyolefins like polypropylene (PP), polyethylene (PE) or the like, in particular also realized as high-density polyethylene (HDPE) or low-density polyethylene (LDPE). Moreover, polyesters may be used, like for example polyethylene terephthalate (PET), in particular realized as acid-modified polyethylene terephthalate (PETA), glycol-modified polyethylene terephthalate (PETG), polybutylene terephthalate (PBT), acid-modified polycyclohexylenedimethylene terephthalate (PCT-A), glycol-modified polycyclohexylenedimethylene terephthalate (PCT-G) or the like. Furthermore, a usage of cellulose derivatives is conceivable, like for example cellulose acetate (CA), cellulose acetate butyrate (CAB), cellulose propionate (CP), cellulose acetate phthalate (CAP), cellulose butyrate (CB) or the like. Furthermore, a hard component may comprise, for example, polyamides (PA) like PA 6.6, PA 6.10, PA 6.12 or the like, poly(methyl methacrylate) (PMMA), polycarbonate (PC), polyoxymethylene (POM), polyvinyl chloride (PVC), polyurethane (PUR), polyimide (PA) or more of that kind. In particular polyethylene (PE) and/or polyurethane (PUR) are applicable as a hard component and/or as a soft component. In particular, a hard component has an elasticity modulus of at least 1,000 N/mm$^2$, advantageously of at least 1,300 N/mm$^2$, and/or of maximally 2,400 N/mm$^2$, advantageously of maximally 1,800 N/mm$^2$. Preferably polypropylene (PP) is used as a hard component. At least some of the materials listed as hard components may be sustainable materials. In particular materials having a cellulose content are at least partially bio-based.

Advantageously hard components are used for stable and/or structure-bearing elements, in particular in the handle element and/or in a carrier element of the application unit and/or interface geometry, for example for exchangeable heads or the like. Preferably the hard component is used for elements whose durability must be ensured. Preferably the hygiene product or at least a base body of the hygiene product comprises a single hard component, which may be made of one of the mentioned materials or of a mixture thereof. However, combinations of different hard components are also conceivable, which may for example be processed in a two-component and/or multi-component injection molding and/or may be glued and/or welded, in particular ultrasound-welded, with one another. Alternatively or additionally, several hard components may be applied, which do not enter either into a substance-to-substance bond and/or a material bond in a two-component and/or multi-component injection molding. It is in particular conceivable that in this case a form-fit connection is created between hard components, for example realized as at least one undercut and/or at least one breakthrough, and/or at least one at least partial overmolding, or the like. Herein it is conceivable that, for example, a second hard component, which is in particular injection-molded onto a first hard component, dwindles and/or shrinks after an injection molding, advantageously forming a shrinkage connection with the first hard component. Suitable combinations may be, for example, polypropylene-polyester, polypropylene-styrene acrylonitrile, or other combinations.

Soft components may be, for example, thermoplastic styrene elastomers (TPE-S), like for example a styrene ethylene butadiene styrene copolymer (SEBS), a styrene butadiene styrene copolymer (SBS) or the like. Moreover, utilization of thermoplastic polyurethane elastomers (TPE-U), thermoplastic polyamide elastomers (TPE-A), thermoplastic polyolefin elastomers (TPE-O), thermoplastic polyester elastomers (TPE-E) or the like is conceivable. Beyond this, a soft component may for example comprise at least one silicone. Advantageously a soft component has a Shore A hardness of maximally 90, advantageously of maximally 50 and especially advantageously of maximally 30. Preferably at least one soft component forms together with at least one hard component, in particular in at least one two-component and/or multi-component injection-molding, advantageously by means of at least one overmolding, at least a substance-to-substance bond and/or material bond. The materials mentioned as soft components may be sustainable materials.

In the scope of the present disclosure almost any foamed materials may be used, which will be expediently and suitably combined and/or selected by someone skilled in the art. The foamed material is in particular implemented by a particle foam of expanded components. Expandable components in particular have an E in their denomination. The foamed material may be produced from a hard component, in particular resulting in a hard foam. The foamed material may be implemented, for example, of expanded polystyrene (EPS), expanded polyethylene (EPE), expanded polypropylene (EPP), expanded polyethylene terephthalate (EPET) and/or expanded polybutylene terephthalate (EPBT) as the basic component. Principally a foam based on cellulose or PLA is also possible. The foamed material may also be produced from a soft component, resulting in particular in a soft foam. For this the foamed material may be implemented, for example, of expanded thermoplastic polyurethane (ETPU) as the basic component. Preferably the foamed material comprises pentane in its basic component. The pentane in particular serves as an expanding agent. In a production process the pentane in particular brings about the volume increase. By a loading with, for example, pentane in particular storability is given. Moreover, biodegradable components are feasible for the foamed material. For sustainability purposes, in particular a foam would be conceivable which is completely biodegradable. For example, a foam based on plant oil, like for example palm oil, and/or based on PLA, i. e. in particular based on amylum/cellulose and water, is conceivable.

The foamed material is in particular produced from an expandable granulate. The foamed material is in particular realizable from a hard component or a soft component. The foamed material is in particular implemented by a closed-cell foam. Different variants of granulate production, deemed expedient by someone skilled in the art, are conceivable. For example, the material may be foamed in an autoclave as a reactor. Herein, in particular, in a first step the granulate, e. g. polypropylene (PP), is placed into the autoclave and mixed with an easily evaporating hydrocarbon. When the autoclave is then emptied, the granulate foams and forms beads. With regard to coloring, the foamed material is quite limited as usually only white and gray are possible. Alternatively, the material may be produced in an extruder. Herein, in particular, in a first step the extruder is loaded with a melt and with an expanding agent, and then extrusion is carried out. Afterwards, following extrusion, the extruded material is cut by means of knives and beads form. Herein colors may be mixed in, in particular directly. In this method there are preferably more possibilities of coloring. The advantage of this method is in particular a higher temperature resistance of the expanded granulate, wherein later on higher processing pressures, in particular vapor pressures, will be required for forming.

The expanded granulate for the foamed material is in particular floatable and has a density of 0.01 g/cm$^3$ to 0.5 g/cm$^3$, preferably of 0.02 g/cm$^3$ to 0.3 g/cm$^3$. Due to the low density of the foamed material, the finished hygiene product, which may comprise further foamed and/or non-foamed materials, respectively components, preferably remains floatable. Preferentially the average density of the finished hygiene product is less than 0.9 g/cm$^3$, preferably less than 0.7 g/cm$^3$, particularly preferentially less than 0.5 g/cm$^3$. This allows not only floatability but also very simple and comfortable handling. Due to its resilient effect, the light-weight hygiene product is capable of reducing or even preventing injuries, even in the case of wrong handling. In comparison, Benchmark polypropylene has a density of approximately 0.9 g/cm$^3$ to 1 g/cm$^3$. Other materials for hygiene products may even have densities greater than 1.0 g/cm$^3$.

Beyond this the expanded granulate for the foamed material in particular has favorable heat insulation properties. Due to its low thermal conductivity, the material in particular feels warm, thus providing very comfortable haptics, in particular compared to an injection-molded (i. e. injection-molding-processed) synthetic component. This circumstance also instigates longer use of the hygiene product, thus increasing the intended benefit. The thermal conductivity of the expanded granulate for the foamed material is in particular in a range from 10 W/(m*K) to 70 W/(m*K), preferably from 25 W/(m*K) to 45 W/(m*K).

The foamed material has comfortable, soft haptics. Preferably the surfaces formed with the foamed material have a Shore A hardness of less than 90, preferably less than 70 and particularly preferentially less than 50. If surfaces of a soft material are formed on the hygiene product, preferably a soft material is chosen which has a smaller Shore hardness than the foamed material. The density of the foamed material is set accordingly so as to attain the preferred Shore hardness. The foamed material is preferably softer than the hard component.

Moreover, the expanded granulate for the foamed material in particular has a damping function. In particular, acoustic noise reduction is obtainable, in particular by 10% to 50%, preferably by 15% to 30%.

A grain size of the expanded granulate for the foamed material is in particular in a range of 0.5 mm to 5 mm, preferably of 1 mm to 3 mm. There is furthermore a shrinkage of expanded granulate for the foamed material after processing that is in a range of 0.5% to 5%, preferably of 1% to 2%. The expanded granulate for the foamed material furthermore in particular has a thermal dimensional stability from 100° C. to 180° C., preferably from 110° C. to 150° C. A recycling content in the granulate may in particular amount to up to 90%. Preferably the expanded granulate has uniform particle sizes, such that the surface of the foamed material is smooth.

The foamed material may also have a coloring. In particular, a color may be integrated in the foamed material. In particular, for example a continuous coloring can be created in the foamed material. Alternatively or additionally, translucent foams may be used. This in particular allows obtaining optical effects in the foamed part.

The acoustic damping function may in particular be used advantageously with housings of electrical toothbrushes. The housing of the electrical toothbrush may be partially or completely equipped with a foamed material. The respective portions accordingly dampen the noises caused during operation by drive unit and gear.

Advantageously it is conceivable that a hard component used, a soft component used and/or a foamed material used have different colors, such that surface structures, letterings, motifs and the like can be realized by an appropriate design of the hard component, the soft component and/or the foamed material. In particular, the surfaces of the different components, respectively materials, may have different surface roughness.

It is further proposed that the at least one application unit comprises a brush head, in particular a toothbrush head. The application unit advantageously comprises at least one cleaning unit, in particular a toothbrush head, having bristles. Moreover, the cleaning unit advantageously comprises at least one bristle carrier, for example a brush head base body. Advantageously at least some or all of the bristles are customary extruded bristles. Herein bristles may in particular comprise at least one hard component and/or at least one soft component. Preferably the bristles are at least partially or completely manufactured from polyamide (PA) and/or from polyester (PBT, PET), any other materials being conceivable and sustainable materials being possible as well. It is also conceivable that at least some of the bristles have a tapering and/or a variable cross section. Preferably the bristles are made of single, in particular mixed, components, respectively materials. However, bristles with several unmixed components are also conceivable, which may in particular be producible and/or produced via at least one co-extrusion. The bristles may, for example, be producible and/or produced via extrusion, cutting to length and/or subsequent processing. Differently than with injection-molded bristles or rubber-elastic massaging and cleaning elements produced via injection-molding, customary bristles are extruded, cut and inserted at the toothbrush handle by means of an adapted procedure, like for example by means of the anchor-punching method, the AFT method and/or the IMT method, which will also define when the bristles are processed further, for example when profiling and/or rounding will be executed.

In particular, cylindrical or tapering bristles having a rounded cross section may be used, any other cross sections, like for example polygonal, triangular, rectangular, square, elliptic, star-shaped, trapezoid-shaped, parallelogram-shaped, rhomb-shaped or any other cross sections being also conceivable. In particular, different bristles may be used in one bristle bundle, but it is also possible that different bristle bundles, in particular each with a certain bristle type, are used. Bristles and/or bristle bundles may herein be arranged regularly but also irregularly. In particular, bristles and/or bristle bundles which are arranged in groups and/or adjoining one another may, in particular alternatingly, differ with regard to at least one feature, like for example a length, a diameter, a material, a color, a material hardness, a geometry, a tapering and/or something like that. Preferably the bristles for an application in an oral hygiene region have a diameter, in particular perpendicularly to their length axis, of at least 0.075 mm and/or of maximally 0.25 mm. Advantageously the bristles have a cross section area, in particular perpendicularly to their length axis, of at least 0.002 mm$^2$ and/or of maximally 0.2 mm$^2$. In the case of bristles applied in the field of cosmetics, e. g. bristles of an additional application element, it is also possible to use thinner bristles and/or bristles having a smaller cross section, in particular bristles with a diameter, in particular perpendicularly to their length axis, of at least 0.025 mm and/or of maximally 0.2 mm, and/or with a cross section area, in particular perpendicularly to their length axis, of at least 0.001 mm$^2$ and/or of maximally 0.15 mm$^2$. In the case of tapered bristles, in particular polyester (PBT, PET) is suitable as a material, while sustainable materials are possible as well, wherein a tapering may be generated in a mechanical and/or chemical fashion. However, other materials are also conceivable. Preferably the bristles are straight in a longitudinal direction, but undulating and/or drilled and/or helix-shaped and/or twisted bristles, in particular also combinations of different bristles, are also conceivable. Furthermore, bristles having a smooth surface are conceivable but also bristles having a textured surface.

Furthermore, the bristles are processed, in particular fastened to the bristle carrier, in particular as bristle bundles, preferably at least by means of an anchor-punching method, an anchor-free tufting method (AFT), an in-mold-tufting method (IMT), a PTt method, or the like. Preferably the bristle carrier comprises a plurality of, in particular drilled and/or injection-molded, bristle receptacles, in particular holes for bristle bundles. In the case of anchor punching, it is for example conceivable that first a base body is produced via injection molding, in particular of a hard component, preferably of the brush head, wherein advantageously blind holes for bristle bundles are formed during the injection molding. However, a subsequent drilling of blind holes is also conceivable. Preferably then bristles, respectively bristle bundles, are folded and are fastened in respectively one blind hole by means of at least one anchor, in particular via punching in. Sling punching is also conceivable.

As has been mentioned, alternatively anchor-free methods are also conceivable, wherein advantageously bristles, respectively bristle bundles, are not folded. In this case bristles, respectively bristle bundles, have approximately half the length compared to anchor punching. For example, it is herein conceivable that the bristle bundles are first singulated, are melted and/or, in particular subsequently, their bristle ends on a non-usage side are overmolded for fastening. Herein bristle bundles may advantageously be brought together. Herein a production via the In-Mold-Tufting method is possible, wherein advantageously a base body, for example of the brush head and/or of the handle unit and/or of the fastening unit, is formed when the bristle ends are overmolded. It is also conceivable that, in particular within an Integrated-Anchorless production, bristles are first of all overmolded with platelets or the like, and these platelets are then overmolded once again, for example in order to form the brush head and/or the handle unit.

Beyond this it is conceivable that the application unit is composed of a base body and a bristle platelet which is studded with bristles and/or alternative cleaning elements. For this purpose, firstly platelets with through-holes are produced via injection molding, and then bristles are guided through said through-holes. Preferably the bristles are subsequently connected, in particular melted, preferably with one another and/or with the respective bristle platelet, on a rear side. Bristle platelets furnished with bristles in this way may then be welded and/or glued, preferably via ultrasound welding, with a base body, in particular a brush head. For this the base body, in particular the brush head, in particular has a recess which the bristle platelet may be inserted in. In this context, the Anchor-Free-Tufting method may be referred to as a known production method, which in particular allows bringing bristle bundles together. In particular, a side of the bristle platelet which is laid into a recess of the base body, pointing toward the rear side of the oral hygiene product, is referred to as an underside of the bristle platelet. Correspondingly the upper side of the bristle platelet points toward the upper side of the oral hygiene product.

As a further method for an anchor-free furnishing with bristles a manufacturing, in particular injection molding, of a brush head with through-holes for bristles is possible. Bristles may subsequently be guided through the through-holes and melted on a rear side, in particular with one another and/or with the brush head. Preferably then over-molding of the melted regions and/or the brush head is carried out, in particular with at least one soft component. Herein for example an AMR method is possible, which in particular does not allow bristle bundles being brought together, or an AMR+ method, which in particular allows bristle bundles being brought together.

It is moreover conceivable that first a brush head with blind holes is formed, for example via injection molding, and/or is manufactured by drilling the blind holes. Bristles are in this case in particular laid together to form bundles, and are melted and/or otherwise connected at one end. Then the brush head is then heated, in particular to a glass transition temperature of its material. After that, advantageously bristle bundles can be introduced into the blind holes and can be anchored by pressing to the brush head. Herein the heated blind holes are in particular deformed, such that the bristle bundles get anchored in the blind holes. For this, for example, a known PTt method is feasible.

Alternatively or additionally to punched and/or welded and/or glued-on bristles, injection-molded bristles are also conceivable. These may in particular be manufactured during a multi-component injection-molding procedure together with the application unit, the handle unit and/or the fastening unit, or they may be injection-molded to a base body of the application unit later on. The injection-molded bristles are not to be mistaken for customarily extruded bristles, although the latter have similar dimensions. Due to the necessary unforming in the injection-molding tool, the injection-molded bristles have an essentially conical basic shape.

A further possible method for furnishing the brush head with bristles is twisting in. Herein, for example, a filament is fed in from a reel, wherein in particular several filament strands are wound on a reel. For machine loading in each case several reels are pre-tensioned because each filament in the brush corresponds to a filament strand. The filaments are correctly spread in regard to a width, such that they have the width in which they are inserted into the brush. The filaments are pulled forward in such a way that they are then exposed for the next step, which means that a wire can be guided above them. After that a wire is fed to the machine from a reel, i. e. the wire is wound off and is entered into the process. The wire is cut to a length that is greater than the wound-off length of the twisted-in bristle; the final cutting-to-length will be done after twisting-in. The wire is bent to form a U, such that the open side can then be pushed over the filaments in order to thread the bristles in. The wire is held at the bottom of the U. Then the open wire end is clamped such that the filaments are held between the wire portions. The filaments are cut to a length that is greater than the final length in the brush, such that the brush may be cut correctly later on when the filaments have been twisted in. The wire is rotated such that the filaments are clamped between the wire and are thus fixed. When the filaments have been fixed in the wire, they are cut to the correct length and profiled. After completion of the brush portion excess wire is cut off.

Preferably, during an injection-molding procedure, in particular a two-component and/or multi-component injection-molding, materials of injection-molded bristles do not enter into a substance-to-substance bond and/or material bond with other soft components and/or hard components of the hygiene product. Preferentially injection-molded bristles are instead connected to soft components and/or hard components via a form-fit connection, for example by at least one undercut and/or at least one breakthrough and/or via at least one at least partial overmolding, wherein in particular an atrophy connection and/or a shrinkage connection are/is conceivable. However, a connection at least via substance-to-substance bond and/or material bond is also conceivable.

For all injection-molding procedures mentioned principally a one-component, two-component and/or multi-component injection molding is conceivable. Herein, as has been mentioned, materials used, in particular materials consisting of different soft components and/or hard components, may be connected and/or get connected by substance-to-substance bond and/or by form-fit connection. It is also conceivable that articulate, respectively mobile or flexible connections are formed by means of suitable injection-molding steps. Principally, for example, hot-runner procedures, cold-runner procedures and/or co-injection-molding procedures are possible for the injection molding process.

Alternatively or additionally to a brush head furnished with bristles, the application unit may also comprise at least one tongue cleaner and/or at least one alternative cleaning and/or massaging element. These may in each case be implemented of a soft component, of a hard component, of a combination of soft component and hard component, and/or may advantageously be producible and/or produced via injection molding. Like the injection-molded bristles, the cleaning and/or massaging elements are produced in an injection-molding process. However, they differ from the injection-molded bristles by the considerably smaller Shore hardness of the component, respectively material, used. Moreover, cleaning and/or massaging elements have significantly more volume than injection-molded bristles.

Preferably injection-molded bristles are made at least partially, advantageously completely, of a thermoplastic polyurethane elastomer (TPE-U). Herein it is conceivable to use a modified polyurethane elastomer (TPE-U), which may be modified in particular with regard to improved flowing characteristics and/or quick solidification, in particular quick crystallization, advantageously already at rather high temperatures. Of course, other materials are also conceivable, for example thermoplastic polyester elastomers (TPE-E), thermoplastic polyamide elastomers (TPE-A), polyethylene (PE) implemented, for example, as low-density polyethylene (LDPE) or linear-low-density polyethylene (LLDPE) or the like. Materials for injection-molded bristles advantageously have a Shore D hardness of at least 0, especially advantageously of at least 30 and/or of maximally 100, advantageously maximally 80. In particular, a Shore hardness of a material of injection-molded bristles is advantageously higher than a Shore hardness of other soft components used, for example, for handle elements, massaging elements, further cleaning elements, or the like. The materials applied for a production of injection-molded bristles may be sustainable materials.

Principally a utilization of water-soluble polymers is also conceivable, for example for hard components, soft components, injection-molded bristles or other elements of the hygiene product.

For the hard component and/or for the soft component and/or for the material for injection-molded bristles and/or for the foamed material, it is also possible to use bio-plastics, which may in particular be obtained from sustainable raw materials, which may be biodegradable, in particular compostable, and/or may be implemented of a recycled and/or recyclable material. Preferably the material is in particular implemented by a synthetic material. Preferably the biodegradable, in particular compostable, and/or recycled and/or recyclable material is implemented by a bio-plastic, in particular a plastic based on sustainable raw materials and/or of a biodegradable synthetic material. The material may therefore in particular be fossil-based and biodegradable, like for example PVOH, PCL, PBAT, PET or PBS, or may be based on sustainable raw materials and biodegradable, like for example PLA, PHA, cellophane or amylum blends, or may be based on sustainable raw materials but not biodegradable, like for example Ca, Bio-PE, Bio-PP, Bio-PA, Bio-PET. Different bio-plastics, deemed expedient by someone skilled in the art, are conceivable, like for example amylum-based bio-plastics, cellulose-based bio-plastics, polyhydroxy-alkanoates, like in particular polyhydroxybutyrate (PHB), polylactic acid (PLA), aliphatic and/or aromatic copolyesters, or further bio-plastics, like for example lignin-based bio-plastics. The hard component and/or the soft component and/or the material for injection-molded bristles and/or for the foamed material is in particular implemented of a bio-plastic, which may in particular be obtained from sustainable raw materials. Raw materials may here in particular be corn, hemp, sugar, castor oil, palm oil, potatoes, wheat, sugar cane, caoutchouc, wood, the castor plant/castor bean and the like. Corresponding possible basic substances may be, for example, cellulose, amylum, lactic acid (PLA), glucose, chitin, chitosan or the like, from which in particular corresponding bio-plastics may be synthetized.

A "volume body" is in particular to mean, in this context, a body that forms the hygiene product partly and which is in particular made of a solid material. Preferably the volume body forms a voluminous structure of the hygiene product. Preferably the volume body is largely, in particular completely, made of a foamed material. By a "base body" is in particular, in this context, a body to be understood which forms the hygiene product partly and which is in particular made of a solid material. Preferably the base body forms a supporting structure, respectively the spine, of the hygiene product. Preferably the volume body is made largely, in particular completely, of at least one hard component. That "the at least one volume body is molded to the at least one base body" is in particular to mean that at least part of a molding of the volume body is done directly on the base body. In particular, the volume body is produced directly, in particular during production, on the base body, in particular around the base body. Alternatively or additionally, the volume body may be subsequently deformed, in particular densified, on the base body in order to create a form-fit connection. Preferably the volume body forms a form-fit connection and/or a substance-to-substance bond with the base body directly during production. In particular, the volume body is connected to the base body such that non-destructive separation is not possible. The volume body may alternatively be also connected to the base body in a form-fit and/or force-fit manner, e. g. via assembly.

It is also proposed that the at least one volume body encloses the at least one base body at least partially. Preferably the at least one volume body encloses the at least one base body at least partially in a region of the handle unit. "Enclose at least partially" is in particular to mean, in this context, that the base body is surrounded by the volume body in at least one plane, starting from a geometric center point of the base body in the plane, in an angle range of at least 180°, preferably at least 270° and particularly preferentially at least approximately 360°. Preferably the volume body encloses the base body completely in at least one plane. This in particular allows providing advantageously high-level ergonomics of the hygiene product. In particular, grasping of the volume body is enabled. Moreover, in particular an advantageous forming of the volume body, and thus of the hygiene product, is achievable. Furthermore, this in particular allows keeping a weight of the hygiene product at a low level, in particular without negatively affecting ergonomics, in particular a grippability, of the hygiene product. Beyond this a good connection between volume body and base body is enabled, which is favorable for a long service life of the hygiene product. The volume body may be realized in a multi-part implementation (e. g. of two, three, four or five parts) and may when connected to the base body surround the base body at least partially. When individual volume body parts are connected, the base body can be fixed in the composed volume body. In an assembled state, different parts of the base body may form hollow spaces.

Different arrangements of the foamed volume body, deemed expedient by someone skilled in the art, are conceivable. With respect to the entire hygiene product, the volume body may be arranged in individual subregions or in a combination of subregions, like the handle region, the neck region and/or the head region: for example in the handle region and in the neck region, in the neck region and in the head region, in the handle region and in the head region. Alternatively, the volume body may as well be arranged in all subregions, i. e. the handle region, the neck region and the head region of the hygiene product. As a result, there will in particular be a completely foamed product.

A surface of the foamed volume body in particular depends on a production process. Furthermore, the surface may be modified during the process. Longer and/or hotter vaporing will result in smoother and/or more homogenous surfaces, and the tool surfaces will be removed easier. In particular, a planar surface forms which has no special structures. Because of the grain size of the foaming, a too fine structure of the tool, in particular due to eroded surfaces, may possibly have no effect for rough grain sizes. Furthermore, etched or polished tool surfaces are also conceivable. Alternatively, it is also possible to create a combined surface in the tool, like for example eroded and etched surfaces. For example, polished edges and rough surfaces may be provided. It is further possible that structures are provided on a surface of the volume body. In particular, shapes, respectively structures, are conceivable which protrude from the surface by 0.1 mm to 2 mm, preferably by 0.5 mm to 1.5 mm, and/or shapes sunk in the surface by 0.1 mm to 2 mm, preferably by 0.5 mm to 1.5 mm. The structures, respectively shapes, in particular have a principally closed contour. It should in particular be avoided that the individual foamed grains are visible on the surface. The structured surface additionally reduces a water intake of the volume body. The structured surface permits better and safer handling of the hygiene product, also when it is used with water.

Different cross-section shapes are conceivable which are deemed expedient by someone skilled in the art, like for example circle-shaped, oval, circle-segment-shaped, polygonal, square, rectangular, rhomb-shaped and/or parallelogram-shaped. Furthermore, shaped patterns may be created on the surface of the volume body. Herein in particular a one-time arrangement, or a repetitive multiple-times arrangement of the patterns is conceivable. In particular, partial arrangement of structures on the volume body is conceivable. The structure may herein in particular be provided in one place or in several places. The structure may furthermore be provided on one side, on two sides or around the body. A surface of the injection-molded parts, in particular of the base body, is possible, in particular in accordance with current standards. The volume body may have different roughnesses of structures in different places. Moreover, subregions having an essentially smooth surface may be provided.

The hygiene product in particular comprises a voluminous handle. Preferably the handle unit is implemented at least partially by the volume body. This in particular allows attaining the same weight or less weight than in a case when, with the same size, only hard components, respectively soft components, are used. Furthermore there are less problems with sink marks than with large-volume injection-molded parts. The volume body in particular has a volume of 10 cm³ to 70 cm³, preferably of 15 cm³ to 50 cm³. Preferably the foamed volume body forms 60% to 90%, preferably 70% to 85%, of a total volume. By the foamed volume body in particular weight saving is achieved. Preferably, with a purely foamed toothbrush handle it is possible to save 70% to 95%, preferably 80% to 90%, in weight relative to a toothbrush of the same volume that is made of a hard component and/or a soft component and has been purely injection-molded. With a combined toothbrush handle, it possible to save in particular 50% to 75%, preferably 50% to 65%, in weight relative to a toothbrush of the same volume that is made of a hard component and/or a soft component and has been purely injection-molded. Preferentially the hygiene product has a weight of 3.5 g to 12 g, preferably of 6 g to 10 g. A percentage of the foamed portion with respect to the total weight is herein in particular in a range from 5% to 50%, preferably from 15% to 25%. With a purely foamed handle, a maximal circumference (around the length axis) of the handle unit is in particular in a range from 5 cm to 12 cm, preferably from 7 cm to 10 cm.

The situation of the center of gravity of the hygiene product, measured from the rear end, is in particular in a range of 100 mm to 170 mm, preferably of 120 mm to 150 mm. In terms of percentage, the center of gravity is in particular, measured from the rear end, in a range of 50% to 80%, preferably of 60% to 75% of the total length. The changed situation of the center of gravity permits completely different dynamics in the application of the hygiene product and, according to the majority of the test persons, feels particularly comfortable.

A material thickness of the base body in a region in which foamed parts are assembled is in particular 3 mm to 10 mm, preferably 3.5 mm to 7 mm, in order to obtain sufficient stability together with the foamed part. A layer thickness of the foamed volume body is in particular 3 mm to 30 mm, preferably 3 mm to 20 mm. A minimal layer thickness of the foamed volume body herein in particular depends on the granulate that is used therefor. However, large wall thicknesses are not critical.

The injection-molded base body may have different cross-section shapes which are deemed expedient by someone skilled in the art, like for example H-shaped, rectangular, U-shaped, cross-shaped and/or star-shaped, in each case having angular or rounded edges. Preferably, the cross section herein in particular forms essentially in a longitudinal direction. The cross section can be used only in subregions of the base body. Preferably the base body has symmetrical shapes with respect to the length axis. The shape of the base body may in particular be combined via contours for a force-fit and/or form-fit connection with the volume body, in particular with form-fit elements, like for example a protruding disc, a protrusion, a deepening, a breakthrough, or the like. Furthermore, method-specific elements may be used for functions at the product. Thus it is, for example, conceivable that holding structures are formed by vapor outlets, for example in the sprue, or vapor outlets. Vapor outlets may, for example, form surface structures. For example, the surface structures may be arranged selectively as a thumb grip. Herein it would in particular be conceivable that vapor outlet valves are modified such that the forms are capable of providing the required function.

Preferably the base body is shaped in such a way that the foamed volume body can be separated from the base body, for example for proper disposal. A separation may be realized, for example, by cutting or tearing/pulling off. Predetermined rupture points may be provided for the separation. These can be ruptured manually or with simple tools that are available in a household. If the volume body is composed of several parts, it is preferably separable into these parts.

It is further proposed that the at least one base body comprises at least one form-fit element, which forms a force-fit and/or form-fit connection with the at least one volume body. A "form-fit element" is in particular to mean, in this context, an element of the base body that is configured to protrude into the volume body or to form a recess for the volume body to protrude into. Preferably the form-fit element forms a projection and/or a deepening, extending at least substantially perpendicularly to a main extent direction of the hygiene product, and is configured for a form-fit fixing of the volume body parallel to a main extent direction of the hygiene product. By a "form-fit connection" is in particular to be understood that adjoining surfaces of components that are connected to each other in a form-fit manner exert a holding force onto each other that acts in the normal direction of the surfaces. In particular, the components are in a geometrical engagement with each other. The form-fit element may in particular be realized as a projection, like for example a pin, a web and/or a disc, as a tapering and/or as a breakthrough. In this way in particular an advantageously stable connection can be realized between the base body and the volume body. In this way forces acting during a designated utilization of the hygiene product are transmitted from the base body to the volume body without involving a separation of the base body and the volume body. In particular, a substance-to-substance bond may be done without. This in particular enables separate disposal. Furthermore, it is in this way in particular possible to provide an advantageously stable hygiene product. As a result, it is in particular possible to avoid tolerances occurring between the base body and the volume body due to the forces exerted with the intended usage of the hygiene product (e. g. brushing teeth and the pressure onto the brush head this creates), or at least to keep such tolerances smaller than if no form-fit elements were used. Of course, form-fit elements are in particular expedient if no substance-to-substance bond and/or material bond is provided between the base body and the volume body.

Moreover it is proposed that the handle unit comprises at least one cage element, which engages around the at least one volume body at least partially. Preferably the at least one volume body at least partially realizes a form-fit connection with the cage element. In particular, the volume body is produced in the cage element. Particularly preferentially the cage element at least partially cuts into the volume body. It is also possible that the cage element is situated completely within the volume body as an anchoring structure and does not protrude from the volume body. In that case, at least the application unit, which is formed integrally with the cage element, protrudes from the volume body. By a "cage element" is in particular, in this context, an element to be understood which encloses the volume body at least partially. Preferably the cage element extends over an essential portion of a main extent and/or transversal extent of the volume body, wherein the cage element in particular covers less than 50%, preferably less than 30% and particularly preferentially less than 15% of an outer surface of the volume body. Preferentially the cage element forms a lattice structure that extends at least partially around the volume body. A "transversal extent" is in particular to mean, in this context, an extent of a component that extends parallel to a width of the hygiene product and perpendicularly to the main extent direction of the hygiene product. Furthermore, a "main extent" is in particular to mean an extent of a component along the main extent direction. Moreover, an "essential portion" is in particular to mean, in this context, at least 30%, preferably at least 50% and particularly preferentially at least 70% of a total. This in particular allows realizing a stable arrangement of the volume body. Furthermore, it is in particular advantageously possible to protect the volume body. In particular, a dimensional stability of the volume body can be ensured. It is furthermore possible to provide an advantageously stable hygiene product.

It is also proposed that the at least one cage element is directly and fixedly connected with the at least one base body. Preferably the cage element is in particular made of the same material as the base body. Preferentially the cage element is implemented integrally with the base body. The base body and the cage element are in particular produced from one cast. "Integrally" is in particular to mean at least connected by substance-to-substance bond, for example by a welding process, a gluing process, an injection-molding process and/or a further process that is deemed expedient by someone skilled in the art, and/or advantageously formed in one piece, like for example by a production from a cast and/or by a production in a one-component or multi-component injection-molding process, and advantageously from a single blank. This in particular allows realizing a stable connection between the base body and the volume body. Furthermore, it is in particular possible to keep a number of components low. Moreover, this in particular allows providing an advantageously stable hygiene product.

Beyond this it is proposed that the hygiene product comprises at least one enveloping body, which encloses the at least one volume body at least partially and which is connected to the at least one volume body in a force-fit manner and/or by substance-to-substance bond. Preferably the enveloping body is connected to the volume body by substance-to-substance bond. Preferentially, during production the enveloping body enters into a substance-to-substance bond with the volume body and/or with the base body. By an "enveloping body" is in particular, in this context, a body to be understood which partially forms the hygiene product and which is in particular implemented of a solid material. Preferably the enveloping body at least partially forms an outer envelope of the hygiene product. Preferentially the enveloping body encloses the volume body and/or the base body at least partially. In particular, the enveloping body forms at least partially an outer surface of the hygiene product. Preferably the enveloping body is largely, in particular completely, implemented of a soft material. "Connected in a force-fit manner" is herein in particular to mean a releasable connection wherein a holding force between two components is preferably transferred via a friction force between the two components. "Connected by substance-to-substance bond" is in particular to mean that the mass particles are held together by atomic or molecular forces, which is for example the case with soldering, welding, gluing and/or vulcanization. This in particular allows providing an advantageous outer surface of the hygiene product. It is furthermore in particular possible to create— despite the volume body—an advantageously even surface of the hygiene product.

It is further proposed that the at least one enveloping body is implemented at least partially of a soft component. Preferably the enveloping body is implemented completely of a soft component. This in particular allows providing an advantageous outer surface of the hygiene product. It is furthermore in particular possible to create an advantageous even surface of the hygiene product despite the volume body. In particular, advantageous slip resistance of the hygiene product is enabled. This allows providing advantageous grippability. A high level of ergonomics can be provided.

Moreover, it is proposed that the at least one base body is implemented at least partially of a hard component. Preferably the base body is implemented completely of a hard component. This in particular allows providing advantageously high stability of the hygiene product. It is possible to provide high-grade ergonomics and stability.

It is furthermore proposed that the hygiene product comprises at least one enveloping body which penetrates the at least one volume body at least partially and which is connected with the at least one volume body and/or base body in a force-fit manner and/or by substance-to-substance bond. While the enveloping body cannot enter into a substance-to-substance bond with the volume body, it can do so with the base body. Preferably the volume body has at least one recess and/or at least one gap which the enveloping body is arranged in. Particularly preferentially the enveloping body may extend through the volume body as far as the body. By a "penetrating enveloping body" is in particular, in this context, an enveloping body to be understood which is in at least one plane delimited by the volume body in at least two opposed directions. Preferably, in a production process the enveloping body is directly introduced into a recess and/or a gap of the volume body, the enveloping body being in particular delimited directly by the volume body after production. This in particular allows providing gripping surfaces on the hygiene product which are advantageously haptically comfortable. It is in particular possible to provide different surfaces and/or strengths and/or Shore hardnesses of the hygiene product. This in particular allows providing advantageously high-grade ergonomics.

Beyond this it is proposed that the base body and the volume body are in particular produced independently from each other, and the two bodies are mounted subsequently. In an implementation variant, the interface region between the base body and the volume body is in particular formed as a cylindrical blind hole in the volume body and as a barb structure in the base body. In mounting, the base body is pressed with its barb structure into the blind hole of the volume body. Herein the abutment body on the base body ensures that during the mounting the base body is not pressed into the blind hole too strongly. This also prevents the base body from being pressed too far into the blind hole during application. By means of the barb structure, the base body gets anchored in the blind hole and is removable only in a destructive manner, i. e. the structure is ruptured and further mounting is impossible.

Principally, the barb structure may be implemented in different ways. Preferably a symmetrical structure is realized, which is formed completely around a portion of the base body that is inserted into the blind hole. The barb structure may be realized over the entire portion of the base body that is inserted into the volume body or only over a sub-portion of the portion. The structure may also be formed in several spaced-apart subregions of the introduced geometry.

In the region of the portion of the base body that is introduced into the volume body, a geometry may be inserted over the entire region or over a subregion or several subregions thereof, which unambiguously defines the orientation of the base body with respect to the volume body. The geometry may continue over the barb structure or may be realized in several parts. The geometry may, for example, be realized in a combination of ridge and groove.

The abutment body is implemented having a diameter that is larger than the diameter of the blind hole, such that the abutment body is not introducible into the blind hole. Herein the abutment body may be arranged completely around the base body, respectively the portion of the base body that is introduced into the blind hole, or may take up only subregions. If the abutment body is realized only in partial regions, the partial regions are preferably arranged symmetrically or regularly around the length axis of the body that is to be inserted. For example, circle segments are formed.

The implementation of the cooperation between the base body, respectively its abutment body, may be realized in different manners. The abutment body may quasi lie upon the volume body, then only the side of the abutment body facing directly toward the volume body adjoins the volume body. Alternatively, the volume body may be provided with recesses which receive the abutment body. As a result, the abutment body may be sunk in the recess to such a length that only one of its sides still forms part of the surface of the final product and the remaining side surfaces are accommodated in the recess.

For a further securement of the base body, an adhesive substance may be applied for connecting the base body in the blind hole of the volume body. The adhesive substance is applied accordingly between the blind hole, respectively its walls, in the volume body and the base body. Furthermore, in these places for example supportive welding (i. a. ultrasound welding) may be applied.

It is moreover proposed to produce the base body and the volume body independently from each other and to mount the two bodies subsequently. The volume body may consist of several parts. Herein a base body is produced in an injection-molding process and the foamed volume body, which is for example implemented of two parts, is mounted to the base body. The base body forms at least the head region and the neck region of a toothbrush, and continues further to the handle unit. It may thus be formed over the entire length of the toothbrush or only over a portion of its length. The base body is herein preferably implemented of at least one hard component and may contain further hard components and/or soft components. The multi-part volume body is made of a foamed material.

In the neck region and head region, the base body preferably forms the final shape of the product, respectively it forms the body to such an extent that furnishing with bristles can be executed without further machining/mounting of foamed elements. The base body herein preferably already has the final shape when it is completed in the injection-molding process.

The different parts of the volume body, when mounted to the base body, form the handle unit. The volume bodies herein form the essential portion of the surface of the handle unit while the base body forms few surface portions or no surface portions at all, depending on its implementation. The percentage of the base body relative to the surface of the finished product is between 0% and 40%, preferably 0% to 20%.

In the finished handle region, the base body may form an at least partially circumferential strip. The strip may be formed around an axis that is situated at substantially 90° with respect to the length axis, or may be formed substantially around the length axis. Principally, however, other angles of the arrangement of the strip are possible, in any case under the condition of a producibility of the base body in the injection-molding process, the producibility of the respective volume bodies and the mountability of the base body with the volume bodies. The strip may herein be realized in an uninterrupted manner or in an interrupted manner. Depending on an implementation of the strip, it may be possible to increase the number of parts of the volume body in order to enable a mounting of the base body with the volume bodies.

The parts of the volume body may be realized in different manners. For example, in the case of a toothbrush a thumb grip may be molded on a part facing toward the front side while the volume body facing toward the rear side rather forms an ergonomic total shape of the handle region. The thumb grip may herein be implemented in the shape of a deepening or a hollow, or may simply have different surface properties, and/or may have a surface structure. Moreover, the volume bodies may also be formed from different materials and/or in different colors.

In the finished product the volume bodies are mounted to the base body. The base body may herein be completely or partially enclosed in the handle region. If it is only partially enclosed, preferably certain surface portions are formed by the base body. If the base body is completely enclosed, it is in the handle region arranged invisibly within the volume bodies.

The base body and/or parts of the volume body are fixed to one another by means of a force-fit and/or form-fit connection. Fixing elements, like pedestals and grooves at the volume bodies, are brought together with recesses and ridges of the base body. Pedestals and recess make pairs, and grooves and ridges also make pairs. In the assembled state, parts of the volume body and/or the base body may together form hollow spaces.

The base body is in the handle region provided with connection elements, for example recesses, and anti-twist elements, for example ridges. The ridges serve for a better stabilization of the volume bodies against a twisting relative to the base body. Thus they receive rotary forces and they also serve for a more stable implementation of the base body. The recesses are preferably realized as through-holes. They are arranged on both sides of the length axis of the base body. Their number depends on the length of the volume bodies which are to be fastened; on each side of the length axis between 3 and 12, preferably between 4 and 10, recesses are implemented. The length and width of the recesses may be identical over the entire base body or may vary. The recesses have a width of 3 mm to 8 mm, preferably of 4.5 mm to 6.5 mm. Their length is between 4 mm and 12 mm, preferably 6 mm to 9.5 mm. The through-holes have wall geometries which are adapted to the insertion of the pedestals of the volume bodies. They are in each case realized identically in an insertion direction. Viewed in the insertion direction, an insertion slope is formed, which includes an angle with the normal that is in a range from 5° to 20°, preferably in a range from 8° to 15°. This is followed by a portion that includes a smaller angle with the length axis, this angle is in a range from 1° to 10°, preferably in a range from 2° to 6°. After this there is an opening-up portion which is oriented away from the normal, the angle included with the normal is here in a range from 15° to 35°, preferably in a range from 20° to 30°.

The ridges may be arranged in a longitudinal manner and/or in a transversal manner. The shape of the ridges is rectangular in its cross section, this serves for optimally receiving the forces. The longitudinal ridges are on the front side and on the rear side situated in identical planes. The ridges have a width of 0.8 mm to 2.5 mm, preferably of 1 mm to 1.8 mm. The height of the ridges varies and may be between 1 mm and 8 mm, preferably between 2 mm and 6.5 mm.

The measurements of the pedestals correspond to the measurements of the recesses plus an addition. For achieving a force-fit and/or form-fit connection, the addition, respectively the interference fit, is between 0.05 mm and 1 mm, preferably between 0.1 mm and 0.5 mm. The height of the pedestal is between 1.5 mm and 4 mm, preferably between 2 mm and 3 mm.

The pedestals at the volume bodies are realized in such a way that, compared to the base body, respectively one position is left out. This means that the pedestals of the volume bodies alternate in the longitudinal direction. Thus, in the mounted state the pedestals alternate in the base body. For example, if there is respectively one volume body on the front side and on the rear side, the pedestals are realized alternatingly, such that the pedestals of the front side and the pedestals of the rear side enter the base body alternatingly.

The recesses in the base body receive the pedestals of the volume bodies, thus fixing the bodies to each other. The pedestals and the recesses are adapted to one another in such a way that a force-fit and/or form-fit connection is created between them. Due to the basically symmetrical implementation, in the cross sections (perpendicularly to the length axis) there are in each case pedestals of both volume bodies. These are situated side by side, separated by the ridge.

In the case of shell-like implementations of the volume bodies, in the mounted state the handle units may also have hollow spaces formed by the shell-like volume bodies.

Alternatively, the base body may also be realized in a planar fashion, having no penetrating recesses. Herein it may have reinforcing ribs, providing it with the required stability. The reinforcing ribs may be implemented analogously to the aforementioned ridges (among others, with respect to shape and measurements). Furthermore, connection elements may be provided, enabling a mounting of the volume bodies. The connection elements may herein be realized as independent elements or may, for example, also be realized in a connection with the reinforcing ribs. The connection elements may herein be formed, for example, as a cooperation of several reinforcement ribs which, for example, clamp the volume body, respectively a protruding or exposed element of the volume body (e. g. a ridge), between them. Herein the reinforcement ribs may be provided with an insertion slope on those sides on which the volume body is to be held. Due to cooperation between two reinforcement ribs, the insertion slopes are oriented opposed to each other. This enables favorite insertion of the volume body. The insertion slopes run towards each other in the insertion direction and realize a minimal distance from each other in a culmination point; after this, the distance between the reinforcing ribs widens. In this way the volume body is held by the undercut formed after the culmination point.

Connection elements may—in a manner already known—also be hollow-cylinder-shaped elements on the base body which cooperate with corresponding elements (studs) on the volume body. These are inserted into each other and may thus be fixed with each other. Herein further or different latching elements/connection elements may be realized.

Alternatively, the volume body may also be glued to a base body that is implemented at least partially in a planar fashion.

In a further possible planar implementation of the base body, the base body forms a half-shell-like structure in the handle region. In the final product this may be arranged, for example, on the front side or on the rear side. By way of the half-shell-like structure something like a recess is formed, in which the volume body can be mounted. Herein the base body as well as the volume body form relevant portions of the surface of the final product. Due to an implementation in this manner, for example, a base body produced in a multi-component procedure may comprise elements which are made of a soft component and improve haptics/ergonomics. For example, a thumb grip may be formed with a soft component if the planar base body forms the front side in the final product.

In this implementation it is in particular also possible that in the final product a hollow space is created between the planar base body and the volume body. Herein the volume body is connected to the base body in the peripheral regions, such that a hollow space is formed in the interior between the base body and the volume body. The hollow space is herein preferably closed, having no opening to the outside. In order to achieve a tight hollow space, the base body and the volume body may be glued to each other.

It is further proposed that the application unit is implemented at least partially by the volume body, which is in a region of the application unit densified at least section-wise, in particular subsequently. Preferably a foamed material of the volume body is at least section-wise densified after production of the volume body. In the densification in particular a density of the volume body is at least section-wise increased. In particular, in the densification a gas stored in the foamed material, e. g. as air, is replaced, respectively discharged. This in particular allows providing advantageously high strength of the application unit. In addition, densified zones may have different physical and mechanical characteristics than other zones of the volume body. This in particular enables, for example, reliable fixing of cleaning elements, like in particular bristles. In this way also a flexible zone or a hinge zone may be provided.

Moreover, it is proposed that the handle unit is implemented at least partially by the volume body, which is in a region of the handle unit densified at least section-wise, in particular subsequently. Preferably, after the production of the volume body a foamed material of the volume body is densified at least section-wise in a region of the handle unit. This in particular allows providing advantageously high strength of the handle unit. In particular, subsequent contouring of the handle unit may be provided. It is in particular possible to produce complex shapes which are, for example, not realizable during production of the foamed material. In this way a modification of the surface structure, respectively surface properties, is also achievable.

Beyond this it is proposed that the hygiene product comprises at least one bristle platelet, which is inserted in a recess of the application unit. The bristle platelet is in particular furnished with bristles and/or alternative cleaning elements (for example injection-molded bristles and/or massaging and cleaning elements made of a soft material). For this purpose, first of all bristle platelets with through-holes or blind holes are manufactured in particular via injection molding, through which, respectively into which then bristles and/or alternative cleaning elements are passed. Preferably the bristles are then connected to the platelet by the methods described, like AFT, PTT or anchor punching. Preferably the application unit is realized in a densified manner in a region of the recess. Preferentially the application unit is in a region of the recess implemented at least partially of the foamed material. This in particular enables advantageously simple and reliable fastening of the bristle platelet with the cleaning elements, which are in particular implemented as customary extruded and/or injection-molded bristles, or as cleaning or massaging elements made of a soft material. It is in particular possible to provide an advantageously stable hygiene product.

It is furthermore proposed that the hygiene product comprises a bristle bundle, which is connected to the application unit by punching. The bristle bundles are preferably processed, in particular fastened to the application unit, at least via an anchor-punching method or the like. Preferably a bristle carrier of the application unit comprises a plurality of bristle receptacles, in particular holes for bristle bundles, which are in particular drilled and/or molded in a casting process and/or in a particle foam method. In the case of anchor punching, it is for example conceivable that first a base body, preferably of the brush head, is manufactured by means of a casting process and/or a particle foam method, wherein advantageously blind holes for bristle bundles are formed in the casting process and/or by the particle foam method. However, subsequent drilling of blind holes is of course also conceivable. Preferably then bristles, respectively bristle bundles, are folded and are in each case fastened in a respective blind hole by means of at least one anchor, in particular by punching-in. Sling punching is also conceivable. This in particular allows achieving advantageously simple and reliable fastening of bristle bundles. It is in particular possible to provide an advantageously stable and reliable hygiene product.

The invention is furthermore based on a method for a production of the hygiene product. It is in particular proposed that in at least one method step the volume body is molded to the base body directly by means of a foaming method, in particular by means of a particle-foam method. Preferably at least part of a shaping of the volume body is realized directly on the base body. Preferably, in a shaping of the volume body, the base body in particular delimits a shape-defining hollow space of a shaping tool for the volume body. Particularly preferentially the volume body is manufactured at least partially around the base body. In particular, the volume body is manufactured directly, in particular in production, on the base body, in particular around the base body. Preferably the volume body generates a form-fit connection and/or a substance-to-substance bond with the base body directly during production.

The particle-foam method, in particular also denominated particle foaming or styrofoam method, in particular realizes physical foaming, in which the material is foamed via a physical process. In the particle-foam method in particular expandable synthetic material is used, like for example polystyrene (PS) implemented as expanded polystyrene (EPS) or polypropylene (PP) implemented as expanded polypropylene (EPP). In a first step of the particle-foam method, in particular the raw material, implemented as beads and/or globules, is placed into a mold, the hollow space is filled. Then steam is injected under pressure and at a high temperature through different small openings in the tool and/or in the cavity. This heat input results in an expansion and sintering of the beads, which connect on their surfaces. After that, a water content must be reduced, for example in a tempering oven. To give a detail: In the particle-foam method, in particular in a first method step, the granulate is supplied in a pressure-load container and/or pressure-filling apparatus. Following this, in a second method step or parallel, a foaming mold is closed. The foaming mold in particular defines a shape of the volume body by a hollow-space shape. Then, in a third method step, the foaming mold is filled from the pressure-load container and/or pressure-filling apparatus. When the material is entered, the pressure is in particular in a range of 0.5 bar to 3 bar, preferably of 1 bar to 2 bar. In a further method step the foaming mold is—if required—deaerated, in particular by means of a vacuum. Then the contents of the foaming mold are in particular vapored in a further method step.

A vapor pressure is in particular up to 40 bar, preferably up to 25 bar and particularly preferentially below 5 bar. The vapor pressure and the vapor temperature are in particular linked as higher temperatures will bring higher pressures with them. The vapor temperature is in particular up to 250° C., preferably up to 170° C. and particularly preferentially up to 150° C. Furthermore, the vapor temperature is in particular at least 80° C. The duration of the vapor-blasting is in particular 20 s to 50 s, preferably 25 s to 40 s. Herein in particular the granulate, respectively the beads, are/is welded. A material expansion in particular amounts to 20 times to 100 times, preferably 40 times to 80 times, the original volume. Optionally this may in particular aided by a vacuum, such that vapor may enter more easily. There are recent foams which are in particular producible without vapor. This is in particular based on an RF technology, in which the foaming is realized using energy implemented as electromagnetic waves. The welding is thus in particular realized from an interior of the foamed volume body to an outside, resulting in improved product quality. Furthermore, a respective RF technology is more efficient in terms of energy and requires less processing input. After this the foaming mold is cooled, such that the granulate is stabilized and/or fixed. The cooling is effected in particular via a hollow-space system with water (sprayed water) by the same channels as the vapor input was made. Then the foaming mold is opened in a further method step. The cycle times of the foaming method are in particular in a range of 60 s to 200 s, preferably in a range of 80 s to 120 s. Depending on a size of the granulate, the particle-foam method involves a minimal wall thickness of the volume body. The minimal wall thickness is in particular 3 mm. Furthermore, it is in particular conceivable that the volume body is after production in interim storage, thus allowing discharge of, for example, residue of the expanding agent, in particular of pentane. It is also conceivable that the material is pre-foamed. In particular, the raw material may be produced separately as beads and/or globules. For this, the expandable synthetic material is in particular produced—with the addition of expanding agents, like for example hydrocarbon and/or pentane—by suspension polymerization (bead polymerization). A granulate size may herein in particular be in a range of 0.2 mm to 0.3 mm. Aided by water vapor, the expandable synthetic material is pre-foamed, in particular at temperatures from 80° C. to 110° C., in particular up to an 80-fold volume. For this in particular pre-foamers are used, which work discontinuously or continuously. Herein the water vapor diffusing into the cellule walls supports the foaming process. This in particular allows manufacturing a hygiene product having advantageous characteristics with regard to ergonomics of the hygiene product. In particular, advantageous grippability and comfortable haptics as well as improved slip resistance of the handle unit are achievable. Furthermore, this in particular allows keeping a weight of the hygiene product low, in particular without affecting ergonomics, in particular grippability, of the hygiene product. In particular, a material input for the hygiene product can be kept at a low level. This in particular allows providing an advantageously ecological hygiene product without dispensing with an ergonomic, comfortable handle unit.

Preferably the shaping tool for the volume body is implemented by at least one foaming tool mold. The foaming tool mold in particular has at least one gate mark, respectively inlet. In a symmetrical volume body, the gate mark is preferably situated centrally on the symmetry axis. The gate mark is in particular arranged between the vapor inlets and outlets. The gate mark is preferably concealed or is placed in such a way that it does not cause bother, in particular, for example, on the length axis centrally at a rear end. Furthermore, structures may be realized in the foaming tool mold. For example, in one and the same mold different surfaces may be realized, eroded surfaces and/or structured surfaces. It would also be conceivable that the foaming tool mold is partially tempered differently. In particular, different heating zones and/or different cooling zones may be realized. The surface temperatures in the tool preferably correspond to the vapor temperature. If there is subsequent cooling, the foaming tool mold is in particular also cooled. Furthermore, for the foaming tool mold it is in particular necessary to consider the arrangement of the vapor inlet points and outlet points. The arrangement is in particular crucial for surface qualities and component properties of the volume body. Errors that may occur are in particular air pockets or wrong sintering. In particular, a vapor inlet as well as the vapor outlet is visible in the final product, in particular implemented as valve-like inserts. In the subsequent volume body, the vapor inlet points and the vapor outlet points are preferably not visible from the outside, therefore the vapor outlet points are preferably arranged in regions which are not functional. Preferably the vapor outlet points are arranged on the underside of the volume body. The softness of the material of the volume body furthermore permits rather large undercuts compared to the injection-molding process. The foaming tool mold is preferably made of metal.

Alternatively or additionally, other foaming procedures, deemed expedient by someone skilled in the art, are also conceivable. An alternative foaming procedure is, for example, chemical foaming. In chemical foaming an expanding agent, implemented as a powder or as a granulate, is added to the synthetic material. This chemical additive decomposes while discharging a gas, in particular mostly carbon dioxide, during the plastification of the synthetic material with increasing temperature. In this case the gas also gets soluted in the melt while a minimal pressure is maintained. The further course of the procedure corresponds to physical foaming. An advantage of this procedure is that no special installation technique is required. A further alternative foaming method is, for example, mechanical foaming.

It is moreover proposed that in at least one method step, the at least one enveloping body and/or the at least one base body are/is molded to the volume body by means of an injection-molding process. Preferably the at least one enveloping body and/or the at least one base body and the volume body are produced in a particle-foam composite injection-molding process. Particle-foam composite injection-molding is a technology in which a foamed molded part is non-releasably connected with a synthetic material in an injection molding. Preferably, in a first step the volume body is produced, for example from an expanded polypropylene (EPP). Preferentially the volume body is then laid into a cavity of an injection-molding tool. After this the injection-molding tool is in particular closed and a plastic component of the enveloping body and/or of the base body is injection-molded onto the volume body. Because of injection molding having a higher melting temperature, respectively the melt having a temperature that is higher than a melting temperature of the foamed volume body, defined melting of the foamed volume body will in particular result in a firm mechanical substance-to-substance bond. Preferably the at least one enveloping body and/or the at least one base body is connected to the volume body by substance-to-substance bond. In addition, form-fit connections may be created. Optionally, for example, the foamed volume body may be overmolded with a soft component. This in particular allows combining the positive characteristics of particle foams with the positive characteristics of the thermoplasts, such that in particular a functional lightweight component is created. In particular, a variety of method options and/or method combinations is conceivable. It is in particular possible that an existing part is overfoamed. In particular, a foamed part may be overfoamed. In particular, this provides the possibility of combining different foam components, like for example hard and soft foam components and/or for example foam components with different basic substances (basic plastic components being, for example EPS with EPP). The two foam material components may herein in particular enter into different connections, like in particular a substance-to-substance bond or preferentially a force-fit and/or form-fit connection. Alternatively it is also conceivable that an injection-molded part is overfoamed. Herein in particular an injection-molded part is created, which is then overfoamed. The injection-molded part may be a base body. The connection options between different parts herein in particular depend on a combination of materials. Thus in particular chemical connections (substance-to-substance bond, material bond) and/or mechanical connections (force-fit/form-fit connection) of the parts can be realized. This in particular allows providing an advantageous, in particular hygienic, outer surface of the hygiene product. It is furthermore in particular possible to create an advantageously even surface of the hygiene product despite the volume body. In particular, advantageous slip resistance of the hygiene product can be created. This allows providing advantageous grippability. High-grade ergonomics may be provided.

In particular, different method variants and production sequences, deemed expedient by someone skilled in the art, are conceivable.

In a first variant, for example, the volume body may be manufactured by foaming. The volume body may be embodied in a multi-part implementation. The foamed volume body may then be laid into an injection-molding tool and a hard component, in particular the base body, may be injection-molded around the foamed volume body. Following this, optionally the hard component, in particular the base body, may be overmolded with a soft component, in particular the enveloping body, and/or with a material component for injection-molded bristles, and/or the foamed component may be overmolded with soft components.

In a second variant, for example, the volume body may be manufactured by foaming. The foamed volume body may then be laid into an injection-molding tool and the foamed volume body may be manufactured with a hard component and/or a soft component in a cavity. When the hard component and the soft component are processed, the respective volumes, respectively zones, of the hard component and the soft component are preferably separate, which means they do not contact each other. Optionally, in particular together with the production of the hard and the oft components, the foamed volume body may be overmolded with material components for injection-molded bristles.

In a third variant, for example, the base body may be manufactured by injection-molding. The base body may then be laid into a foaming tool and may be overmolded with the foamed material for the volume body. Preferably the base body comprises at least one sub-geometry, which prevents rupture by favorable anchoring and/or connection structures and holds the parts together. An example for application could be, for example, a toothbrush handle, which is in particular implemented as a base body (e. g. an injection-molded stick) with a volume body that is molded thereto, and/or an injection-molded cage structure with a volume body that is molded through or to the cage structure.

In a fourth variant, for example, the base body may be manufactured by injection-molding. Alternatively, a body implemented of a non-synthetic material (e. g. a mechanically machined body, a body made of wood, metal or glass, etc.) may be manufactured as a base body. The base body may then optionally be overmolded, respectively mounted, with a soft component, in particular the enveloping body. By means of the soft component for example a thumb grip and/or a tongue cleaner may be formed. After that the overmolded or mounted base body is laid into a foaming tool and the base body is overmolded with the foamed material for the volume body.

In a fifth variant, for example, the base body may be manufactured by injection-molding. Alternatively, a body implemented of a non-synthetic material (e. g. a mechanically machined body, a body made of wood, metal or glass, etc.) may be manufactured as a base body. The base body may then optionally be overmolded, respectively mounted, with a soft component, in particular the enveloping body. By means of the soft component, for example, a thumb grip and/or a tongue cleaner may be formed. After that the foamed volume body may be manufactured separately and may be mounted to the base body and/or at least partially around the base body. The volume body may be embodied in a multi-part implementation, i. e. of 2, 3, 4, 5 or more separately produced foamed parts of the volume body. Following a mounting, the volume body may enclose the base body at least partially. The base body may be provided with a barb structure for fixing the volume body. The base body may be equipped with an abutment body. The volume body may be equipped with a blind-hole-like recess for receiving the base body. The base body may be equipped with recesses and with anti-twist elements, like recesses and ridges. The volume body may be equipped with recesses and pedestals.

In a sixth variant, for example, the volume body may be manufactured by foaming. The volume body may be implemented of one or several foam component/s. Optionally, the foamed volume body is subsequently at least partially densified.

In a seventh variant, for example, the volume body may be manufactured from a hard component by foaming. Optionally, a further body, which is in particular made of a soft component, may be molded to the volume body subsequently. The foamed volume body may then be laid into an injection-molding tool, and may be overmolded with a hard component, in particular the base body.

In particular, different method variants are conceivable. For example, an overmolding of small parts may be executed in the method. This may in particular be used in the foaming application variants. In particular, an inlay may be overmolded. Herein the inlay is in particular placed into a foaming mold, and the inlay is overmolded. Possibilities for such an inlay are, for example, transparent windows, thumb-grip elements, plastic platelets with or without cleaning elements, film hinges, application units with razor blades and/or functional parts with an interface, respectively connection options, to a further part. However, alternatively a mounted part would also be conceivable. For this corresponding interface geometries would have to be created which allow mounting.

A further method variant is in particular foam-backing. Herein in particular a foil and/or a fabric may be foam-backed, in particular in order to obtain a smooth surface, in particular when using a foil, or to obtain a fabric surface, respectively a textured or structured surface, in particular using a fabric. With back-foaming, in particular only one side is overmolded while a second side is realized so as to be at least partially exposed. In addition, it would be conceivable that a special surface enabling adhesion is realized on the foil or the fabric. For example, a polypropylene-backed foil may be designed for an adhesion with a polypropylene foam.

Combinations of the mentioned method variants are also possible.

Preferably, in the case of injection-molding subsequent to foaming, in particular onto the foamed volume body, the method parameters differ from customary injection-molding parameters. In particular, pressure conditions must be adapted to the component and to the geometry of the volume body that is to be overmolded, so as to prevent destruction of the volume body by pressure. In the case of a soft component, the temperature conditions are in particular 150° C. to 250° C., preferably 180° to 230° C. In the case of a hard component, the temperature conditions are in particular 180° C. to 290° C., preferably 210° C. to 260° C. In particular, a selection of material and/or of material parameters is expedient with good flowing characteristics at low pressure and low temperatures. Preferably, in the injection-molding process the gate marks, inlets, deaeration zones, vapor inlet/vapor outlet points of the preceding production processes are covered. For example, gate marks of an injection-molded part are covered by the subsequently foamed part. In particular, both the foamed part and the injection-molded part may be covered. Due to pressure conditions, the gate mark and the injection direction must be chosen in such a way that the foamed part is not destroyed. Preferably the injection direction must not be directed toward the foamed material; if this is not possible, a hitting distance relative to each other must be maximized in order to reduce a risk of damaging. In order to make this possible, the gate mark must preferably be defined depending on the geometry of the volume body and must also be checked with regard to an arrangement in the final product.

There are in particular different possible connections between the foamed parts, in particular the volume body and the injection-molded parts, in particular the base body and/or the enveloping body. For example, substance-to-substance bond and/or material bond are/is conceivable. The prerequisite for a substance-to-substance bond and/or material bond in particular means compatible components, in particular a material having the same basic substance. Possible combinations of the foamed part and the injection-molded part may be, for example, EPE and PE, EPP and PP, EPS and PS, EPS and SAN, EPS and ABS, EPET and PET. A substance-to-substance bond and/or material bond is in particular possible if the component that is processed downstream has a higher melting point than the component that is processed upstream. This is in particular the case with subsequent overmolding. For pressure distribution and preservation of the foamed part, it is optimal if the foamed part adjoins a wall and the overmolding takes place on the other side. This allows exerting pressure from within toward an outside, thus realizing better receiving of the pressure. With a substance-to-substance bond and/or material bond, the subsequently processed component melts the previously processed component in a border region, and the components mix and bond with each other. A substance-to-substance bond and/or material bond is created. Alternatively or additionally to a substance-to-substance bond and/or material bond, a connection may also be created in a force-fit and/or form-fit manner. In the case of a force-fit and/or form-fit connection, preferably an anchoring structure is provided, which is implemented of a form-fit element in the hard component, thus enabling a form-fit connection. A force-fit and/or form-fit connection may be realized, for example, by overmolding a structure with projecting elements, in particular also with undercuts. The projecting elements may, for example, be implemented by ring-shaped elements on the part that is to be overmolded, in particular the base body. The ring-shaped elements in particular realize a retaining element in a longitudinal direction. Preferably, the ring-shaped elements may extend by 360° around the length axis. The base body may thus in particular be overmolded completely by 360°, the ring-shaped element enabling a fixing in the longitudinal direction. Further structures on the base body may realize a fixing of the rotation. For this purpose, on the element that is to be overmolded, in particular the base body, in particular elements are conceivable which protrude in a column-like manner. Thus it is, for example, in particular conceivable that onto the base body that is implemented of an injection-molded hard component a column of a soft component is injection-molded which is to form the thumb grip. With an overmolding of the base body, the form-fit connection is achieved via the column. Moreover, realization of a plurality of columns on the base body is also conceivable. Alternatively or additionally, a force-fit and/or form-fit connection may also be brought about by overfoaming form-fit elements with recesses, overfoaming form-fit elements with breakthroughs, overfoaming form-fit elements with undercuts or overfoamng from an interior. In the case of overfoaming from an interior, form-fit elements having hollow spaces inside can be overfoamed from an interior. For example, a net may be injection-molded, wherein a foaming is injected through the net into the hollow space formed by the net. Furthermore, a cage may be arranged in a foaming. The cage may quasi lie upon the foaming and/or may be overmolded only partially. Filling of empty spaces in injection-molded products is also conceivable. Alternatively, it is feasible to arrange the ring-shaped element at an angle to the length axis that differs from 90°, which would automatically bring about a fixing of the rotation. The mentioned form-fit elements are oriented in such a way that they are capable of receiving the forces caused by the designated usage of the hygiene product.

Preferably, in a combination of injection-molding and foaming different production parameters must be taken into account. With the foaming process and the injection-molding process, in particular different installations are required for foaming and for injection-molding. Furthermore, it is possible to explicitly separate the steps of the foaming process and of the injection-molding process. In an offline solution (process steps being explicitly separate), for example, a part, in particular the volume body, may be foamed, the foamed part is then put into interim storage and is then overmolded with one or several components in an injection-molding machine. In an inline solution, (process steps following each other directly), for example, a part, in particular the volume body may be foamed, the foamed part is transferred and is then overmolded with one or several components in an injection-molding machine. This has the advantage of a better substance-to-substance bond or material bond as the foamed part is still warm and the surface therefore tends to connect easier. The process steps between foaming and injection-molding, discussed in this passage, may be exchanged in their sequence. The same thoughts will apply.

Beyond this it is proposed that the at least one volume body is at least section-wise densified after an at least first shaping process. A densification is in particular realized after foaming. Therefore, in a first step, in particular the volume body or several foaming components is/are foamed and then the volume body is at least partially densified. The objective of the densification is, for example, to facilitate a furnishing with bristles, to create at least section-wise a stable structure, to implement the volume body as a whole in a stable manner, to introduce a film hinge into the volume body, to obtain at least partially a different surface structure, to create at least partially a flexible zone, to create at least partially different surface properties, to create at least partially a different haptic zone, to create at least partially a different optical zone, to create characters (a logo, a code, etc.). In a densification in particular a deformation of the volume body is brought about under pressure and heat, aided by a stamp that corresponds to the densification, wherein preferably a stamp surface in particular already comprises a portion of a final geometry. Densification is herein in particular realized in two process steps. In a first step, in particular, the product with the volume body is laid into a negative mold. In particular, the shape of the product adjoining thereto does not change. In a second step a stamp is laid onto the product, pressing the product into position accordingly. The surface adjacent to the stamp is formed so as to correspond to the stamp. Herein the volume body is compressed. The densification may be implemented in several densification steps as there is always a portion of the shape that does not change. This is in particular necessary for creating a defined shape and/or for ensuring a defined orientation of the product in the mold. Together with the densification, further shaping of the volume body may be carried out. For example, bristle holes may be formed together with a densification of the head. This may in particular be carried out, for example, by means of a heated stamp with a bristle-hole stamp. Prior to a densification, the volume body is pre-heated, in particular to a defined temperature. Furthermore, the densification process is preferably brought about directly after the foaming process, such that the volume body does not have to be heated separately but still contains heat. A pre-heating may be utilized to obtain more uniform densification and to quicken the implementation. A maximal pre-heating is in particular carried out to the glass transition temperature of the foamed volume body. A temperature of the stamp is in particular in a range of the melting temperature of the component that is to be densified and/or between the glass transition temperature and the melting temperature of the component that is to be densified. In the densification, in particular a compression of the densified subregion of the volume body is in particular executed so as to achieve 30% to 80%, preferably 50% to 70%, of an original volume. A duration of maintaining the compression is in particular in a range of 1 s to 20 s, preferably in a range of 1 s to 10 s. The compression is in particular maintained such that the foaming does not rebound. This in particular allows providing an advantageously variable hygiene product. For example, advantageously high-grade strength of the application unit can be provided. This in its turn allows achieving reliable fixing of cleaning elements, like in particular bristles. Alternatively or additionally, in particular subsequent contouring of the handle unit is achievable. It is in particular possible to manufacture complex shapes, which are for example not realizable in a production of the foamed material.

By means of the densification it is in particular possible to create portions in the foamed body which have greater strength, increased density and/or greater stability. In this way it is for example possible to create a film hinge by compressing the foamed mass. In the densification in particular the gas/air is pressed at least out of subregions of the volume body, such that at least approximately a solid mass is formed once more. In a densified subregion it is in particular possible to achieve an approximation to injection-molded parts with regard to density. The densification allows, for example, creating an interface geometry in the volume body which serves for a connection to a further part. In particular, a subregion of the interface may be compressed in order to create a defined, respectively calibrated, structure having increased hardness. The interface may be implemented, for example, for exchangeable heads or for hairbrush front pieces. It would in particular be conceivable that due to the densification, several directly-composed foamed parts are connectable via welding and/or via pressing against one another. With regard to densification, it would in particular be further conceivable that the densification is also realizable directly in the foaming tool with a movable core and/or stamp. Densification moreover allows creating variability. It is thus possible, for example, to provide a pre-product, in particular for example a foamed product or a foamed and injection-molded product, which is densified in different manners, thus allowing a realization of, for example, different handle shapes. This in particular allows creating a basic handle, which is densified in different shapes, thus providing different product shapes, for example for different clients.

It is further proposed that in a region of the application unit, the volume body is at least section-wise densified after a shaping process. The objective of the densification is in particular to enable a furnishing with bristles. The densification allows realization of a bristle field directly in the volume body. In particular, the volume body may be densified in a region of a brush body, such that known procedures can be applied for a furnishing with bristles. Herein it would in particular be conceivable that a densification and a furnishing with bristles are implemented in parallel. Together with the densification, simultaneously further shaping of the volume body may be carried out. For example, bristle holes may be formed together with the head densification. This may in particular be realized, for example, by means of a heated stamp with a bristle hole stamp. It is in particular possible to create a bristle field in a densified body. In order to enable the furnishing with bristles, the brush head is densified in a method step. The densification may herein be realized together with the forming of bristle holes for customary anchor punching.

Alternatively, the densification may be realized together with the formation of a recess for a bristle platelet. The bristle platelet may in particular be injection-molded in the usual manner, then furnished with bristles and after this welded into the head region. The bristle platelet may be furnished with bristles by means of the afore-described AFT, PTT, AMR or Inmould methods.

However, simultaneous densification and furnishing with bristles would also be conceivable. Herein, in a first step bristle bundles with a mushroom-shaped end could be manufactured, the mushroom-shaped end acting as an anchor. After this the bristle bundles could be inserted in recesses in the brush head. Following this, the brush head is densified and thus the bristle bundles are fixed. This in particular allows providing an advantageously variable hygiene product. For example, advantageously high strength of the application unit can be provided. As a result, a reliable fixing of cleaning elements, like in particular bristles, is attainable.

Alternatively or additionally, a bristle field may also be inserted in an overmolded body, like in particular in the overfoamed base body. For example, a bristle platelet, like in particular an AFT platelet, a PTT platelet, an AMR platelet or an Inmold platelet, may be overfoamed. For this, in a first step in particular a bristle-furnished platelet, respectively a bristle platelet, is manufactured. After this, the bristle-furnished platelet is in particular overfoamed and at least a portion of the application unit and/or of the handle unit is manufactured with a foamed component. It would alternatively also be conceivable that individual bristle bundles are overfoamed. For this, in a first step in particular bristle bundles with a mushroom-shaped end are manufactured, the mushroom-shaped end acting as an anchor. After this the bristle bundles are placed in a foaming tool and are overfoamed. The bristle bundles are fixed by the overfoaming. Alternatively or additionally, it is conceivable to use twisted-in bristles. For this a wire end is held in a foamed handle. The anchoring is here in particular important as the wire end must have a corresponding shaping, for example in the shape of a fishing hook (shape of a "J"), such that the bristle cannot be torn out. In a production, the twisted-in bristle is laid into an injection-molding tool or foaming tool and is overmolded. The foaming may be realized directly on the bristle, respectively the wire end, or on an injection-molded part that was molded to the wire end. Alternatively or additionally, a bristle field may be arranged on the injection-molded body, in particular the base body. The injection-molded base body, which also forms the head region of the toothbrush, or a simply injection-molded body forms the head region. Herein in particular a variant having a punched bristle field is conceivable. For this the head region of the application unit in particular comprises bristle holes, wherein it is possible that bristle-furnishing is made directly in the bristle holes. For this purpose, in particular anchor-punching methods are conceivable. Alternatively, in particular a variant with an AFT bristle field is conceivable as an AFT method. For this the head region of the application unit in particular comprises a recess for a bristle platelet, in particular an AFT platelet. The bristle platelet is in the usual manner injection-molded, furnished with bristles and then welded into the head region.

The hygiene product may in particular be printed and/or decorated in any manner according to requirements. Printing or decorating may be realized, for example, by means of surface treatment. The surface treatment may be integrated in a production process or may be realized subsequently to the production process. The hygiene product may be sealed, for example, by varnishing or flaming. In a varnishing, in particular the holes in the surface are filled, which may result in the varnishing being applied not in the same overall thickness. A varnishing may be realized, for example, by spraying or painting the hygiene product with a color or by dip-varnishing. Dip-varnishing in particular depends on a material and is not suitable for all materials because of the processing temperatures. Alternatively or additionally, the hygiene product may be stamped. The stamping herein constitutes something like a partial densification, which brings about a surface structure and/or shape which may show a lettering and/or a logo. In a stamping in particular also a foil structure is possible with a printing layer and a connection layer, like in particular a glue layer. In the case of image-stamping, in particular a foil, for example from a reel, is pressed onto the body with a heated stamp. The stamping is herein carried out in such places in which the foil is provided with a corresponding glue. The embossing stamp herein in particular has the shape of the body surface. A printing is herein in particular implemented in a defined manner, such that printing marks must be aligned with the body that is to be printed. On the contrary, in a hot-stamping a foil, in particular for example from a reel, is pressed onto the body with a heated stamp that has the contour of the stamping. The contacting surfaces of the body are provided with the decoration from the foil. The contour of the printing is therefore in particular made by the stamp. The stamp is in particular embodied as a metal stamp. The stamp may in particular be used for further functions. Furthermore, lettering can be burnt-in by means of hot-stamping. It is therefore in particular possible that deepenings are created by heat, a stamping being realized at the bottom of the deepening from the foil. For this purpose, the stamp is in particular traversed at a lower level than the surface. Alternatively, molding of negative molds is also conceivable. Thus a stamping may in particular be carried out without a foil, wherein only partial densification is realized. In this way in particular three-dimensional lettering, structures or the like may be created. Alternatively or additionally, a decoration of the hygiene product may also be realized by means of an inlay in an undercut. For example, a diamond or something like that may be laid in.

When producing the hygiene product, it is in particular possible to mount additional elements on the base body, on the volume body and/or on the enveloping body. In particular, mounting of rather small elements may be realized. For example, additional elements like, for example, metal parts, diamonds, glass beads or the like may be mounted subsequently. Alternatively or additionally, it is also possible to subsequently introduce injection-molded parts when mounting, like hard elements or soft elements, or for example elements having further functions. Alternatively, a mounting of handle parts is also conceivable as a special case. It is in particular conceivable that, for example, the foamed portion has a hole, wherein a part that is to be mounted is passed through said hole for a mounting. Herein in particular further closure parts are conceivable. A fixing of the parts may be achieved, for example, mechanically: via undercuts, via screwing, via clamping, via latching and/or riveting, wherein in particular a part is riveted and/or latched on, and/or via jamming. In the case of screwing, parts of the hygiene product are in particular screwed together. This permits, for example, two injection-molded parts being connected by means of a closure by a nut-like screwed-on element. Alternatively or additionally, a fixing may be implemented via gluing or welding.

The hygiene product according to the invention shall herein not be restricted to the applications and implementations described above. In particular, in order to fulfill a functionality that is described here, the hygiene product according to the invention may comprise a number of individual elements, components and units that differs from a number given here, and/or may comprise any expedient combination thereof. Moreover, with regard to the value ranges given in the present disclosure, values situated within the limits mentioned shall also be considered as disclosed and as applicable according to requirements.

The implementation variants shown in the present document are of course exemplary. In the scope of the invention, the respective implementations and elements of said implementation variants may be combined with other implementation variants without leaving the scope of this invention.

DRAWINGS

Further advantages will become apparent from the following description of the drawings. In the drawings sixteen exemplary embodiments of the invention are illustrated. The drawings, the description and the claims contain a plurality of features in combination. Someone skilled in the art will purposefully also consider the features individually and will find further expedient combinations.

Figure 2A:
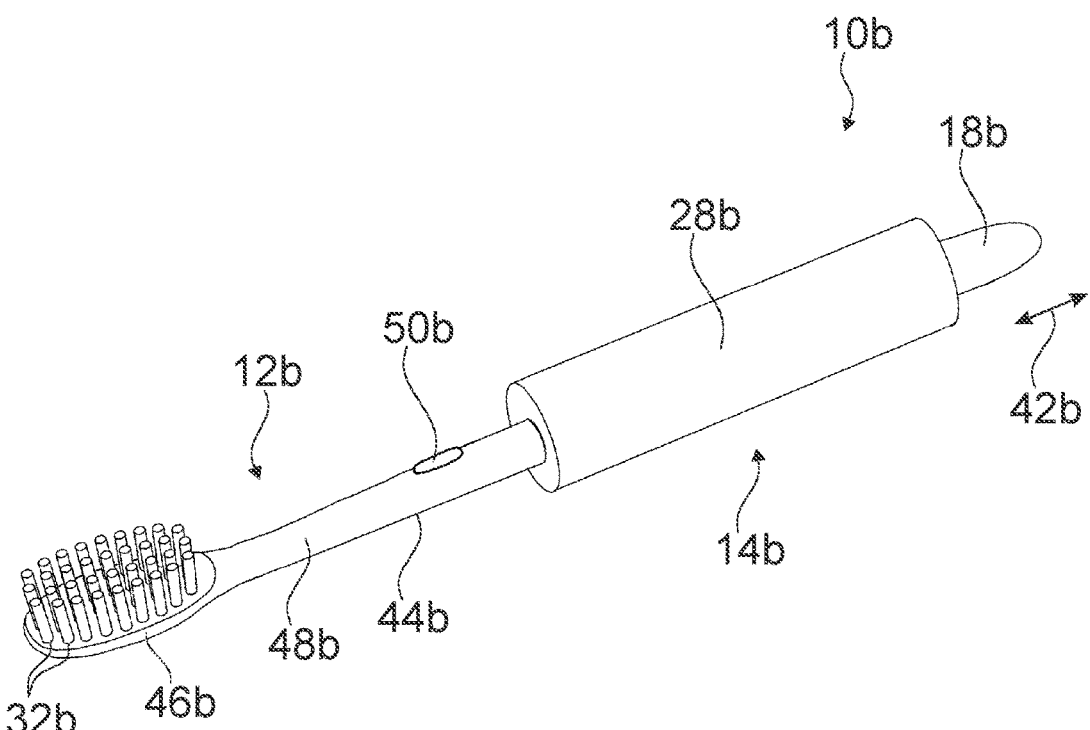
Figure 2B:
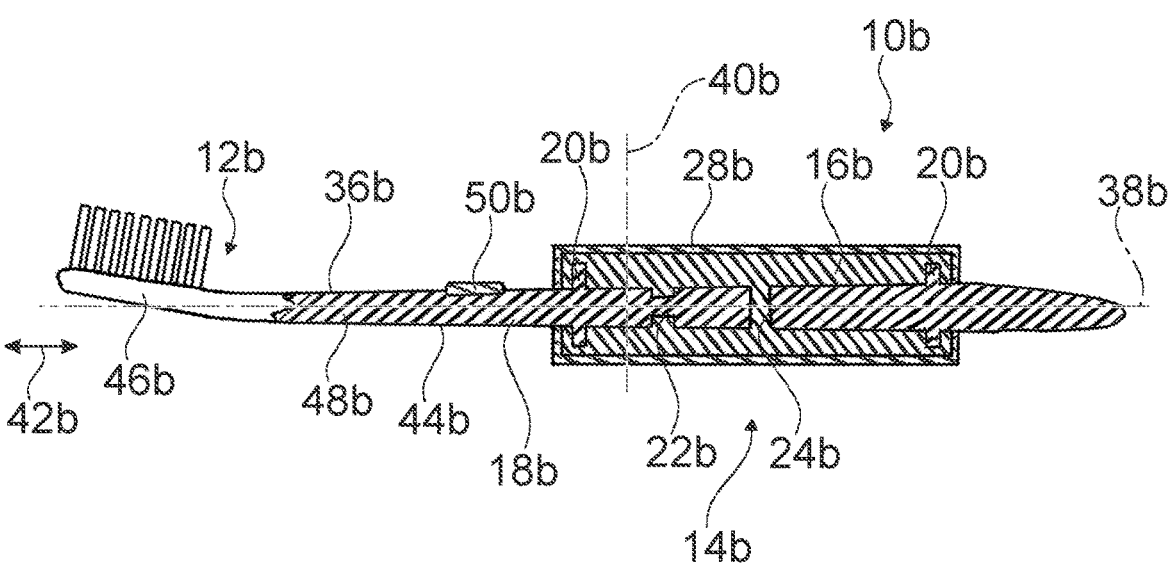
Figure 3A:
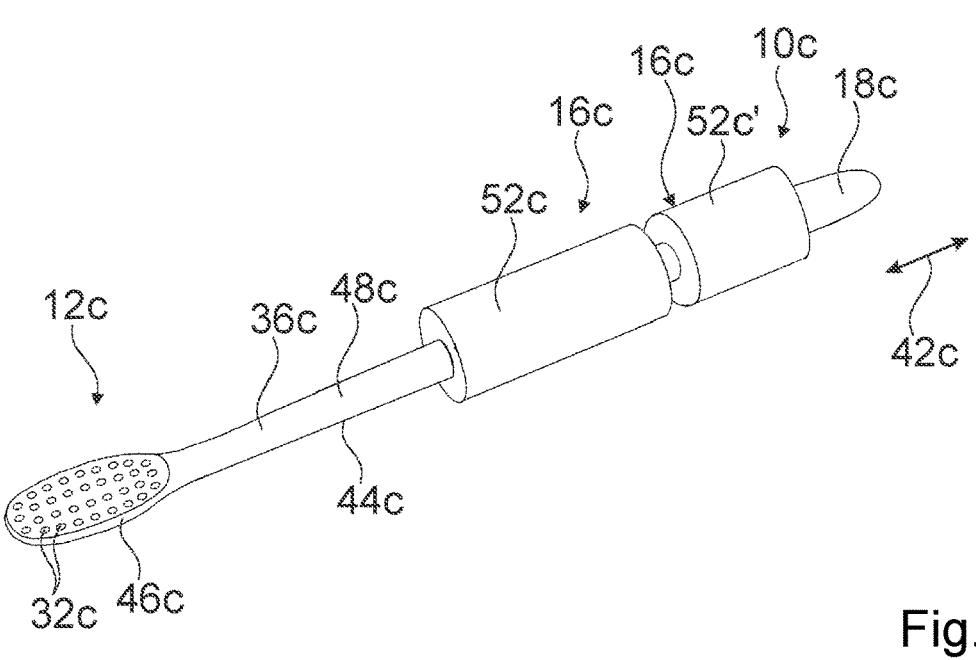
Figure 3B:
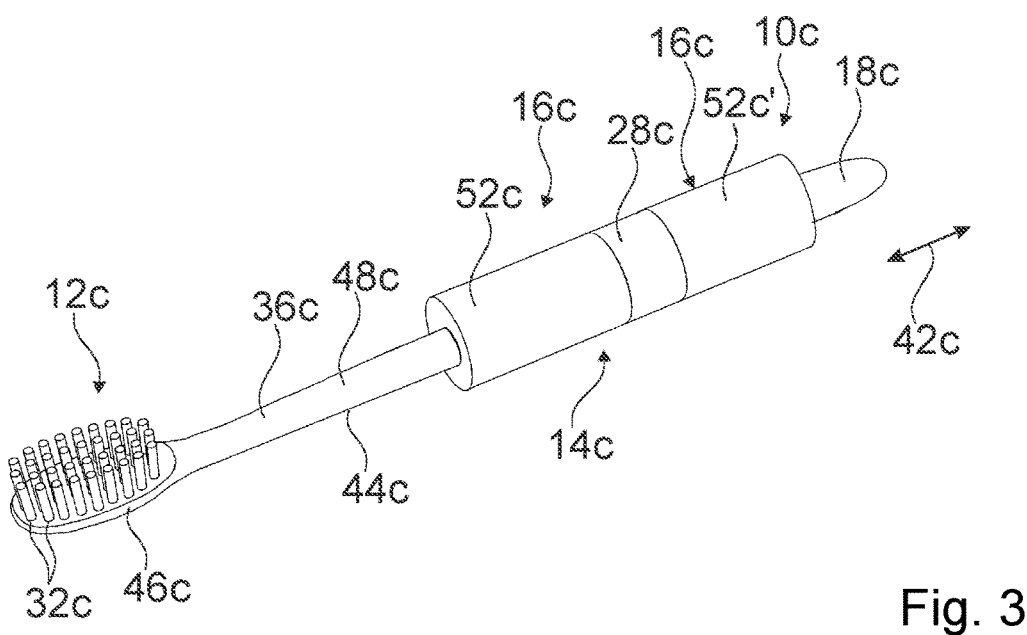
Figure 3C:
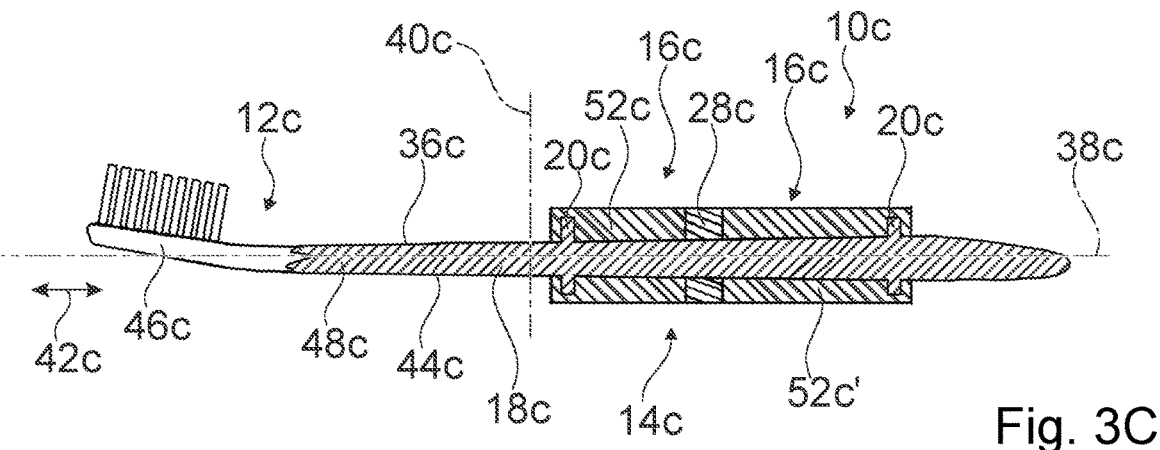
Figures 4A, 4B, 5A, 5B:
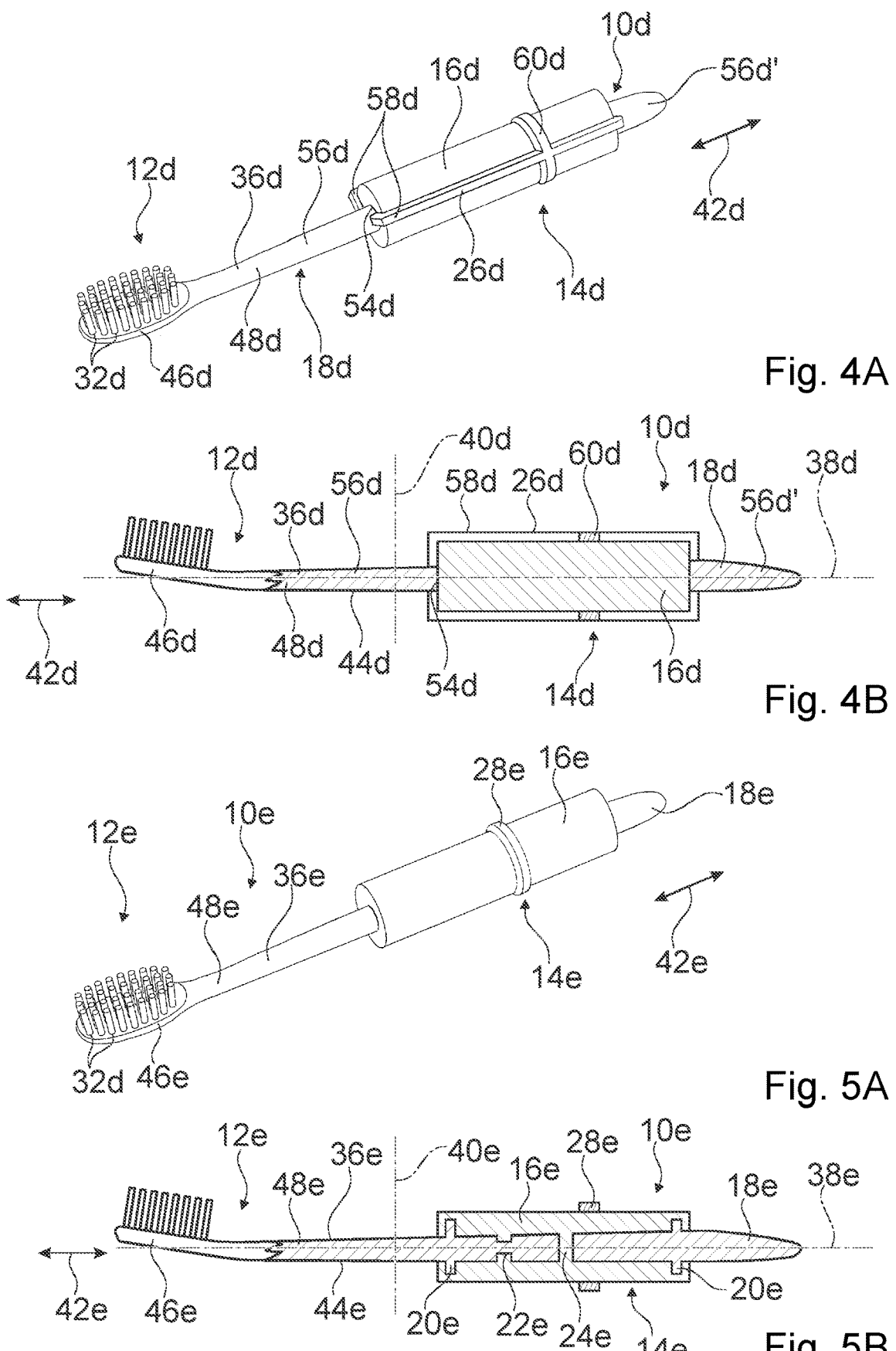
Figure 6A:
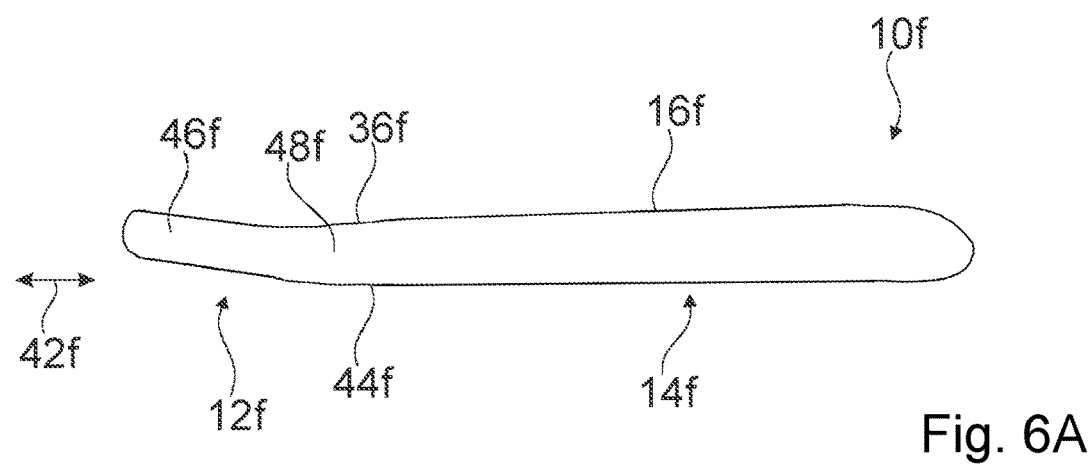
Figure 6B:
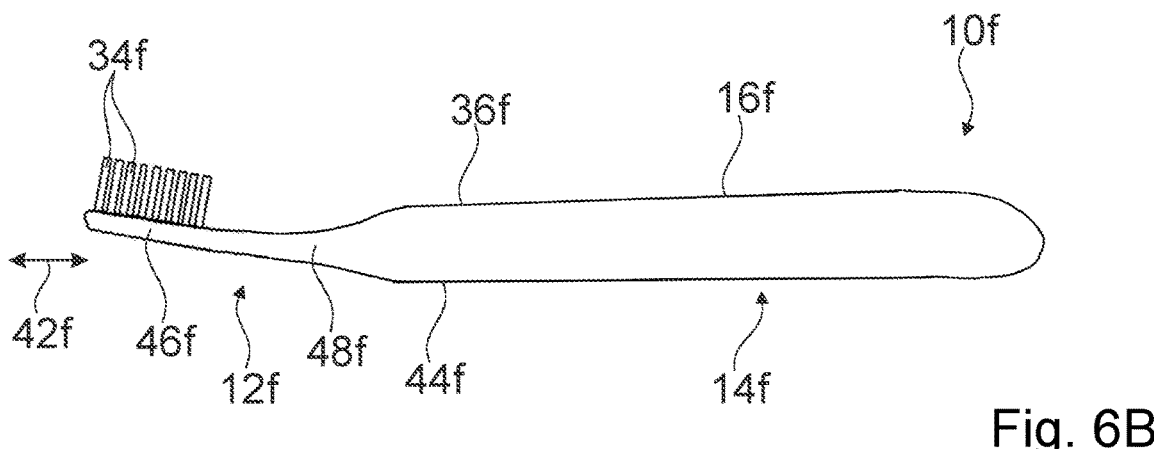
Figure 6C:
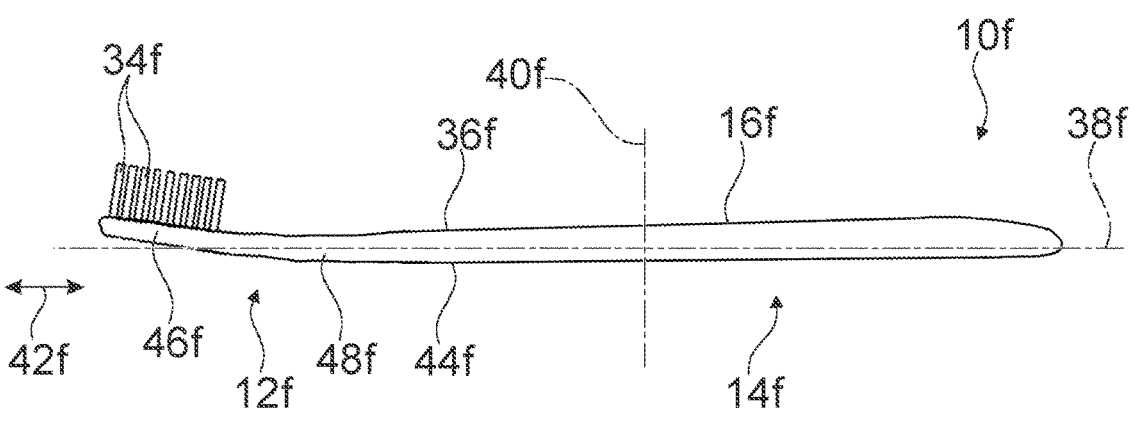
Figures 7A, 7B, 7C:
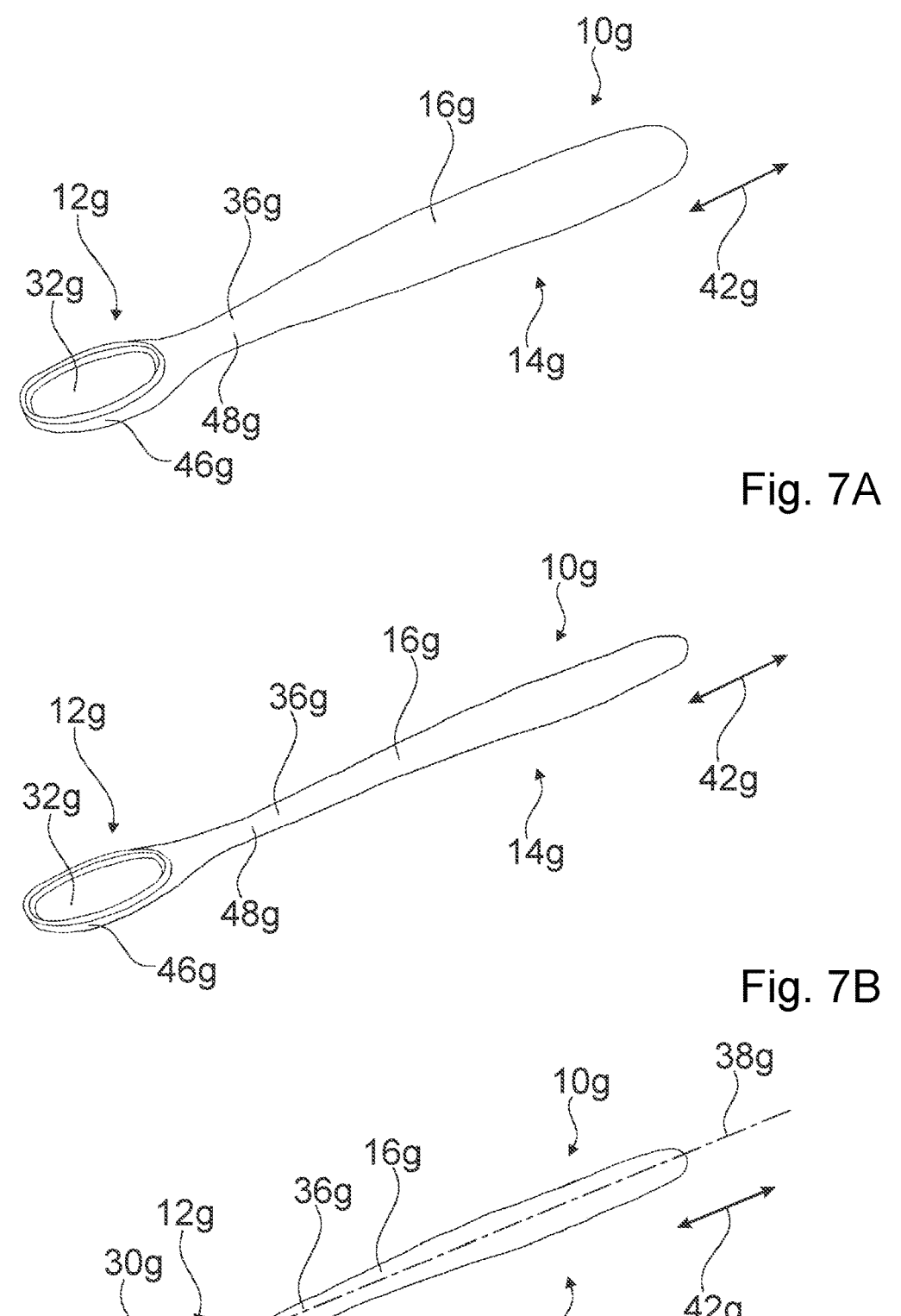
Figure 8:
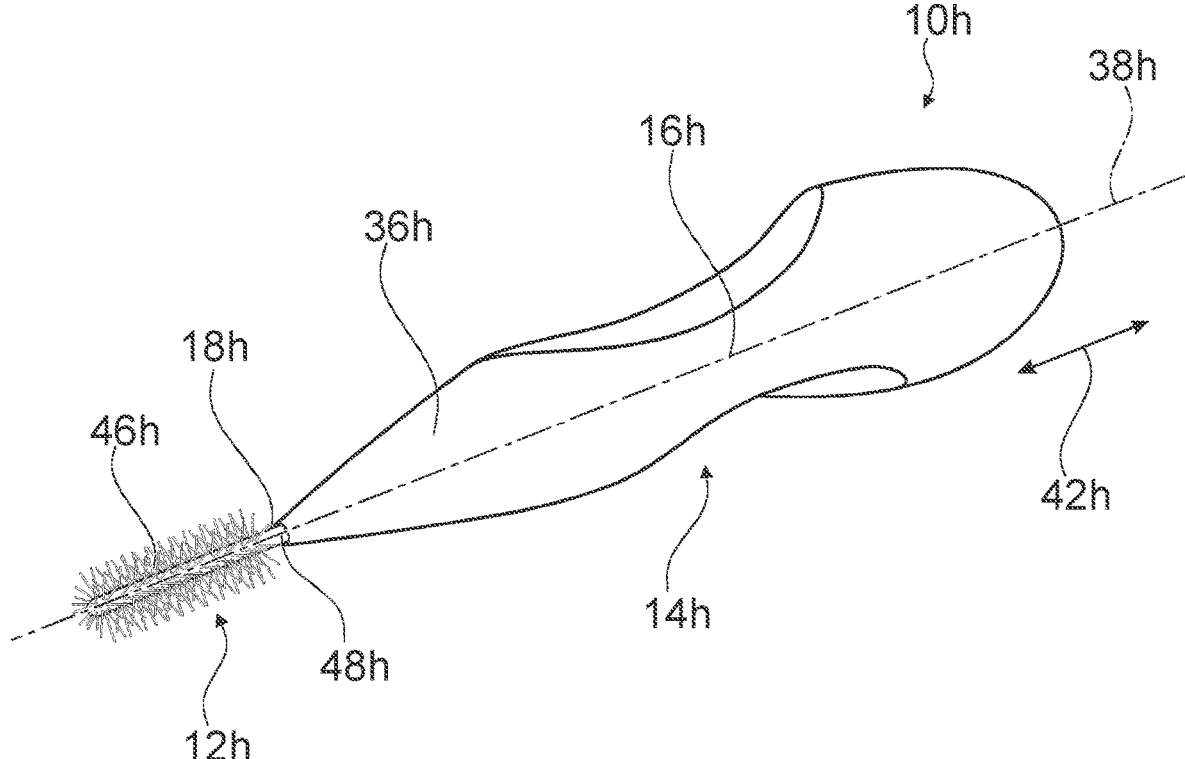
Figures 9, 10:
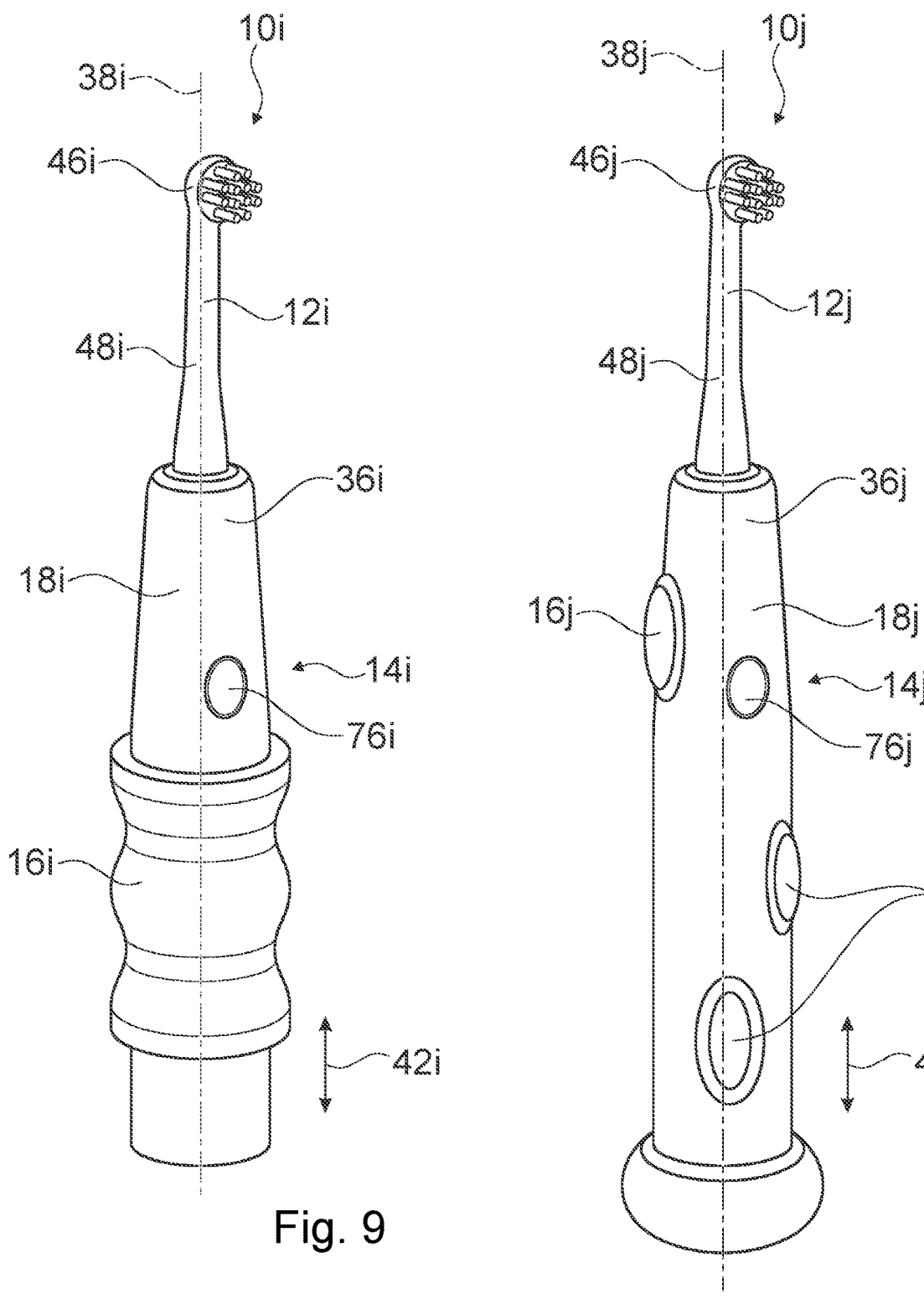
Figure 11A:
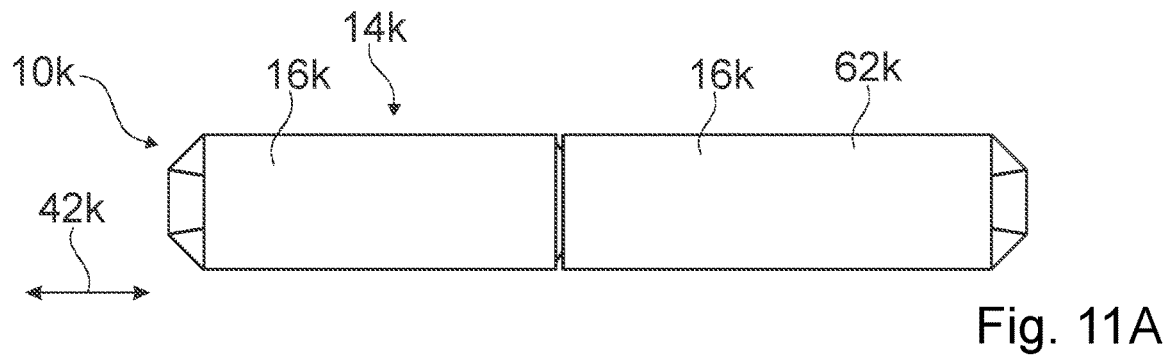
Figure 11B:
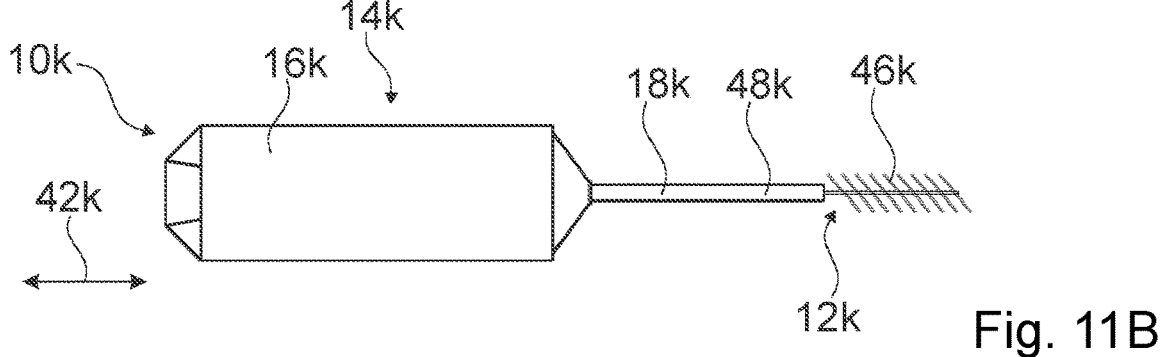
Figure 11C:
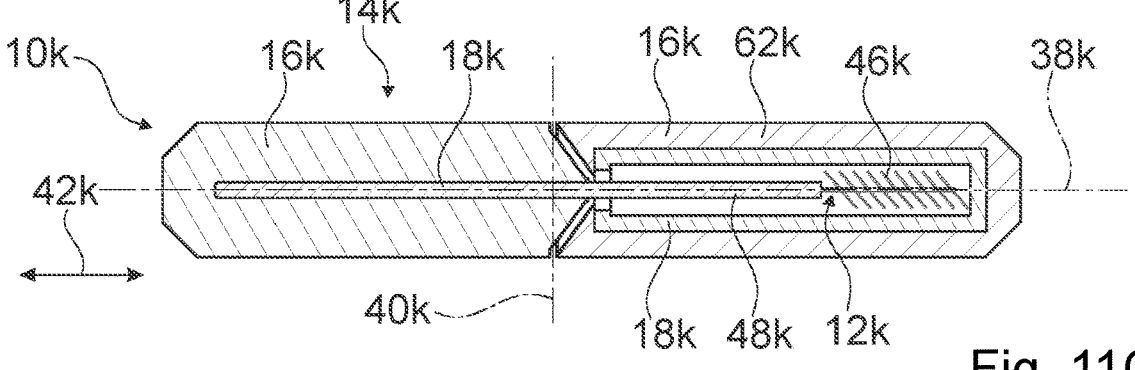
Figure 12:
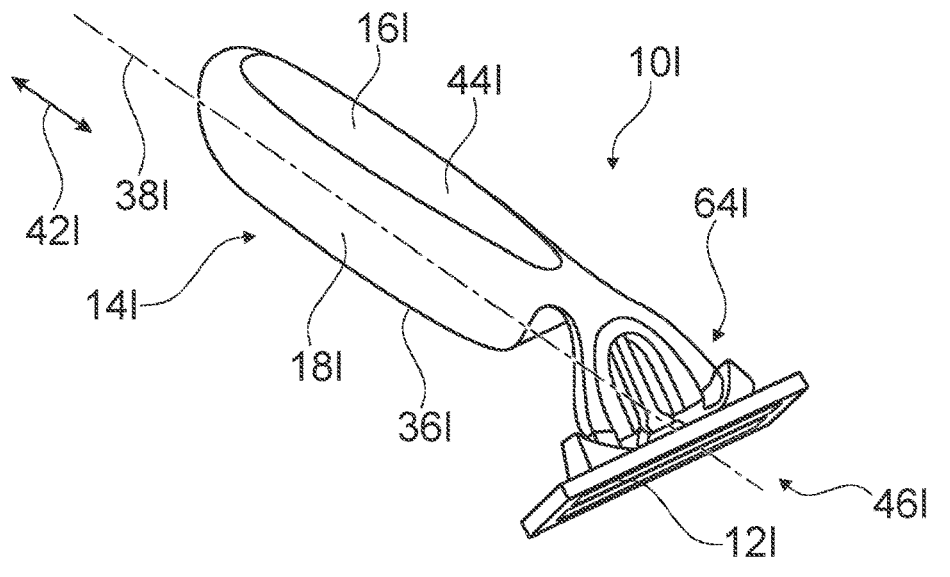
Figure 13A:
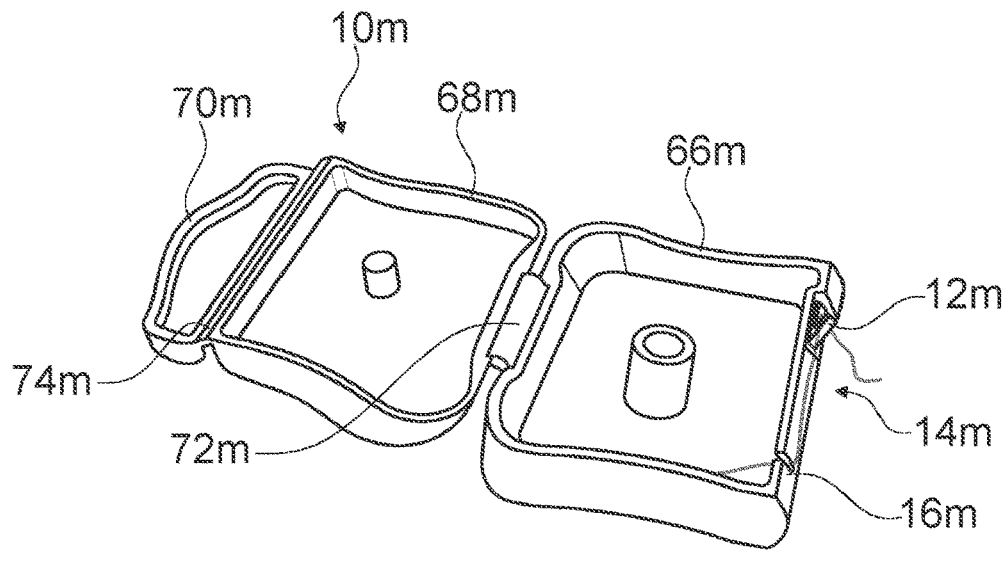
Figure 13B:
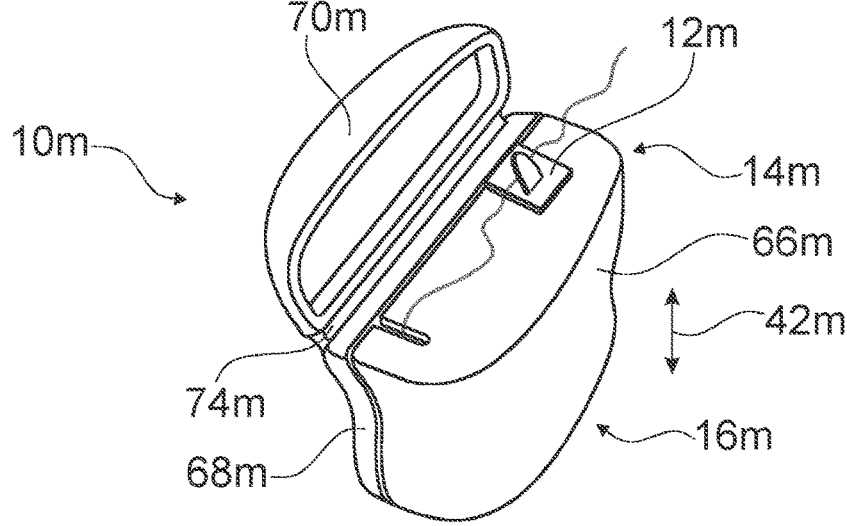
Figure 14:
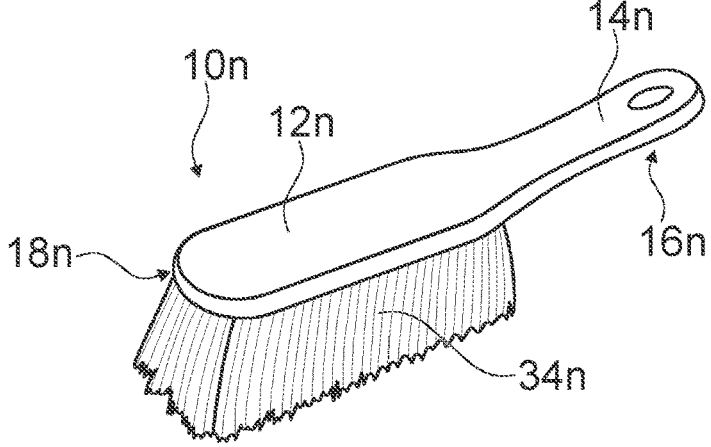
Figures 15A, 15B:
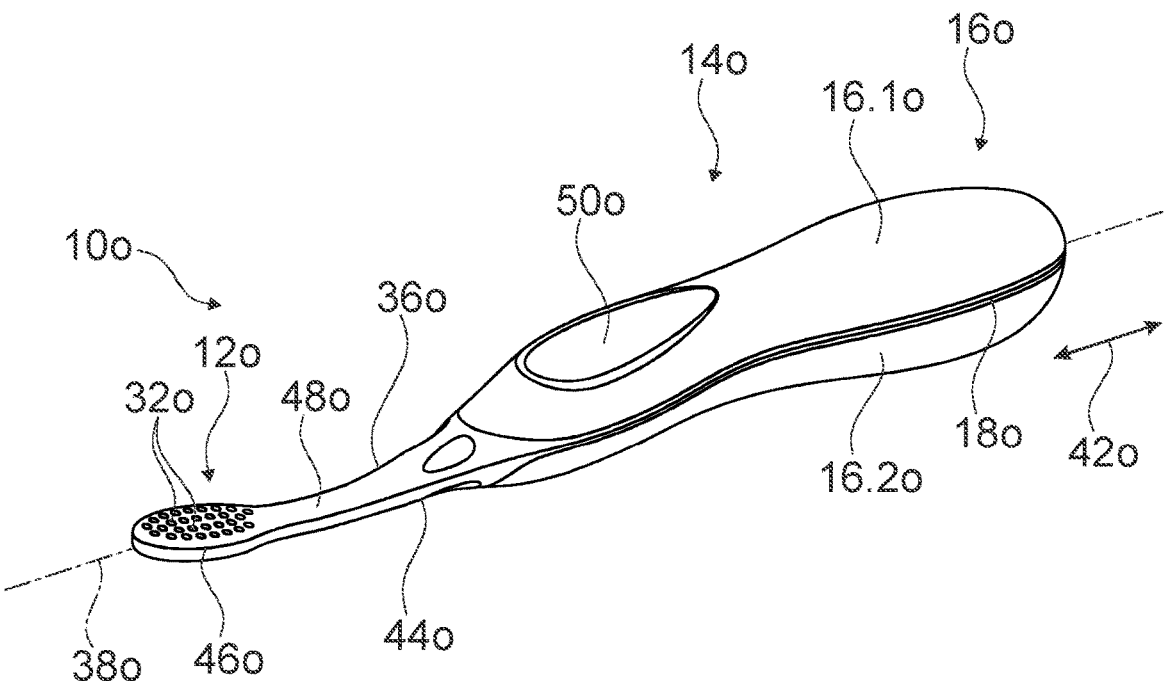
Figures 15C, 15D:
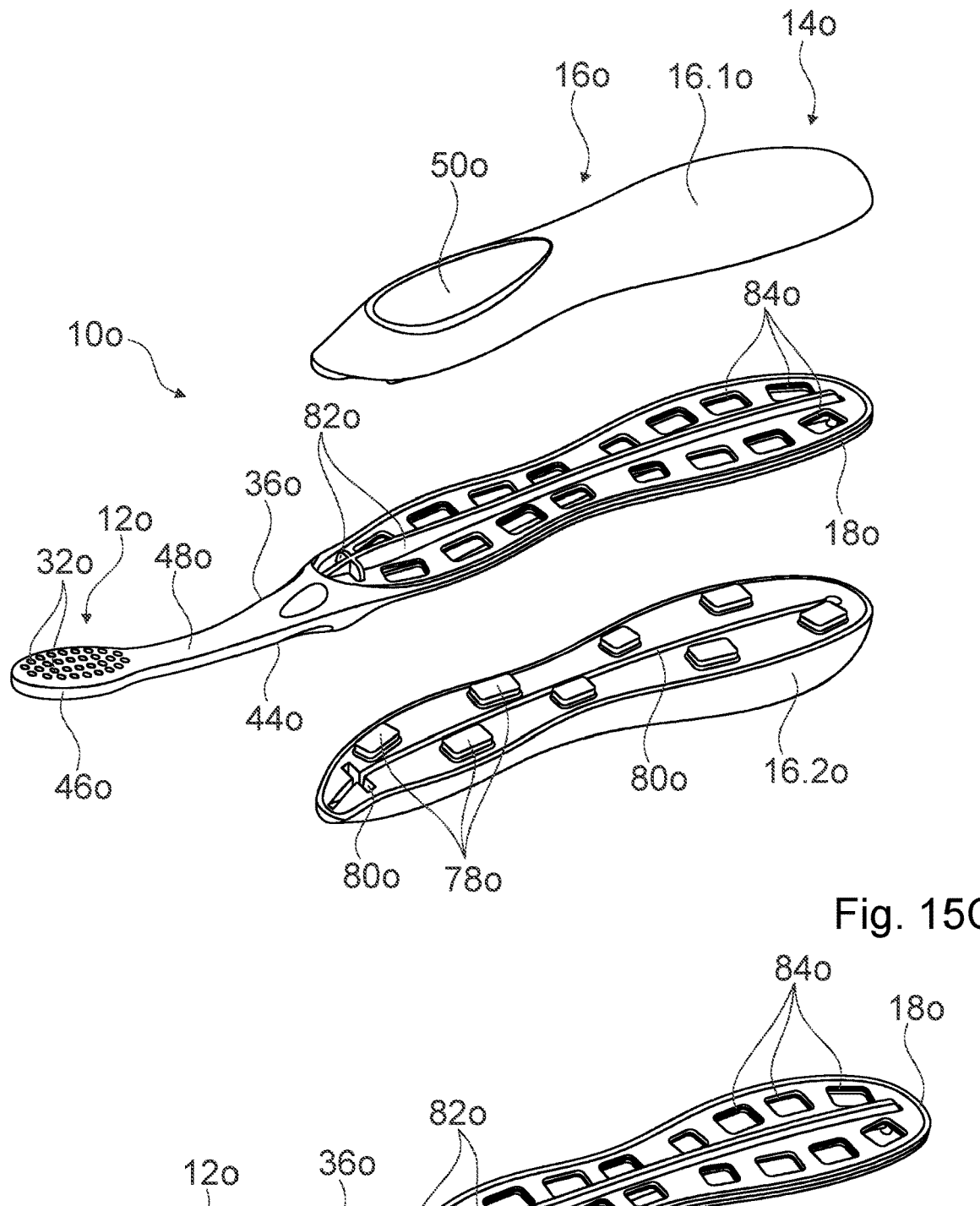
Figures 15E, 15F, 15G:
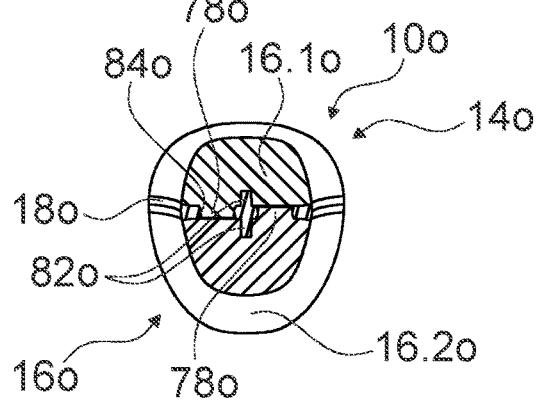
Figure 16A:
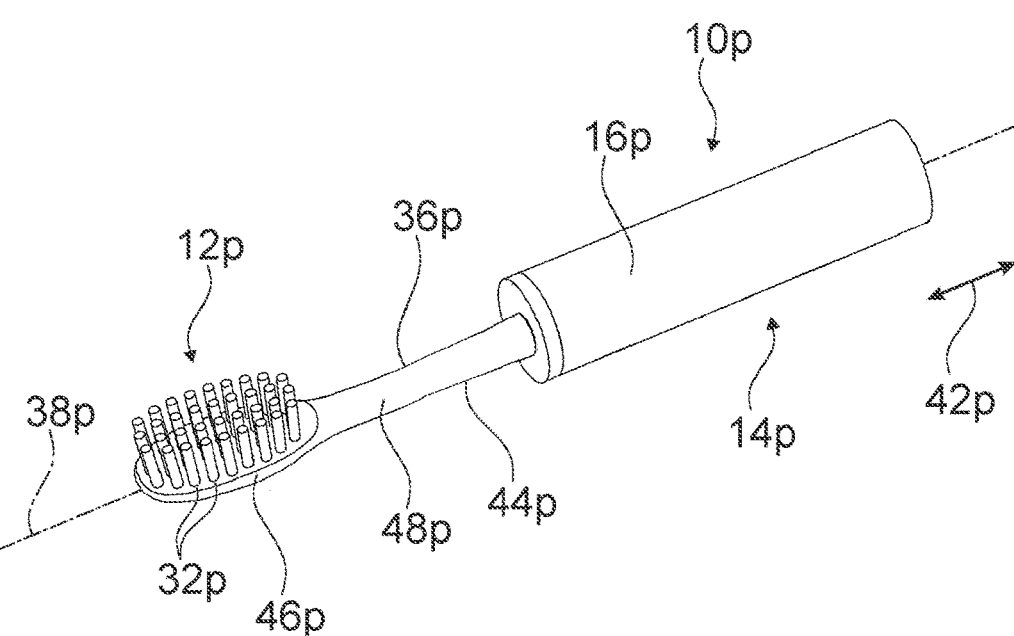
Figure 16B:
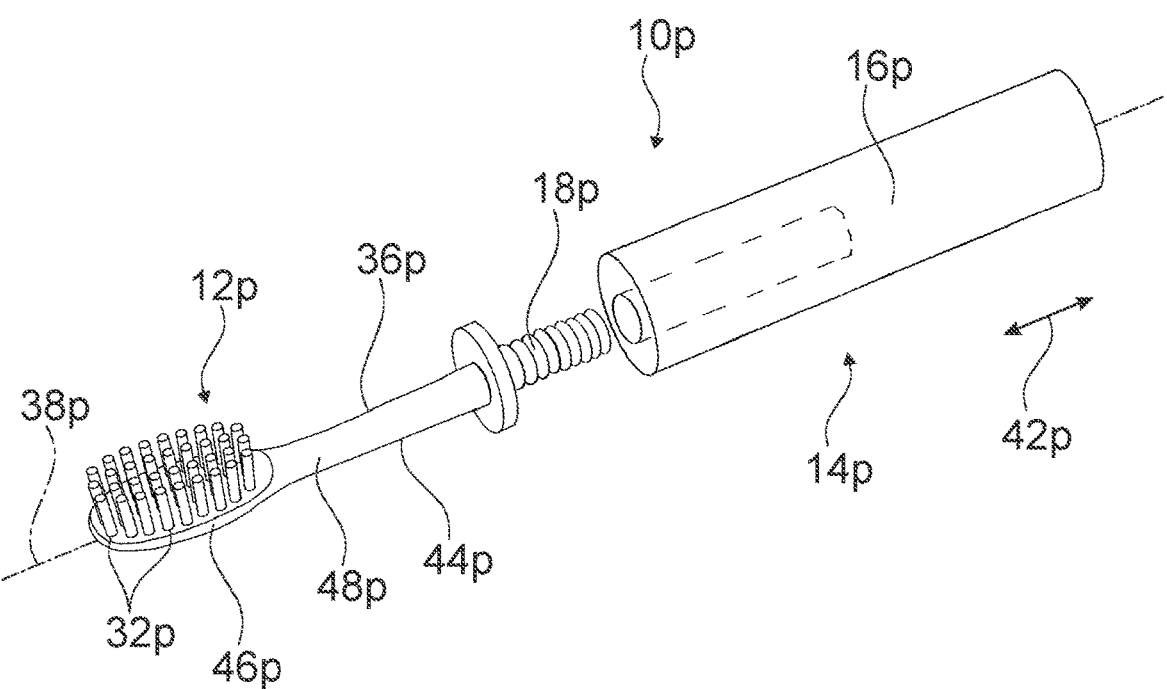

It is shown in:

FIG. 1A a base body of a hygiene product that is embodied as a toothbrush, with an application unit and with a handle unit, in a 3D view, FIG. 1B the base body of the hygiene product with the application unit and with the handle unit, in a sectional view, FIG. 1C the hygiene product with the application unit, with the handle unit, with the base body and with the volume body, in a 3D view, FIG. 1D the hygiene product with the application unit, with the handle unit, with the base body and with the volume body, in a sectional view, FIG. 2A an alternative hygiene product that is embodied as a toothbrush, with an application unit, with a handle unit, with a base body, with a volume body and with an enveloping body, in a 3D view, FIG. 2B the alternative hygiene product with the application unit, with the handle unit, with the base body, with the volume body and with the enveloping body, in a sectional view, FIG. 3A a further alternative hygiene product that is embodied as a toothbrush, with an application unit, with a handle unit, with a base body and with a volume body, in a 3D view during production, FIG. 3B the further alternative hygiene product with the application unit, with the handle unit, with the base body, with the volume body and with an enveloping body, in a 3D view, FIG. 3C the further alternative hygiene product with the application unit, with the handle unit, with the base body, with the volume body and with the enveloping body, in a sectional view, FIG. 4A a further alternative hygiene product that is embodied as a toothbrush, with an application unit, with a handle unit comprising a cage element, with a base body and with a volume body, in a 3D view, FIG. 4B the further alternative hygiene product with the application unit, with the handle unit comprising the cage element, with the base body and with the volume body, in a sectional view, FIG. 5A a further alternative hygiene product that is embodied as a toothbrush, with an application unit, with a handle unit comprising a cage element, with a base body and with a volume body, in a 3D view, FIG. 5B the further alternative hygiene product with the application unit, with the handle unit comprising the cage element, with the base body and with the volume body, in a sectional view, FIG. 6A a further alternative hygiene product that is embodied as a toothbrush, with an application unit, with a handle unit and with a volume body in a side view, non-densified after foaming, FIG. 6B the further alternative hygiene product with the application unit, with the handle unit and with the volume body in a side view, with a densified brush head, FIG. 6C the further alternative hygiene product with the application unit, with the handle unit and with the volume body in a side view, fully densified, FIG. 7A a further alternative hygiene product that is embodied as a toothbrush, with an application unit having a recess for an AFT platelet, with a handle unit and with a volume body in a 3D view, non-densified after foaming, FIG. 7B the further alternative hygiene product with the application unit, with the handle unit and with the volume body in a 3D view, fully densified, FIG. 7C the further alternative hygiene product with the application unit, with the handle unit, with the volume body and with an AFT platelet accommodated in the recess of the application unit, in a 3D view, fully densified, FIG. 8 a hygiene product that is embodied as an interdental brush, with an application unit, with a handle unit and with a volume body, in a 3D view, FIG. 9 a hygiene product that is embodied as an electrical toothbrush, with an application unit, with a handle unit comprising a housing, with a base body that forms the housing and with a volume body that is arranged at the housing, in a 3D view, FIG. 10 an alternative hygiene product that is embodied as an electrical toothbrush, with an application unit, with a handle unit comprising a housing, with a base body that forms the housing and with different partial volume bodies which are arranged at the housing, and a charging station, in a 3D view, FIG. 11A a hygiene product that is embodied as a mascara, with an application unit, with a handle unit, with a reservoir, with a base body and with a volume body, in a side view, FIG. 11B the hygiene product with the application unit, with the handle unit, with the base body and with the volume body, illustrated in a side view without the reservoir, FIG. 11C the hygiene product with the application unit, with the handle unit, with the reservoir, with the base body and with the volume body, in a sectional view, FIG. 12 a hygiene product that is embodied as a razor, with an application unit, with a handle unit, with a base body and with a volume body, in a 3D view, FIG. 13A a hygiene product that is embodied as a dental-floss box, with an application unit, with a handle unit that is embodied as a box and with a volume body, unfolded in a 3D view, FIG. 13B the hygiene product with the application unit, with the handle unit that is embodied as a box and with a volume body, folded with an open lid, in a 3D view, FIG. 14 a hygiene product that is embodied as a handbrush, with an application unit, with a handle unit and with a volume body that forms the handle unit, in a 3D view, FIG. 15A a further alternative hygiene product with the application unit, with the handle unit, with the base body and with the volume body, in a 3D view, FIG. 15B the further alternative hygiene product with the application unit, with the handle unit, with the base body and with the volume body, in a 3D view onto the rear side, FIG. 15C the further alternative hygiene product with the application unit, with the handle unit, with the base body and with the volume body, in an exploded view, FIG. 15D a base body of the further alternative hygiene product, in a 3D view from the front, FIG. 15E the base body of the further alternative hygiene product, in a 3D view from the rear, FIG. 15F the base body mounted with a portion of the volume body of the further alternative hygiene product, in a 3D view, FIG. 15G a sectional view through the further alternative hygiene product, FIG. 16A a further alternative hygiene product with the application unit, with the handle unit, with the base body and with the volume body, in a 3D view, and FIG. 16B the further alternative hygiene product with the application unit, with the handle unit, with the base body and with the volume body, in an exploded view.

DESCRIPTION OF THE EXEMPLARY EMBODIMENTS

FIG. 1A shows a front side $36a$ of a hygiene product $10a$ in a schematic perspective view. The hygiene product $10a$ is in the present case embodied as a toothbrush. The hygiene product $10a$ may be embodied as a disposable toothbrush or may as well be embodied as an exchangeable-head toothbrush. Beyond this, the hygiene product $10a$ could be embodied as a flosser, as a single-tuft brush, as an interdental cleaner, as a tongue cleaner, or the like. Furthermore, combined hygiene products are conceivable, combining at least two different functions, for example a toothbrush with tongue cleaner, a toothbrush with massaging elements, an interdental cleaner with flosser, or more of that kind.

The hygiene product $10a$ comprises at least one application unit $12a$. Furthermore, the hygiene product $10a$ comprises at least one handle unit $14a$.

In the following, FIGS. 1A to 1D will be referred to, which show different views and manufacturing stages of the hygiene product $10a$. Due to the different views, some elements are not shown in all the figures and are hence not provided with reference numerals in all the figures.

The hygiene product $10a$ has a length axis $38a$, a height axis $40a$ and a width axis. The length axis $38a$ is arranged parallel to a main extent direction $42a$ of the hygiene product $10a$. If the hygiene product $10a$ is laid on a planar surface with its rear side, such that the length axis $38a$ is arranged parallel to the surface, the height axis $40a$ is arranged perpendicularly to the length axis $38a$ and perpendicularly to the surface and to the width axis. The width axis is arranged perpendicularly to the length axis $38a$ and perpendicularly to the height axis $40a$. In the present case the hygiene product $10a$ has a length, in particular parallel to the length axis $38a$ and measured parallel to the support surface, of 140 mm to 210 mm, preferably of 165 mm to 195 mm.

The at least one application unit $12a$ has a head region $46a$. The head region $46a$ forms a brush head of the hygiene product $10a$. In the present case the head region $46a$ is realized as a toothbrush head. The head region $46a$ in particular comprises a base body that is embodied as a bristle carrier. The base body of the head region $46a$ is completely made of a hard component. However, it would also be conceivable that the base body of the head region $46a$ is made of a hard component and a soft component. The base body of the head region $46a$ forms a bristle carrier. The hygiene product $10a$ further comprises in the head region $46a$ a plurality of bristle holes, which are embodied as recesses $32a$ and comprise respectively one bristle bundle.

Alternatively the hygiene product $10a$ could comprise a bristle platelet, which is accommodated in the head region $46a$ and comprises a plurality of bristle bundles. The bristle platelet is exemplarily realized as an AFT platelet. On the front side $36a$ of the head region $46a$ a recess is molded. The recess is configured to accommodate the bristle platelet.

Any suitable bristles may be used as bristles. In the present case the application unit $12a$ further comprises a neck region $48a$, which in particular connects the head region $46a$ to the handle unit $14a$. The neck region $48a$ forms a neck.

The application unit $12a$ is arranged on an upper side of the hygiene product $10a$. The application unit $12a$ constitutes an uppermost point of the hygiene product $10a$. Principally the application unit $12a$ may comprise at least one tongue cleaning element. The tongue cleaning element may in particular have nubs and/or lamellae. Preferably the tongue cleaning element is arranged on the rear side of the head region $46a$; it may in particular be arranged on a ring that is implemented of a soft component and/or on a surface that is implemented of a soft component and/or on an island that is implemented of a hard component. The tongue cleaning element may be molded from a hard and/or from a soft component.

The neck region $48a$ forms a transition between the application unit $12a$ and the handle unit $14a$. The lower end of the neck region $48a$ is implemented at least partly in a resilient manner.

The hygiene product $10a$ further comprises a volume body $16a$. The volume body $16a$ is implemented at least partially of a foamed material. The volume body $16a$ is completely implemented of a foamed material. The foamed material is produced from an expandable granulate. The foamed material may be produced from a hard component, such that in particular a hard foam is produced. The foamed material may be realized, for example, of expanded polystyrene (EPS), expanded polyethylene (EPE), expanded polypropylene (EPP), expanded polyethylene terephthalate (EPET) and/or expanded polybutylene terephthalate (EPBT) as a basic component. Principally a foam based on cellulose or PLA is also possible.

The volume body $16a$ forms the application unit $12a$ and/or the handle unit $14a$ at least partially. The volume body $16a$ forms the handle unit $14a$ partially. The volume body $16a$ realizes an outer envelope of a handle region of the handle unit $14a$. The volume body $16a$ exemplarily has a circle-cylindrical basic shape, wherein a central axis extends along the length axis $38a$ of the hygiene product $10a$. The volume body $16a$ is embodied in a hollow-cylindrical fashion. However, other forms are conceivable which are deemed expedient by someone skilled in the art.

The hygiene product $10a$ further comprises a base body $18a$, which is connected with the volume body $16a$. The base body $18a$ is at least partially implemented of a hard component. The base body 18*a* is completely implemented of a hard component. The base body 18*a* is embodied in a one-part implementation. As a hard component, for example, styrene polymerizates like styrene acrylonitrile (SAN), polystyrene (PS), acrylonitrile butadiene styrene (ABS), styrene methyl methacrylate (SMMA), styrene butadiene (SB) or the like may be used. A hard component may further comprise polyolefins like polypropylene (PP), polyethylene (PE) or the like, in particular also in the implementation as high-density polyethylene (HDPE) or low-density polyethylene (LDPE). Moreover, polyesters may be used, like for example polyethylene terephthalate (PET), in particular implemented as acid-modified polyethylene terephthalate (PETA), glycol-modified polyethylene terephthalate (PETG), polybutylene terephthalate (PBT), acid-modified polycyclohexylenedimethylene-terephthalate (PCT-A), glycol-modified polycyclohexylenedimethylene-terephthalate (PCT-G) or the like.

The base body 18*a* forms the application unit 12*a* and/or the handle unit 14*a* at least partially. The base body 18*a* forms the application unit 12*a*. The base body 18*a* forms the application unit completely. It would however also be conceivable that additionally elements implemented of a soft component are provided at the application unit 12*a*. The base body 18*a* furthermore partially forms the handle unit 14*a*. The base body 18*a* forms a core of the handle unit 14*a*. In a region of the handle unit 14*a*, the base body 18*a* has an at least approximately cylindrical basic shape. The base body extends along the length axis 38*a* along the entire hygiene product 10*a*. On a rear end of the hygiene product 10*a*, the base body 18*a* has a rounded end.

The volume body 16*a* is molded to the base body 18*a*. The volume body 16*a* is produced directly at the base body 18*a* in a foaming process. The base body 18*a* is produced in an injection-molding process, wherein the volume body 16*a* is foamed around the base body 18*a*. The volume body 16*a* encloses the base body 18*a* at least partially. The volume body 16*a* encloses the base body 18*a* in a region of the handle unit 14*a*. In at least one plane perpendicular to the length axis 38*a*, the volume body 16*a* encloses the base body 18*a* completely.

The base body 18*a* and the volume body 16*a* realize a form-fit connection. The base body 18*a* comprises at least one form-fit element 20*a*, 22*a*, 24*a*, which creates a form-fit connection with the volume body 16*a*. The base body 18*a* comprises a plurality of form-fit elements 20*a*, 22*a*, 24*a*. A first form-fit element 20*a* of the base body 18*a* is embodied as a disc. The first form-fit element 20*a* is realized by a ring that extends completely around a basic shape of the base body 18*a*. The first form-fit element 20*a* is arranged in a plane perpendicular to the length axis 38*a*. Viewed in a plane parallel to the length axis 38*a*, the first form-fit element 20*a* has a rectangular cross section. The base body 18*a* exemplarily comprises two first form-fit elements 20*a*, which are arranged spaced apart from each other. A second form-fit element 22*a* of the base body 18*a* forms a circumferential groove.

The groove of the second form-fit element 22*a* extends in a plane perpendicular to the length axis 38*a* completely around the base body 18*a*. The groove of the second form-fit element 22*a* is embodied in a ring shape and exemplarily has a rectangular cross section. However, other shapes of the second form-fit element 22*a*, deemed expedient by someone skilled in the art, are also conceivable. A third form-fit element 24*a* of the base body 18*a* forms a breakthrough through the base body 18*a*. The breakthrough of the third form-fit element 24*a* extends through the base body 18*a* perpendicularly to the length axis 38*a*. The breakthrough of the third form-fit element 24*a* has a round cross section. The breakthrough of the third form-fit element 24*a* extends completely through a basic shape of the base body 18*a*. However, principally a different implementation of the form-fit elements 20*a*, 22*a*, 24*a*, deemed expedient by someone skilled in the art, would also be conceivable. The form-fit elements 20*a*, 22*a*, 24*a* in each case form a projection and/or a recess, which extend/s perpendicularly to the main extent direction 42*a* of the hygiene product 10*a* and is configured for a form-fit fixing of the volume body 16*a* parallel to the main extent direction 42*a* of the hygiene product 10*a*. In particular, the form-fit elements 20*a*, 22*a*, 24*a* and the volume body 16*a* are in a geometrical engagement with one another.

The first form-fit elements 20*a* partially extend into the volume body 16*a*. Furthermore, the volume body 16*a* extends into the groove of the second form-fit element 22*a* and through the breakthrough of the third form-fit element 24*a*. The second form-fit element 22*a* and the third form-fit element 24*a* are arranged along the length axis 38*a* between the first form-fit elements 20*a*. The base body 18*a* may thus be overfoamed completely, by 360°, with the first form-fit elements 20*a* and the second form-fit element 22*a* enabling a fixing in the longitudinal direction. The third form-fit element 24*a* on the base body 18*a* realizes a fixing of the rotation of the volume body 16*a* on the base body 18*a* and at the same time a fixing in the longitudinal direction. The third form-fit element 24*a* on the base body 18*a* realizes a fixing of the rotation of the volume body 16*a* on the base body 18*a* and at the same time also a fixing in the longitudinal direction.

The hygiene product 10*a* is produced by a method. In the method the base body 18*a* is produced via injection molding. Then the volume body 16*a* is in a method step molded directly to the base body 18*a* by means of a foaming method, in particular by means of a particle-foam method. For this the base body 18*a* is laid into a foaming tool and the base body 18*a* is overfoamed with the foamed material for the volume body 16*a*. Herein the volume body 16*a* is produced around the base body 18*a*. The volume body 16*a* realizes a form-fit connection with the base body 18*a* directly during production. In the particle-foam method in particular an expandable synthetic material is applied. In a first step of the particle-foam method, the raw material of the volume body 16*a*, implemented as beads and/or globules, is placed into a mold into which the base body 18*a* has already been laid.

Then water vapor is injected—under pressure and at a high temperature—through a variety of small openings in the tool, respectively in the cavity. This heat input results in an expansion and sintering of the beads, which connect at their surfaces. After this, the water content will preferably be reduced, for example in a tempering oven. In detail, in the particle-foam method, in particular in a first method step, the granulate is supplied in a pressure-loading container and/or pressure-filling apparatus. After this, in a second method step the foaming mold is closed. The foaming mold in particular defines a shape of the volume body 16*a*. Following this, the foaming mold is filled in a third method step. The pressure during a material input is in particular in a range of 0.5 bar to 3 bar, preferably of 1 bar to 2 bar. In a further method step, if required, the foaming mold is deaerated, in particular by means of a vacuum. Then the contents of the foaming mold are in particular vapored in a further method step. A vapor pressure is in particular up to 40 bar, preferably up to 25 bar, and particularly preferentially below 5 bar. The vapor pressure and the vapor temperature are in particular related as higher temperatures bring higher pressures with them. The vapor temperature is in particular up to 250° C., preferably up to 170° C., and particularly preferentially up to 150° C. The vapor temperature is furthermore in particular at least 80° C. The duration of the vaporing is in particular in a range of 20 s to 50 s, preferably in a range of 25 s to 40 s. Herein in particular the granulate, respectively the beads, is/are welded. A material expansion in particular amounts to 20 times to 100 times, preferably to 40 times to 80 times, the original volume. Optionally this may in particular aided by a vacuum, enabling better entering of the vapor. Following this, the foaming mold is cooled, such that the granulate becomes stabilized and/or fixed. The cooling is in particular brought about via a hollow-space system with water (sprayed water) through the same channels as the vapor input was made. Then, in a further method step the foaming mold is opened.

In FIGS. 2A to 14 further exemplary embodiments of the invention are shown. The following descriptions are essentially limited to the differences between the exemplary embodiments, wherein regarding components, features and functions which remain the same, the description of the other exemplary embodiments, in particular of FIGS. 1A to 1D, may be referred to. In order to distinguish between the exemplary embodiments, the letter a that has been added to the reference numerals of FIGS. 1A to 1D has been replaced by the letters b to n in the reference numerals of FIGS. 2A to 14. With regard to components having the same denomination, in particular to components having the same reference numerals, principally the drawings and/or the description of the other exemplary embodiments, in particular of FIGS. 1A to 1D, may be referred to.

FIG. 2A shows a front side 36b of a hygiene product 10b in a schematic perspective view. The hygiene product 10b is in the present case embodied as a toothbrush.

The hygiene product comprises at least one application unit 12b. Furthermore, the hygiene product 10b comprises at least one handle unit 14b.

The hygiene product 10b further comprises a volume body 16b. The volume body 16b is at least partially made of a foamed material. The volume body 16b is completely made of a foamed material. The volume body 16b partially forms the handle unit 14b. The volume body 16b forms a handle body of a handle region of the handle unit 14b. The volume body 16b exemplarily has a circle-cylindrical basic shape, a central axis extending along a length axis 38b of the hygiene product 10b. The volume body 16b is realized in a hollow-cylindrical fashion. However, other shapes, deemed expedient by someone skilled in the art, are also conceivable.

The hygiene product further comprises a base body 18b, which is connected with the volume body 16b. The base body 18b is at least partially made of a hard component. The base body 18b is completely made of a hard component. The base body 18b is embodied in a one-part implementation. The base body 18b forms the application unit 12b. The base body 18b forms the application unit 12b completely. Moreover, the base body 18b partially forms the handle unit 14b. The base body 18b forms a core of the handle unit 14b. In a region of the handle unit 14b, the base body 18b has an at least approximately cylindrical basic shape. The base body 18b extends along the length axis 38b along the entire hygiene product 10b. At a rear end of the hygiene product 10b, the base body 18b has a rounded end.

The volume body 16b is molded to the base body 18b. The volume body 16b is produced directly on the base body 18b in a foaming procedure. The base body 18b is produced in an injection-molding process, wherein the base body 18b is overfoamed with the volume body 16b. The volume body 16b encloses the base body 18b at least partially. The volume body 16b encloses the base body 18b in a region of the handle unit 14b. The volume body 16b encloses the base body 18b completely in at least one plane perpendicular to the length axis 38b.

The base body 18b and the volume body 16b realize a form-fit connection. The base body 18b comprises at least one form-fit element 20b, 22b, 24b, which creates a form-fit connection with the volume body 16b. The base body 18b comprises several form-fit elements 20b, 22b, 24b.

Beyond this, the hygiene product 10b comprises an enveloping body 28b, which encloses the at least one volume body 16b. The enveloping body 28b is connected to the volume body 16b by substance-to-substance bond. In a production, the enveloping body 28b enters into a form-fit connection and/or substance-to-substance bond with the volume body 16b. The enveloping body 28b at least partially forms an outer envelope of the hygiene product 10b. The enveloping body 28b encloses the volume body 16b completely. The enveloping body 28b further extends directly as far as the base body 18b. The enveloping body 28b is embodied as a thin layer on the volume body 16b. The enveloping body 28b is at least partially made of a soft component. Soft components may be, for example, thermoplastic styrene elastomers (TPE-S), like for example a styrene ethylene butadiene styrene copolymer (SEBS), a styrene butadiene styrene copolymer (SBS) or the like. It is moreover conceivable to use thermoplastic polyurethane elastomers (TPE-U), thermoplastic polyamide elastomers (TPE-A), thermoplastic polyolefin elastomers (TPE-O), thermoplastic polyester elastomers (TPE-E) or the like.

The hygiene product 10b further comprises a thumb support 50b. The thumb support 50b is arranged in a thumb-grip region of the handle unit 14b. The thumb support 50b is made of a soft component. The thumb support 50b is made of the same component as the enveloping body 28b. The thumb support 50b is arranged on the base body 18b. The thumb support 50b is connected to the base body 18b by substance-to-substance bond. The thumb support 50b may additionally be connected to the base body 18b in a form-fit manner. A variety of shapings of the thumb support 50b, deemed expedient by someone skilled in the art, are conceivable.

The hygiene product 10b is produced in a method. In the method the base body 18b is manufactured by injection molding. Then, in a method step the volume body 16b is directly molded to the base body 18b by means of a foaming procedure, in particular by a particle-foam method. For this purpose, the base body 18b is laid into a foaming tool and the base body 18b is overfoamed with the foamed material for the volume body 16b. The volume body 16b is herein produced around the base body 18b. The volume body 16b forms a form-fit connection with the base body 18b directly during production. After this, in a method step the at least one enveloping body 28b is molded to the volume body 16b via an injection-molding procedure. Furthermore, in the method step the thumb support 50b is molded to the base body 18b by means of an injection-molding procedure. For this purpose, the volume body 16b and the base body 18b are laid into a cavity of an injection-molding tool. Then the injection-molding tool is closed and a plastic component of the enveloping body 28b is injection-molded to the volume body 16b and the thumb support 50b is molded to the base body 18b. As injection-molding involves a higher melting temperature, respectively the melt has a higher temperature, relative to the melting temperature of the foamed volume body 16b, a fixed mechanical substance-to-substance bond is created by defined melting of the foamed volume body 16b. The enveloping body 28b is connected to the volume body 16b by substance-to-substance bond. Furthermore, the thumb support 50b is connected to the base body 18b by substance-to-substance bond.

With regard to the process sequence, the product created according to FIGS. 2A and 2B may be built upon the product of FIGS. 1A to 1D. The product created in FIGS. 1A to 1D is ready for use but may be turned into a product according to FIGS. 2A to 2B by the additional method step.

FIG. 3A shows a front side 36c of a hygiene product 10c in a schematic perspective view. The hygiene product 10c is in the present case embodied as a toothbrush.

The hygiene product 10c comprises at least one application unit 12c. Furthermore, the hygiene product 10c comprises at least one handle unit 14c.

The hygiene product 10c further comprises a volume body 16c. The volume body 16c is at least partially implemented of a foamed material. The volume body 16c is completely implemented of a foamed material. The volume body 16c partially forms the handle unit 14c. The volume body 16c forms a handle body of a handle region of the handle unit 14c. The volume body 16c is embodied in a two-part implementation and comprises two spaced-apart partial bodies 52c, 52c'. The partial bodies 52c, 52c' of the volume body 16c exemplarily in each case have a circle-cylindrical basic shape, wherein a central axis extends along a length axis 38c of the hygiene product 10c. The partial bodies 52c, 52c' are arranged coaxially with each other. The partial bodies 52c, 52c' of the volume body 16c are in each case realized in a hollow-cylindrical fashion. However, other shapes, deemed expedient by someone skilled in the art, are also conceivable.

The hygiene product 10c further comprises a base body 18c, which is connected with the volume body 16c. The base body 18c is at least partially implemented of a hard component. The base body 18c is completely implemented of a hard component. The base body 18c is embodied in a one-part implementation. The base body 18c forms the application unit 12c. The base body 18c forms the application unit 12c completely. Furthermore, the base body 18c partially forms the handle unit 14c. The base body 18c forms a core of the handle unit 14c. In a region of the handle unit 14c, the base body 18c has an at least approximately cylindrical basic shape. The base body 18c extends along the length axis 38c along the entire hygiene product 10c. At a rear end of the hygiene product 10c, the base body 18c has a rounded end.

The volume body 16c is molded to the base body 18c. The volume body 16c is manufactured directly on the base body 18c in a foaming method. The base body 18c is manufactured in an injection-molding procedure, wherein the base body 18c is overfoamed with the volume body 16c. The volume body 16c encloses the base body 18c at least partially. The volume body 16c encloses the base body 18c in a region of the handle unit 14c. The volume body 16c encloses the base body 18c completely in at least one plane perpendicular to the length axis 38c.

The base body 18c and the volume body 16c realize a form-fit connection. The base body 18c comprises at least one form-fit element 20c, which realizes a form-fit connection with the volume body 16c. The base body 18c comprises a first form-fit element 20c that is embodied as a disc. The first form-fit element 20c is embodied as a circle-shaped ring extending completely around a basic shape of the base body 18c. The first form-fit element 20c is arranged in a plane perpendicular to the length axis 38c. Viewed in a plane parallel to the length axis 38c, the first form-fit element 20c has a rectangular cross section. The base body 18c exemplarily comprises two first form-fit elements 20c, which are spaced apart from each other and are in each case arranged in a respective partial body 52c, 52c' of the volume body 16c. The partial bodies 52c, 52c' may be produced of different foamed materials.

The hygiene product 10c further comprises an enveloping body 28c, which penetrates the at least one volume body 16c at least partially. The enveloping body 28c is connected to the volume body 16c at least partially by substance-to-substance bond. In a production, the enveloping body 28c enters into a substance-to-substance bond with the volume body 16c. The enveloping body 28c partially forms an outer envelope of the hygiene product 10c. The enveloping body 28c is arranged between the partial bodies 52c, 52c' of the volume body 16c. The enveloping body 28c connects the partial bodies 52c, 52c'. The enveloping body 28c furthermore extends directly as far as the base body 18c. The enveloping body 28c is implemented of a soft component. The enveloping body 28c is connected with the base body 18c at least partially by substance-to-substance bond.

The hygiene product 10c is produced in a method. In the method the base body 18c is produced by means of injection molding. Then in a method step the volume body 16c is molded directly to the base body 18c by means of a foaming method, in particular by means of a particle-foam method. For this the base body 18c is laid into a foaming tool and the base body 18c is overfoamed with the foamed material for the volume body 16c. The volume body 16c is herein produced around the base body 18c. The volume body 16c realizes a form-fit connection with the base body 18c directly during production. Following this, in a method step the at least one enveloping body 28c is molded to the volume body 16c by means of an injection-molding procedure. For this purpose, the volume body 16c and the base body 18c are laid into a cavity of an injection-molding tool. Then the injection-molding tool is closed and a plastic component of the enveloping body 28c is injection-molded onto the volume body 16c and the base body 18c. The enveloping body 28c is connected to the volume body 16c at least partially by substance-to-substance bond. The enveloping body 28c is connected to the base body 18c at least partially by substance-to-substance bond.

FIG. 4A shows a front side 36d of a hygiene product 10d in a schematic perspective view. The hygiene product 10d is in the present case embodied as a toothbrush.

The hygiene product 10d comprises at least one application unit 12d. The hygiene product 10d further comprises at least one handle unit 14d.

The hygiene product 10d further comprises a volume body 16d. The volume body 16d is at least partially implemented of a foamed material. The volume body 16d is completely implemented of a foamed material. The volume body 16d partially forms the handle unit 14d. The volume body 16d forms a handle body of a handle region of the handle unit 14d. The volume body 16d exemplarily has a circle-cylindrical basic shape, wherein a central axis extends along a length axis 38d of the hygiene product 10d. The volume body 16d is embodied in a circle-cylindrical fashion. However, other shapes, deemed expedient by someone skilled in the art, are also conceivable.

The hygiene product 10d further comprises a base body 18d, which is connected with the volume body 16d. The base body 18d is at least partially implemented of a hard component. The base body 18d is completely implemented of a hard component. The base body 18d is embodied in a one-part implementation. The base body 18d forms the application unit 12d. The base body 18d forms the application unit 12d completely. The base body 18d furthermore forms the handle unit 14d partially. The base body 18d has in a handle region of the handle unit 14d an indentation 54d. The indentation 54d extends over the entire handle region of the handle unit 14d. The indentation 54d serves for an accommodation of the volume body 16d. The indentation 54d divides the base body 18d into two partial base bodies 56d, 56d'. In a region of the handle unit 14d, the base body 18d has an at least approximately cylindrical basic shape. At a rear end of the hygiene product 10d, the base body 18d has a rounded end.

The volume body 16d is molded to the base body 18d. The volume body 16d is manufactured directly on the base body 18d in a foaming procedure. The volume body 16d is introduced into the indentation 54d of the base body 18d. The base body 18d is produced in an injection-molding procedure, wherein the indentation 54d of the base body 18d is foamed, i. e. filled, with the volume body 16d.

The handle unit 14d further comprises a cage element 26d, which engages at least partially around the volume body 16d. The cage element 26d forms a lattice structure around the volume body 16d. The cage element 26d extends along the length axis 38d entirely over the volume body 16d. The cage element 26d comprises three longitudinal webs 58d, which are distributed in a circumferential direction and extend around the volume body 16d. Furthermore the cage element 26d comprises a transversal web 60d, which encloses the volume body 16d in the circumferential direction and connects the longitudinal webs 58d. Furthermore, the cage element 26d extends over the indentation 54d of the base body 18d. The cage element 26d connects the partial base bodies 56d of the base body 18d to one another. The cage element 26d is directly and fixedly connected with the base body 18d. The cage element 26d is fixedly connected with the base body 18d at both ends of the volume body 16d. The cage element 26d is realized integrally with the base body 18d. The cage element 26d at least partially forms an outer envelope of the hygiene product 10d.

The hygiene product 10d is produced in a method. In the method the base body 18d with the cage element 26d is produced by injection molding. After this, in a method step the volume body 16d is molded directly to the base body 18d by means of a foaming procedure, in particular by means of a particle-foam method. The indentation 54d of the base body 18d is foamed, i. e. filled, with the volume body 16d. For this the base body 18d is laid into a foaming tool and the indentation 54d of the base body 18d is foamed, i. e. filled, with the foamed material for the volume body 16d.

FIG. 5A shows a front side 36e of a hygiene product 10e in a schematic perspective view. In the present case the hygiene product 10e is embodied as a toothbrush.

The hygiene product 10e comprises at least one application unit 12e. The hygiene product 10e further comprises at least one handle unit 14e.

The hygiene product 10e further comprises a volume body 16e. The volume body 16e is at least partially implemented of a foamed material. The volume body 16e is completely implemented of a foamed material. The volume body 16e partially forms the handle unit 14e. The volume body 16e forms a handle body of a handle region of the handle unit 14e. The volume body 16e exemplarily has a circle-cylindrical basic shape, wherein a central axis extends along a length axis 38e of the hygiene product 10e. The volume body 16e is realized in a hollow-cylindrical fashion. However, other shapes, deemed expedient by someone skilled in the art, are also conceivable.

The hygiene product 10e further comprises a base body 18e, which is connected with the volume body 16e. The base body 18e is at least partially implemented of a hard component. The base body 18e is completely implemented of a hard component. The base body 18e is embodied in a one-part implementation. The base body 18e forms the application unit 12e. The base body 18e forms the application unit 12e completely. Furthermore, the base body 18e partially forms the handle unit 14e. The base body 18e forms a core of the handle unit 14e. In a region of the handle unit 14e, the base body 18e has an at least approximately cylindrical basic shape. The base body 18e extends along the length axis 38e along the entire hygiene product 10e. At a rear end of the hygiene product 10e, the base body 18e has a rounded end.

The volume body 16e is molded to the base body 18e. The volume body 16e is manufactured directly on the base body 18e in a foaming method. The base body 18e is manufactured in an injection-molding procedure, wherein the base body 18e is overfoamed with the volume body 16e. The volume body 16e encloses the base body 18e at least partially. The volume body 16e encloses the base body 18e in a region of the handle unit 14e. In at least one plane perpendicular to the length axis 38e, the volume body 16e encloses the base body 18e completely.

The base body 18e and the volume body 16e realize a form-fit connection. The base body 18e comprises at least one form-fit element 20e, 22e, 24e, which creates a form-fit connection with the volume body 16e. The base body 18e comprises several form-fit elements 20e, 22e, 24e.

The hygiene product 10e further comprises an enveloping body 28e, which partially encloses the at least one volume body 16e. The enveloping body 28e is connected to the volume body 16e by substance-to-substance bond. In a production, the enveloping body 28e enters into a substance-to-substance bond with the volume body 16e. The enveloping body 28e at least partially forms an outer envelope of the hygiene product 10e. The enveloping body 28e is embodied by a ring which encompasses the volume body 16e transversally to the length axis 38e. In addition to the substance-to-substance bond, the enveloping body 28e may realize a form-fit connection, or it may realize no substance-to-substance bond and only a form-fit connection.

The hygiene product 10e is produced in a method. In the method the base body 18e is produced by injection molding. Then in a method step the volume body 16e is molded directly to the base body 18e by means of a foaming method, in particular by means of a particle-foaming method. For this purpose, the base body 18e is laid into a foaming tool and the base body 18e is overfoamed with the foamed material for the volume body 16e. The volume body 16e is herein produced around the base body 18e. The volume body 16e realizes a form-fit connection with the base body 18e directly during production. Following this, in a method step the at least one enveloping body 28e is molded to the volume body 16e by an injection-molding process. For this the volume body 16e and the base body 18e are laid into a cavity of an injection-molding tool. After this the injection-molding tool is closed and a plastic component of the enveloping body 28e is injection-molded onto the volume body 16e. The enveloping body 28e is connected to the volume body 16e by substance-to-substance bond.

FIGS. 6B and 6C show a hygiene product 10*f* in a schematic side view. The hygiene product 10*f* is in the present case embodied as a toothbrush.

The hygiene product 10*f* comprises at least one application unit 12*f*. The at least one application unit 12*f* has a head region 46*f*. The head region 46*f* forms a brush head of the hygiene product 10*f*. In the present case the head region 46*f* is embodied as a toothbrush head. The head region 46*f* in particular comprises a base body that is realized as a bristle carrier. The base body of the head region 46*f* is completely implemented of a hard component. It would, however, also be conceivable that the base body of the head region 46*f* is implemented of a hard component and a soft component. The base body of the head region 46*f* forms a bristle carrier. On a front side 36*f* of the head region 46*f* at least one recess 32*f* is molded. The at least one recess 32*f* is configured for receiving a bristle bundle 34*f*. The head region 46*f* comprises a plurality of recesses 32*f*. The recesses 32*f* are implemented of bristle holes formed in a particle-foam method. For bristles of the bristle bundles 34*f* any suitable bristles are possible, which may for example be punched on in the aforementioned manner, for example in an anchor-punching method. The hygiene product 10*f* comprises the bristle bundles 34*f*. The bristle bundles 34*f* are connected to the application unit 12*f* via punching. The bristle bundles 34*f* are fastened to the application unit 12*f* by means of an anchor-punching method.

The hygiene product 10*f* further comprises at least one handle unit 14*f*.

The hygiene product 10*f* further comprises a volume body 16*f*. The volume body 16*f* is at least partially implemented of a foamed material. The volume body 16*f* is completely implemented of a foamed material. The volume body 16*f* forms the application unit 12*f* and the handle unit 14*f*. The application unit 12*f* is formed by the volume body 16*f*. The handle unit 14*f* is formed by the volume body 16*f*. The volume body 16*f* exemplarily has a circle-cylindrical basic shape, wherein a central axis extends along a length axis 38*f* of the hygiene product 10*f*. However, other shapes, deemed expedient by someone skilled in the art, are also conceivable.

In a region of the application unit 12*f*, the volume body 16*f* is at least partially densified subsequently. In a region of the application unit 12*f*, the volume body 16*f* is completely densified subsequently. A foamed material of the volume body 16*f* is densified after a production of the volume body 16*f*. In the densification a density of the volume body 16*f* is increased section-wise. The volume body 16*f* is in particular compressed to a normal measurement of the application unit 12*f*. Furthermore, in a region of the handle unit 14*f*, the volume body 16*f* is at least section-wise densified subsequently. In a region of the handle unit 14*f*, the volume body 16*f* is completely densified subsequently. In a region of the handle unit 14*f*, the foamed material of the volume body 16*f* is densified after a production of the volume body 16*f*.

The hygiene product 10*f* is produced in a method. In the method the volume body 16*f* is manufactured by means of a particle-foam method (cf. FIG. 6A). After this, the volume body 16*f* is densified at least partially after a shaping process. In a first densification step, the volume body 16*f* is in a region of the application unit 12*f* at least section-wise densified after a shaping process (cf. FIG. 6B). Depending on a desired shaping, the product may be already finished in this state. In a possible second densification step, the volume body 16*f* is in a region of the handle unit 14*f* at least section-wise densified after a shaping process (cf. FIG. 6C). The densification is carried out after the foaming. In a densification, in particular a deformation of the volume body 16*f* is brought about under pressure and heat with the aid of a stamp, wherein a stamp surface in particular already comprises at least a portion of a final geometry. A densification is herein in particular realized in two steps. In a first step the volume body 16*f* is laid into a negative mold. After this, in a second step a stamp is laid onto the volume body 16*f*, pressing the volume body 16*f* into position accordingly. The volume body 16*f* is herewith compressed. The densification is here exemplarily realized in two steps, namely in a region of the application unit 12*f* and in a region of the handle unit 14*f*. Together with the densification, at the same time further shaping of the volume body 16*f* is carried out. Together with the head densification, bristle holes are formed in the application unit 12*f*. This may in particular be carried out, for example, by means of a heated stamp with a bristle-hole stamp. Then a punching of the bristle bundles 34*f* is carried out. Herein the bristle bundles 34*f* are preferably folded and are fastened in a respective blind hole by means of at least one anchor, in particular by punching-in. Sling punching is also conceivable.

FIG. 7C shows a hygiene product 10*g* in a schematic side view. In the present case the hygiene product 10*g* is embodied as a toothbrush.

The hygiene product 10*g* comprises at least one application unit 12*g*. The at least one application unit 12*g* comprises a head region 46*g*. The head region 46*g* forms a brush head of the hygiene product 10*g*. In the present case the head region 46*g* is embodied as a toothbrush head. The head region 46*g* in particular has a base body that is embodied as a bristle carrier. A base body of the head region 46*g* is completely implemented of a hard component. It would however also be conceivable that the base body of the head region 46*g* is implemented of a hard component and a soft component. The base body of the head region 46*g* forms a bristle carrier. The hygiene product 10*g* further comprises a bristle platelet 30*g*, which is accommodated by the head region 46*g* and comprises a plurality of bristle bundles. The bristle platelet 30*g* is exemplarily embodied as an AFT platelet. On a front side 36*g* of the head region 46*g* a recess 32*g* is molded. The recess 32*g* is configured for receiving the bristle platelet 30*g*. The bristle platelet 30*g* is inserted in the recess 32*g* of the application unit 12*g*.

Furthermore, the hygiene product 10*g* comprises at least one handle unit 14*g*.

The hygiene product 10*g* further comprises a volume body 16*g*. The volume body 16*g* is at least partially implemented of a foamed material. The volume body 16*g* is completely implemented of a foamed material. The volume body 16*g* forms the application unit 12*g* and the handle unit 14*g*. The application unit 12*g* is formed by the volume body 16*g*. The handle unit 14*g* is formed by the volume body 16*g*. The volume body 16*g* exemplarily has a circle-cylindrical basic shape, wherein a central axis extends along a length axis 38*g* of the hygiene product 10*g*. However, other shapes, deemed expedient by someone skilled in the art, are also conceivable.

In a region of the application unit 12*g*, the volume body 16*g* is at least section-wise densified subsequently. In a region of the application unit 12*g*, the volume body 16*g* is completely densified subsequently. A foamed material of the volume body 16*g* is densified after a production of the volume body 16*g*. In the densification, a density of the volume body 16*g* is increased section-wise. The volume body 16*g* is in particular compressed to a normal measurement of the application unit 12*g*. Furthermore, in a region of the handle unit 14*g*, the volume body 16*g* is at least partially densified subsequently. In a region of the handle unit 14g the volume body 16g is completely densified subsequently. In a region of the handle unit 14g the foamed material of the volume body 16g is densified after a production of the volume body 16g.

The hygiene product 10g is produced in a method. In the method the volume body 16g with the recess 32g is manufactured by means of a particle-foam method (cf. FIG. 7A). After this the volume body 16g is densified at least after a shaping process. In a densification step, the volume body 16g is densified in a region of the application unit 12g and the handle unit 14g after a shaping process (cf. FIG. 7B). A densification is herein in particular carried out in two steps. In a first step the volume body 16g is laid into a negative mold. Then, in a second step a stamp is applied to the volume body 16g, pressing the volume body 16g into position accordingly. The volume body 16g is herein compressed. Following this, the bristle platelet 30g is inserted in the recess 32g and is, for example, welded.

FIG. 8 shows a front side 36h of a hygiene product 10h in a schematic perspective view. The hygiene product 10h is in the present case embodied as an interdental brush.

The hygiene product 10h comprises at least one application unit 12h. The hygiene product 10h further comprises at least one handle unit 14h.

The at least one application unit 12h comprises a head region 46h. The head region 46h forms an interdental brush head of the hygiene product 10h. The head region 46h in particular has a base body that is embodied as a bristle carrier.

The hygiene product 10h further comprises a volume body 16h. The volume body 16h is at least partially implemented of a foamed material. The volume body 16h is completely implemented of a foamed material.

The volume body 16h forms the application unit 12h and/or the handle unit 14h at least partially. The volume body 16h forms the handle unit 14h completely. The volume body 16h exemplarily has a drop-shaped basic shape, wherein a central axis extends along a length axis 38h of the hygiene product 10h. The volume body 16h further comprises finger notches. However, other shapes, deemed expedient by someone skilled in the art, are also conceivable.

The hygiene product 10h further comprises a base body 18h, which is connected with the volume body 16h. The base body 18h is implemented at least partially of a hard component and/or of a metal. The base body 18h forms the application unit 12h at least partially. The base body 18h forms the base body of the head region 46h of the application unit 12h.

The volume body 16h is molded to the base body 18h. The base body 18h and the volume body 16h realize a form-fit connection. The base body 18h engages at least partially into the volume body 16h.

FIG. 9 shows a front side 36i of a hygiene product 10i in a schematic perspective view. In the present case, the hygiene product 10i is embodied as an electrical toothbrush.

The hygiene product 10i comprises at least one application unit 12i. The hygiene product 10i further comprises at least one handle unit 14i. The handle unit 14i is realized as an electrical brush handpiece.

The at least one application unit 12i is realized as a plug-on brush. The application unit 12i is arranged on the upper side of the hygiene product 10i. The application unit 12i constitutes an uppermost point of the hygiene product 10i.

The hygiene product 10i further comprises a volume body 16i. The volume body 16i is at least partially implemented of a foamed material. The volume body 16i is completely implemented of a foamed material. The volume body 16i at least partially forms the application unit 12i and/or the handle unit 14i. The volume body 16i partially forms the handle unit 14i. The volume body 16i forms an outer envelope of a handle region of the handle unit 14i. The volume body 16i exemplarily has a circle-cylindrical basic shape, wherein a central axis extends along a length axis 38i of the hygiene product 10i. The volume body 16i is realized in a hollow-cylindrical fashion. However, other shapes, deemed expedient by someone skilled in the art, are also conceivable.

The hygiene product 10i further comprises a base body 18i, which is connected with the volume body 16i. The base body 18i is at least partially implemented of a hard component. The base body 18i at least partially forms the application unit 12i and/or the handle unit 14i. The base body 18i partially forms the handle unit 14i. The base body 18i forms a housing of the handle unit 14i. The base body 18i has an at least approximately cylindrical basic shape. The base body 18i forms a cylindrical housing of the handle unit 14i. The housing serves for an accommodation of a drive and of an energy storage of the handle unit 14i. The base body 18i extends along the length axis 38i along the entire handle unit 14i. The base body 18i is at least partially implemented of a soft component. The soft component preferably forms the housing portion 76i in a region of the on/off switch.

The volume body 16i is molded to the base body 18i. The volume body 16i is produced directly on the base body 18i in a foaming method. The base body 18i is produced in an injection-molding procedure, wherein the base body 18i is overfoamed with the volume body 16i. The volume body 16i encloses the base body 18i at least partially. The volume body 16i encloses the base body 18i in a region of the handle unit 14i. The volume body 16i encloses the base body 18i completely in at least one plane perpendicular to the length axis 38i. The volume body 16i forms a ring. The base body 18i and the volume body 16i realize a form-fit connection.

FIG. 10 shows a front side 36j of a hygiene product 10j in a schematic perspective view. In the present case, the hygiene product 10j is embodied as an electrical toothbrush.

The hygiene product 10j comprises at least one application unit 12j. The hygiene product 10j further comprises at least one handle unit 14j. The handle unit 14j is embodied as an electrical brush handpiece.

The at least one application unit 12j is implemented as a plug-on brush. The application unit 12j is arranged on an upper side of the hygiene product 10j. The application unit 12j constitutes an uppermost point of the hygiene product 10j.

The hygiene product 10j further comprises a volume body 16j. The volume body 16j is at least partially implemented of a foamed material. The volume body 16j is completely implemented of a foamed material. The volume body 16j forms the application unit 12j and/or the handle unit 14j at least partially. The volume body 16j partially forms the handle unit 14j. The volume body 16j forms an outer envelope of a handle region of the handle unit 14j. The volume body 16j is implemented of several islands which are spaced apart from one another. The islands exemplarily have an oval shape. However, a different shape of the islands, deemed expedient by someone skilled in the art, would also be conceivable.

The hygiene product 10j further comprises a base body 18j, which is connected with the volume body 16j. The base body 18j is at least partially implemented of a hard component. The base body 18j forms the application unit 12j and/or the handle unit 14*j* at least partially. The base body 18*j* partially forms the handle unit 14*j*. The base body 18*j* has an at least approximately cylindrical basic shape. The base body 18*j* forms a cylindrical housing of the handle unit 14*j*. The housing serves for an accommodation of a drive and of an energy storage of the handle unit 14*j*. The base body 18*j* extends along a length axis 38*j* along the entire handle unit 14*j*. The base body 18*j* is at least partially implemented of a soft component. The soft component preferably forms the housing portion 76*j* in the region of the on/off switch.

The volume body 16*j* is molded to the base body 18*j*. The volume body 16*j* is manufactured directly on the base body 18*j* in a foaming method. The base body 18*j* is manufactured in an injection-molding procedure, wherein the volume body 16*j* is foamed onto the base body 18*j*. The base body 18*j* and the volume body 16*j* realize a form-fit connection.

FIG. 11A shows a hygiene product 10*k* in a schematic side view. The hygiene product 10*k* is in the present case embodied as a mascara.

The hygiene product 10*k* comprises at least one application unit 12*k*. The hygiene product 10*k* further comprises at least one handle unit 14*k*. The hygiene product 10*k* furthermore comprises a reservoir 62*k*. The reservoir 62*k* serves for a storage of a mascara liquid. Moreover the reservoir 62*k* in particular serves for stowing the application unit 12*k* and for receiving a fluid. Preferably the handle unit 14*k* is connectable to the reservoir 62*k* via a screw connection or a plug connection, wherein in a connected state the application unit 12*k* is accommodated in the reservoir 62*k*.

The at least one application unit 12*k* comprises a head region 46*k*. The head region 46*k* forms a mascara brush head of the hygiene product 10*k*. The head region 46*k* in particular has a base body that is embodied as a bristle carrier. The head region 46*k* is preferably implemented at least partially of a twisted-in brush.

The hygiene product 10*k* further comprises a volume body 16*k*. The volume body 16*k* is at least partially implemented of a foamed material. The volume body 16*k* is completely implemented of a foamed material. The volume body 16*k* forms the application unit 12*k* and/or the handle unit 14*k* at least partially. The volume body 16*k* forms the handle unit 14*k* completely. In a region of the handle unit 14*k*, the volume body 16*k* exemplarily has a cylindrical basic shape, wherein a central axis extends along a length axis 38*k* of the hygiene product 10*k*. However, other shapes, deemed expedient by someone skilled in the art, are also conceivable.

Furthermore, the volume body 16*k* forms the handle unit 14*k* completely. In a region of the reservoir 62*k*, the volume body 16*k* exemplarily has a hollow-cylindrical basic shape, wherein a central axis extends along the length axis 38*k* of the hygiene product 10*k*. However, other shapes, deemed expedient by someone skilled in the art, are also conceivable.

The hygiene product 10*k* further comprises a base body 18*k*, which is connected with the volume body 16*k*. The base body 18*k* is at least partially implemented of a hard component or of a metal. The base body 18*k* forms the application unit 14*k* at least partially. The base body 18*k* forms the base body of the head region 46*k* of the application unit 12*k*. The base body 18*k* furthermore forms an inner portion of the reservoir 62*k*.

The volume body 16*k* is molded to the base body 18*k*. The base body 18*k* and the volume body 16*k* realize a form-fit connection. The base body 18*k* partially engages into the volume body 16*k*. The base body 18*k* is overmolded with the volume body 16*k*. The portion of the base body 18*k* that forms the application unit 12*k* partially protrudes into the portion of the volume body 16*k* that forms the handle unit 14*k*. Furthermore, the inner portion of the reservoir 62*k*, which is formed by the base body 18*k*, is completely enclosed by the portion of the volume body 16*k* that forms an outer envelope of the reservoir 62*k*.

Analogously to the mascara, a cream jar can be created. For this, principally the application unit of the mascara is removed. The handle unit constitutes a lid of the jar, which is put upon a container. The container corresponds to the reservoir and is implemented of a base body that is produced in an injection-molding procedure and is overfoamed with a volume body.

FIG. 12 shows a rear side 441 of a hygiene product 10*l* in a schematic perspective view. In the present case the hygiene product 10*l* is embodied as a razor.

The hygiene product 10*l* comprises at least one application unit 12*l*. The hygiene product 10*l* further comprises at least one handle unit 14*l*. The handle unit 14*l* has a coupling zone 641 for a releasable coupling with the application unit 12*l*. The at least one application unit 12*l* comprises a head region 46*l*. The application unit 12*l* is implemented as a razorblade head.

The hygiene product 10*l* further comprises a volume body 16*l*. The volume body 16*l* is at least partially implemented of a foamed material. The volume body 16*l* is completely implemented of a foamed material. The volume body 16*l* forms the application unit 12*l* and/or the handle unit 14*l* at least partially. The volume body 16*l* partially forms the handle unit 14*l*. The volume body 16*l* forms a portion of the outer envelope of a handle region of the handle unit 14*l*. The volume body 16*l* exemplarily has a circle-cylindrical basic shape, wherein a central axis extends at least approximately along a length axis 38*l* of the hygiene product 10*l*. However, other shapes, deemed expedient by someone skilled in the art, are also conceivable.

The hygiene product 10*l* further comprises a base body 18*l*, which is connected with the volume body 16*l*. The base body 18*l* is at least partially implemented of a hard component. The base body 18*l* has a shell-like structure. The base body 18*l* has a recess which is adjoined by a portion of the volume body 16*l*.

The base body 18*l* forms the application unit 12*l* and/or the handle unit 14*l* at least partially. The base body 18*l* forms the application unit 12*l*. The base body 18*l* forms the handle unit 14*l* partially. The base body 18*l* forms a core of the handle unit 14*l*. In a region of the handle unit 14*l*, the base body 18*l* has an approximately U-shaped cross section. The base body 18*l* furthermore forms the coupling zone 641.

The volume body 16*l* is molded to the base body 18*l*. The volume body 16*l* is manufactured directly on the base body 18*l* in a foaming method. The base body 18*l* is manufactured in an injection-molding procedure, wherein the base body 18*l* is overfoamed with the volume body 16*l*. The volume body 16*l* encloses the base body 18*l* at least partially. The volume body 16*l* encloses the base body 18*l* in a region of the handle unit 14*l*.

FIG. 13A shows a hygiene product 10*m* in a schematic perspective view. The hygiene product 10*m* is in the present case embodied as a dental-floss box.

The hygiene product 10*m* comprises at least one application unit 12*m*. The application unit 12*m* is embodied as a cutter for cutting the dental floss. Furthermore, the hygiene product 10*m* comprises at least one handle unit 14*m*. The handle unit 14*m* is embodied as a box base body for receiving a dental-floss reel. The application unit 12*m* is fixedly accommodated in the handle unit 14*m*. The application unit 12m is exemplarily implemented of a metal, in particular a sheet metal. The application unit 12m may be mounted in the handle unit 14m or may be overfoamed as an inlay.

The hygiene product 10m further comprises a volume body 16m. The volume body 16m is at least partially implemented of a foamed material. The volume body 16m is completely implemented of a foamed material. The volume body 16m forms the handle unit 14m. The handle unit 14m is implemented by the volume body 16m. The volume body 16m preferably forms two half-shells 66m, 68m and a lid 70m of the handle unit 14m. Furthermore, the volume body 16m forms a first hinge 72m, which connects the first half-shell 66m to the second half-shell 68m. The volume body 16m further forms a second hinge 74m, which connects the second half-shell 68m to the lid 70m. The hinges 72m, 74m are in each case implemented as a film hinge.

In the first half-shell 66m and in the second half-shell 68m, a projecting element is formed in the part that will be situated inside later on. In the first half-shell 66m a hollow cylinder is molded-on, which has two functions. On the one hand a dental-floss reel (coil carrying dental floss) is laid onto the hollow cylinder such that it serves as a rotary center. The second function is the accommodation of the projecting cylinder of the second half-shell 68m; the two half-shells 66m, 68m are folded together and the cylinder is inserted into the hollow cylinder. In this way a fixing of the two half-shells 66m, 68m to each other is achieved.

In a region of the handle unit 14m, the volume body 16m is section-wise densified subsequently. The volume body 16m is densified in a region of the hinges 72m, 74m. In a region of the hinges 72m, 74m of the handle unit 14m, the foamed material of the volume body 16m is densified after a production of the volume body 16m in order to realize each of the hinges 72m, 74m as a film hinge.

Alternatively, a dental-floss box may be produced—as is currently usual—in an injection-molding procedure while comprising individual places that are implemented of a foamed material. Herein it is possible to create a shape similar to the housing of the electrical toothbrush of FIG. 10 by creating individual islands of a foamed material, which improve the ergonomics of the product.

FIG. 14 shows a hygiene product 10n in a schematic perspective view. In the present case the hygiene product 10n is embodied as a hand brush.

The hygiene product 10n comprises at least one application unit 12n. The hygiene product 10n further comprises at least one handle unit 14n.

The at least one application unit 12n comprises a head region 46n. The head region 46n in particular has a base body which is embodied as a bristle carrier and on which bristle bundles 34n are fastened.

The hygiene product 10n further comprises a volume body 16n. The volume body 16n is at least partially implemented of a foamed material. The volume body 16n is completely made of a foamed material. The volume body 16n forms the application unit 12n and/or the handle unit 14n at least partially. The volume body 16n forms the handle unit 14n completely. The volume body 16n exemplarily has an elongate basic shape, wherein a central axis extends along a length axis 38n of the hygiene product 10n.

The hygiene product 10n further comprises a base body 18n, which is connected with the volume body 16n. The base body 18n is implemented at least partially of a hard component. The base body 18n forms the application unit 12n at least partially. The base body 18n forms the base body of the head region 46n of the application unit 12n.

The volume body 16n is molded to the base body 18n. The base body 18n and the volume body 16n realize a form-fit connection. The base body 18n partially engages into the volume body 16n.

FIG. 15A shows a front side 360 of a hygiene product 10o in a schematic perspective view. The hygiene product 10o is in the present case embodied as a toothbrush. The further FIGS. 15B to 15G illustrate the construction of the hygiene product 10o by exploded views and views of parts of the hygiene product 100.

The hygiene product 10o comprises at least one application unit 120. Furthermore, the hygiene product 10o comprises at least one handle unit 140.

In the following FIGS. 15A to 15G will be referred to, which show different views and manufacturing stages of the hygiene product 100. Because of the different views, some elements are not shown in all figures and are therefore not provided with reference numerals in all figures.

The at least one application unit 12o comprises a head region 460. The head region 46o forms a brush head of the hygiene product 100. In the present case, the head region 46o is embodied as a toothbrush head. The head region 46o in particular has a base body 180 that is embodied as a bristle carrier. The base body 180 of the head region 46o is completely implemented of a hard component and extends over an entire length of the application unit 120.

A neck region 48o forms a transition between the application unit 12o and the handle unit 140.

The hygiene product 10o further comprises a volume body 160, which is divided into two parts. The hygiene product 10o comprises a first partial volume body 16.1o and a second partial volume body 16.2o. The two partial volume bodies 16.1o, 16.2o of the volume body 16o are implemented of a foamed material. The two partial volume bodies 16.1o, 16.2o of the volume body 16o form the handle unit 14o at least partially. The two partial volume bodies 16.1o, 16.2o of the volume body 16o form at least a portion of the outer envelope of a handle region of the handle unit 140. The two partial volume bodies 16.1o, 16.2o are implemented differently, such that an ergonomic shape of the handle region is formed in the fully assembled state of the hygiene product 100.

The first partial volume body 16.1o of the volume body 160, which forms a front side 360 of the application unit 120, is for example equipped with a thumb support 500. The thumb support 50o is realized in the shape of a hollow, respectively a deepening, on the surface. The second partial volume body 16.2o of the volume body 160, which forms a rear side 440 of the application unit 120, is provided with a curved surface, which forms together with the further parts an ergonomic application unit 120, respectively handle unit 140. However, other shapes, deemed expedient by someone skilled in the art, are also conceivable.

The two partial volume bodies 16.1o, 16.2o of the volume body 16o are produced independently from a base body 180. The base body 18o is preferably produced in an injection-molding procedure whereas the volume body 16o is produced in a foaming method. After the production of the individual partial volume bodies 16.1o, 16.2o, they are mounted together and fixed. The fixing may be realized, for example, in a form-fit manner.

In the mounted state the two partial volume bodies 16.1o, 16.2o of the volume body 160 are attached on the front side 36o and on the rear side 44o of the base body 180. The base body 18o is in the present case not completely enclosed, and forms part of the surface as well. However, an implementation in which the base body 18o is completely enclosed is also possible.

On the two partial volume bodies 16.1o, 16.2o of the volume body 16o pedestals 78o and grooves 80o are formed. The grooves 80o serve for receiving a corresponding form-fit element 82o, in particular a ridge, of the base body 18o and for securing the two parts against a twisting. The grooves 80o are formed on both partial volume bodies 16.1o, 16.2o of the volume body 160. The grooves 800, which are embodied as longitudinal grooves, are situated in identical planes. The pedestals 78o of the two partial volume bodies 16.1o, 16.2o of the volume body 16o are alternatingly implemented in such a way that they respectively fit, in the mounted state, into a form-fit element 840 of the base body 18o that is implemented as a recess. The pedestals 78o thus alternate in the mounted state.

The base body 18o is equipped with form-fit elements 82o, which are embodied as ridges, and with form-fit elements 84o, which are embodied as recesses. The form-fit elements 82o which are embodied as ridges serve, on the one hand, for better fixing the base body 18o and the volume body 16o to each other, respectively for receiving rotational forces. The form-fit elements 84o which are embodied as recesses receive the pedestals 780 of the volume bodies 160, thus fixing the bodies to each other. The pedestals 78o are implemented in an alternating manner, such that the pedestals 78o of the front side 360 and the pedestals 78o of the rear side 44o enter the base body 18o alternatingly.

The pedestals 78o and the form-fit elements 84o which are embodied as recesses are implemented in such a way that a form-fit connection is established between them. FIG. 15G illustrates how the hygiene product 100 looks in the position A-A in the mounted state at the respective place. The pedestals 78o of the respective partial volume bodies 16.1o, 16.2o have been introduced into the base body 18o side by side. Furthermore, the connections of grooves 80o and form-fit elements 82o which are embodied as ridges are also visible, as well as the geometry of the base body 180, which sidewise forms a respective portion of the surface of the finished product.

FIGS. 16A and 16B respectively show a front side 36p of a hygiene product 10p in a schematic perspective illustration. In FIG. 16A the hygiene product 10p is shown in a mounted state, while the construction is shown in FIG. 16B in an exploded view.

In the present implementation the two parts of the hygiene product 10p, a base body 18p and a volume body 16p, are produced independently from each other. The base body 18p is preferably produced in an injection-molding procedure whereas the volume body 16p is produced in a foaming method. Following the production of the individual parts, these are mounted and fixed.

The interface region between the base body 18p and the volume body 16p is realized as a cylindrical blind hole in the volume body 16p and as a barb structure in the base body 18p. In a mounting, the base body 18p is pressed with its barb structure into the blind hole of the volume body 16p. The abutment body at the base body 18p ensures that during the mounting the base body 18p is not pressed too strongly into the blind hole. This furthermore also prevents the base body 18p from being pressed further into the blind hole during an application. Due to the barb structure, the base body 18p gets hooked in the blind hole and can only be removed in a destructive manner, which means that the structure is ruptured and secure mounting is no longer possible.

The descriptions made for specific figures are of course also transferable to other figures which show the same or similar implementations and in which the implementations are not described as detailed.

REFERENCE NUMERALS 10 hygiene product
12 application unit
14 handle unit
16 volume body
16.1 partial volume body
16.2 partial volume body
18 base body
20 form-fit element
22 form-fit element
24 form-fit element
26 cage element
28 enveloping body
30 bristle platelet
32 recess
34 bristle bundle
36 front side
38 length axis
40 height axis
42 main extent direction
44 rear side
46 head region
48 neck region
50 thumb support
52 partial body
54 indentation
56 partial base body
58 longitudinal web
60 transversal web
62 reservoir
64 coupling zone
66 half-shell
68 half-shell
70 lid
72 hinge
74 hinge
76 housing portion
78 pedestal
80 groove
82 form-fit element
84 form-fit element

The invention claimed is:

1. A method for a production of a hygiene product with at least one application unit, with at least one handle unit that is connected to the application unit, and with at least one volume body, which at least partially forms the application unit and/or the handle unit and which is made at least partially of a foamed material, comprising at least one base body, which is connected to the volume body and which at least partially forms the application unit and/or the handle unit, wherein the at least one volume body is molded to the at least one base body, wherein the at least one base body comprises at least one form-fit element, which forms a form-fit connection with the at least one volume body, the method comprising:

forming the hygiene product,
wherein the volume body is at least section-wise densified after a shaping process.

2. The method according to claim 1, wherein in at least one method step the volume body is molded to the base body directly by means of a foaming method.

3. The method according to claim 1, wherein in at least one method step the at least one enveloping body and/or the at least one base body are/is molded to the volume body by means of an injection-molding process.

4. The method according to claim 1, wherein in a region of the application unit, the volume body is at least section-wise densified after a shaping process.

\* \* \* \* \*